United States Patent
Cera et al.

(10) Patent No.: US 9,200,909 B2
(45) Date of Patent: Dec. 1, 2015

(54) DATA-DRIVEN 3D TRAFFIC VIEWS WITH THE VIEW BASED ON USER-SELECTED START AND END GEOGRAPHICAL LOCATIONS

(75) Inventors: Christopher D. Cera, Havertown, PA (US); Robert M. Soulchin, King of Prussia, PA (US); Brian J. Smyth, West Chester, PA (US); Jonathan K. Agree, Yardley, PA (US); Gregory A. Auxer, Glenmore, PA (US); Brent R. Matzelle, Philadelphia, PA (US); Michal Balcerzak, Philadelphia, PA (US); John B. Grubner, III, Fernandina Beach, FL (US); Eric R. Smith, Langhorne, PA (US)

(73) Assignee: HERE Global B.V., Veldhoven (NL)

( * ) Notice: Subject to any disclaimer, the term of this patent is extended or adjusted under 35 U.S.C. 154(b) by 752 days.

(21) Appl. No.: 12/961,660

(22) Filed: Dec. 7, 2010

(65) Prior Publication Data

US 2011/0131597 A1 Jun. 2, 2011

Related U.S. Application Data

(63) Continuation of application No. 11/405,228, filed on Apr. 17, 2006.

(60) Provisional application No. 60/672,413, filed on Apr. 18, 2005.

(51) Int. Cl.
*G06F 3/048* (2013.01)
*G01C 21/32* (2006.01)
*G06F 3/0481* (2013.01)

(52) U.S. Cl.
CPC ............ *G01C 21/32* (2013.01); *G06F 3/04815* (2013.01)

(58) Field of Classification Search
CPC .......... G06F 3/04815; G06F 17/30873; G06F 3/0481; G06F 17/30994; G06T 19/00
USPC ............ 715/848; 701/208; 345/418, 440, 716
See application file for complete search history.

(56) References Cited

U.S. PATENT DOCUMENTS

| | | | |
|---|---|---|---|
| 4,937,570 | A | 6/1990 | Matsukawa et al. |
| 5,379,215 | A | 1/1995 | Kruhoeffer et al. |
| 5,432,895 | A | 7/1995 | Myers |
| 5,583,972 | A | 12/1996 | Miller |

(Continued)

FOREIGN PATENT DOCUMENTS

WO    WO 2008/060933    5/2008

OTHER PUBLICATIONS

Gueziec, Andre, "3D Traffic Visualization in Real Time," ACM Siggraph Technical Sketches, Conference Abstracts and Applications, p. 144, Los Angeles, CA (Aug. 2001).

(Continued)

*Primary Examiner* — Kieu Vu
*Assistant Examiner* — Joy M Weber
(74) *Attorney, Agent, or Firm* — Lempia Summerfield Katz LLC

(57) ABSTRACT

Traffic flow data representing traffic conditions on a road system is obtained. A user selects a start geographical location and an end geographical location. An animated flythrough 3D graphical map is then created and displayed beginning at the start geographical location and navigating toward the end geographical location. The traffic flow data is continuously displayed during the flythrough.

15 Claims, 44 Drawing Sheets

(56) References Cited

U.S. PATENT DOCUMENTS

| | | | |
|---|---|---|---|
| 5,757,290 A | 5/1998 | Watanabe et al. |
| 5,802,492 A | 9/1998 | DeLorme et al. |
| 5,864,305 A | 1/1999 | Rosenquist |
| 5,884,217 A | 3/1999 | Koyanagi |
| 5,908,464 A | 6/1999 | Kishigami et al. |
| 5,913,918 A | 6/1999 | Nakano et al. |
| 5,917,436 A | 6/1999 | Endo et al. |
| 5,936,553 A | 8/1999 | Kabel |
| 5,982,298 A | 11/1999 | Lappenbusch et al. |
| 5,987,377 A | 11/1999 | Westerlage et al. |
| 6,006,161 A | 12/1999 | Katou |
| 6,154,689 A | 11/2000 | Pereira et al. |
| 6,182,453 B1 | 2/2001 | Forsberg |
| 6,240,369 B1 | 5/2001 | Foust |
| 6,278,383 B1 | 8/2001 | Endo et al. |
| 6,360,168 B1 | 3/2002 | Shimabara |
| 6,466,862 B1 | 10/2002 | DeKock et al. |
| 6,520,861 B2 | 2/2003 | Shoji et al. |
| 6,532,414 B2 | 3/2003 | Mintz |
| 6,553,308 B1 | 4/2003 | Uhlmann et al. |
| 6,600,994 B1 | 7/2003 | Polidi |
| 6,603,407 B2 | 8/2003 | Endo et al. |
| 6,650,326 B1 | 11/2003 | Huber et al. |
| 6,710,774 B1 | 3/2004 | Kawasaki et al. |
| 6,756,919 B2 | 6/2004 | Endo et al. |
| 6,845,324 B2 | 1/2005 | Smith |
| 6,919,821 B1 | 7/2005 | Smith |
| 6,956,590 B1 | 10/2005 | Barton et al. |
| 7,044,855 B2 | 5/2006 | Hinami et al. |
| 7,116,326 B2 | 10/2006 | Soulchin et al. |
| 7,221,287 B2 | 5/2007 | Gueziec et al. |
| 7,486,201 B2 | 2/2009 | Kelly et al. |
| 7,865,304 B2 * | 1/2011 | Gretton et al. ............... 701/418 |
| 2001/0008991 A1 | 7/2001 | Hamada et al. |
| 2001/0021665 A1 | 9/2001 | Gouji et al. |
| 2001/0028350 A1 | 10/2001 | Matsuoka et al. |
| 2002/0087263 A1 | 7/2002 | Wiener |
| 2002/0091005 A1 | 7/2002 | Shoji et al. |
| 2002/0147544 A1 | 10/2002 | Nicosia et al. |
| 2002/0193938 A1 | 12/2002 | DeKock et al. |
| 2003/0001880 A1 * | 1/2003 | Holtz et al. ................... 345/716 |
| 2003/0125846 A1 | 7/2003 | Yu et al. |
| 2003/0181194 A1 | 9/2003 | Litvak et al. |
| 2003/0191568 A1 | 10/2003 | Breed |
| 2003/0225516 A1 | 12/2003 | DeKock et al. |
| 2004/0030493 A1 | 2/2004 | Pechatnikov et al. |
| 2004/0030706 A1 * | 2/2004 | Evans .......................... 707/100 |
| 2004/0046759 A1 | 3/2004 | Soulchin et al. |
| 2004/0143385 A1 | 7/2004 | Smyth et al. |
| 2004/0236507 A1 | 11/2004 | Maruyama et al. |
| 2004/0243533 A1 * | 12/2004 | Dempster et al. ................. 707/1 |
| 2004/0267440 A1 * | 12/2004 | DeKock et al. ............... 701/117 |
| 2005/0143902 A1 | 6/2005 | Soulchin et al. |
| 2006/0058950 A1 | 3/2006 | Kato et al. |
| 2006/0132482 A1 | 6/2006 | Oh |
| 2006/0158330 A1 | 7/2006 | Gueziec |
| 2006/0178807 A1 | 8/2006 | Kato et al. |
| 2006/0200302 A1 | 9/2006 | Seko |
| 2006/0247850 A1 | 11/2006 | Cera et al. |
| 2008/0030504 A1 | 2/2008 | Brunner et al. |
| 2008/0143727 A1 | 6/2008 | Oh et al. |
| 2009/0289937 A1 | 11/2009 | Flake et al. |

OTHER PUBLICATIONS

European Extended Search Report, EP Application No. 10250276.2-1232, dated Aug. 31, 2010.

* cited by examiner

```xml
<?xml version="1.0" encoding="UTF-8"?>
<GRAPHICAL_NETWORK_DATA>
  <TIMESTAMP VALUE="09-Jul-2004 13:26:27 EDT"/>
  <DATA>
    <TYPE>RMP</TYPE>
    <ORDER_NUMBER>0</ORDER_NUMBER>
    <ID><![CDATA[7176|North|THRU]]></ID>
    <DESCRIPTION><![CDATA[N. of Woodhaven Rd ]]></DESCRIPTION>
    <ITS_ROADWAY_DESCRIPTION><![CDATA[I-95]]></ITS_ROADWAY_DESCRIPTION>
    <GEOLOCATION LATITUDE="40.07147" LONGITUDE="-74.95802"/>
    <SPEED UNITS="MPH" VALUE="57.06081895949091"/>
    <ROUTE>
      <ID><![CDATA[95NB]]></ID>
      <NAME><![CDATA[I-95 NB]]></NAME>
      <DESCRIPTION><![CDATA[I-95 NB]]></DESCRIPTION>
      <START UNITS="PERCENT" VALUE="87.9546864100771"/>
      <END UNITS="PERCENT" VALUE="0.0"/>
    </ROUTE>
  </DATA>
  <DATA>
    <TYPE>RMP</TYPE>
    <ORDER_NUMBER>1</ORDER_NUMBER>
    <ID><![CDATA[7162|North|THRU]]></ID>
    <DESCRIPTION><![CDATA[S. of Commodore Barry Brg]]></DESCRIPTION>
    <ITS_ROADWAY_DESCRIPTION><![CDATA[I-95]]></ITS_ROADWAY_DESCRIPTION>
    <GEOLOCATION LATITUDE="39.843611" LONGITUDE="-75.39538889"/>
    <SPEED UNITS="MPH" VALUE="47.246825278962774"/>
    <ROUTE>
      <ID><![CDATA[95NB]]></ID>
      <NAME><![CDATA[I-95 NB]]></NAME>
      <DESCRIPTION><![CDATA[I-95 NB]]></DESCRIPTION>
      <START UNITS="PERCENT" VALUE="4.621119680953353"/>
      <END UNITS="PERCENT" VALUE="0.0"/>
    </ROUTE>
  </DATA>
  <DATA>
    <TYPE>RMP</TYPE>
    <ORDER_NUMBER>2</ORDER_NUMBER>
    <ID><![CDATA[7134|North|THRU]]></ID>
    <DESCRIPTION><![CDATA[S. of RT-420 (#9)]]></DESCRIPTION>
    <ITS_ROADWAY_DESCRIPTION><![CDATA[I-95]]></ITS_ROADWAY_DESCRIPTION>
    <GEOLOCATION LATITUDE="39.868583" LONGITUDE="-75.30811111"/>
    <SPEED UNITS="MPH" VALUE="68.01641273033798"/>
    <ROUTE>
      <ID><![CDATA[95NB]]></ID>
      <NAME><![CDATA[I-95 NB]]></NAME>
      <DESCRIPTION><![CDATA[I-95 NB]]></DESCRIPTION>
      <START UNITS="PERCENT" VALUE="18.441757285840023"/>
      <END UNITS="PERCENT" VALUE="0.0"/>
    </ROUTE>
  </DATA>
  <DATA>
    <TYPE>RMP</TYPE>
    <ORDER_NUMBER>3</ORDER_NUMBER>
    <ID><![CDATA[7222|North|THRU]]></ID>
    <DESCRIPTION><![CDATA[S. of I-476 (#7)]]></DESCRIPTION>
    <ITS_ROADWAY_DESCRIPTION><![CDATA[I-95]]></ITS_ROADWAY_DESCRIPTION>
    <GEOLOCATION LATITUDE="39.865139" LONGITUDE="-75.34761111"/>
    <SPEED UNITS="MPH" VALUE="53.1816124042154"/>
    <ROUTE>
      <ID><![CDATA[95NB]]></ID>
      <NAME><![CDATA[I-95 NB]]></NAME>
      <DESCRIPTION><![CDATA[I-95 NB]]></DESCRIPTION>
      <START UNITS="PERCENT" VALUE="12.47110791762594"/>
      <END UNITS="PERCENT" VALUE="0.0"/>
    </ROUTE>
  </DATA>
```

1401 — <DESCRIPTION><![CDATA[N. of Woodhaven Rd ]]></DESCRIPTION>
1404 — <SPEED UNITS="MPH" VALUE="57.06081895949091"/>
1402 — <ID><![CDATA[95NB]]></ID>
1403 — <START UNITS="PERCENT" VALUE="87.9546864100771"/>

Figure 14

```xml
<?xml version="1.0" encoding="UTF-8"?>
<GRAPHICAL_NETWORK_DATA>
  <TIMESTAMP VALUE="01-Feb-2005 17:23:28 EST"/>
  <DATA>
    <TYPE>ROUTE</TYPE>
    <ID><![CDATA[476NextNB]]></ID>
    <NAME><![CDATA[PA Tpk Northeast Ext NB]]></NAME>
    <DESCRIPTION><![CDATA[between Mid-County Tolls and Mahoning Valley (#74)]]></DESCRIPTION>
    <IS_DIGITAL>false</IS_DIGITAL>
  </DATA>
  <DATA>
    <TYPE>ROUTE</TYPE>
    <ID><![CDATA[95SB_WH_676]]></ID>
    <NAME><![CDATA[I-95 SB]]></NAME>
    <DESCRIPTION><![CDATA[between Woodhaven Rd and Ramp to I-676/Vine St Exwy]]></DESCRIPTION>
    <PARENT_ID><![CDATA[95SB]]></PARENT_ID>
    <IS_DIGITAL>true</IS_DIGITAL>
    <TRAVEL_TIME UNITS="MINUTES" VALUE="15"/>
    <SPEED UNITS="MPH" VALUE="49"/>
    <DELAY UNITS="MINUTES" VALUE="2"/>
  </DATA>
  <DATA>
    <TYPE>ROUTE</TYPE>
    <ID><![CDATA[42 Freeway NB from AC Exwy to 295]]></ID>
    <NAME><![CDATA[42 Freeway NB]]></NAME>
    <DESCRIPTION><![CDATA[between Atlantic City Exwy and I-295]]></DESCRIPTION>
    <PARENT_ID><![CDATA[42NB]]></PARENT_ID>
    <IS_DIGITAL>false</IS_DIGITAL>
  </DATA>
  <DATA>
    <TYPE>ROUTE</TYPE>
    <ID><![CDATA[55NB]]></ID>
    <NAME><![CDATA[RT-55 NB]]></NAME>
    <DESCRIPTION><![CDATA[between RT-322 (#50) and RT-42]]></DESCRIPTION>
    <IS_DIGITAL>false</IS_DIGITAL>
  </DATA>
  <DATA>
    <TYPE>ROUTE</TYPE>
    <ID><![CDATA[76WB]]></ID>
    <NAME><![CDATA[Schuylkill Exwy WB]]></NAME>
    <DESCRIPTION><![CDATA[between Walt Whitman Brg and PA Tpk Tolls]]></DESCRIPTION>
    <IS_DIGITAL>true</IS_DIGITAL>
    <TRAVEL_TIME UNITS="MINUTES" VALUE="36"/>
    <SPEED UNITS="MPH" VALUE="37"/>
    <DELAY UNITS="MINUTES" VALUE="11"/>
  </DATA>
  <DATA>
    <TYPE>ROUTE</TYPE>
    <ID><![CDATA[76WB_95_676]]></ID>
    <NAME><![CDATA[Schuylkill Exwy WB]]></NAME>
    <DESCRIPTION><![CDATA[between Walt Whitman Brg and I-676/Vine Exwy]]></DESCRIPTION>
    <PARENT_ID><![CDATA[76WB]]></PARENT_ID>
    <IS_DIGITAL>true</IS_DIGITAL>
    <TRAVEL_TIME UNITS="MINUTES" VALUE="10"/>
    <SPEED UNITS="MPH" VALUE="29"/>
    <DELAY UNITS="MINUTES" VALUE="5"/>
  </DATA>
  <DATA>
    <TYPE>ROUTE</TYPE>
    <ID><![CDATA[476BRSB]]></ID>
    <NAME><![CDATA[I-476 / Blue Route SB]]></NAME>
    <DESCRIPTION><![CDATA[between PA Tpk Tolls and I-95]]></DESCRIPTION>
    <IS_DIGITAL>true</IS_DIGITAL>
    <TRAVEL_TIME UNITS="MINUTES" VALUE="32"/>
    <SPEED UNITS="MPH" VALUE="35"/>
    <DELAY UNITS="MINUTES" VALUE="12"/>
  </DATA>
```

1504 — `<ID><![CDATA[95SB_WH_676]]></ID>`
1505 — `<DESCRIPTION><![CDATA[between Woodhaven Rd and Ramp to I-676/Vine St Exwy]]></DESCRIPTION>`
1502 — `<IS_DIGITAL>true</IS_DIGITAL>`
1501 — `<SPEED UNITS="MPH" VALUE="49"/>`
1503 — `<DELAY UNITS="MINUTES" VALUE="2"/>`

Figure 15

```xml
<?xml version="1.0" encoding="UTF-8"?>
<GRAPHICAL_NETWORK_DATA>
  <TIMESTAMP VALUE="01-Feb-2005 17:23:27 EST"/>
  <DATA>
    <TYPE>FLOW</TYPE>
    <ID><![CDATA[476NextNB]]></ID>
    <NAME><![CDATA[PA Tpk Northeast Ext NB]]></NAME>
    <KEY_ROUTE_LENGTH UNITS="MILES" VALUE="24.544902342069868"/>
    <DESCRIPTION><![CDATA[between Mid-County Tolls and Mahoning Valley (#74)]]></DESCRIPTION>
    <SEGMENTS>
      <SEGMENT>
        <LENGTH UNITS="MILES" VALUE="24.544902342069868"/>
        <CONGESTION><![CDATA[green]]></CONGESTION>
        <START UNITS="PERCENT" VALUE="0.0"/>
        <START_GEOLOCATION LATITUDE="40.107555000000005" LONGITUDE="-75.28575"/>
        <END UNITS="PERCENT" VALUE="100.0"/>
        <END_GEOLOCATION LATITUDE="40.43886" LONGITUDE="-75.42656"/>
      </SEGMENT>
    </SEGMENTS>
  </DATA>
  <DATA>
    <TYPE>FLOW</TYPE>
    <ID><![CDATA[55NB]]></ID>
    <NAME><![CDATA[RT-55 NB]]></NAME>
    <KEY_ROUTE_LENGTH UNITS="MILES" VALUE="9.849338068058422"/>
    <DESCRIPTION><![CDATA[between RT-322 (#50) and RT-42]]></DESCRIPTION>
    <SEGMENTS>
      <SEGMENT>
        <LENGTH UNITS="MILES" VALUE="9.849338068058422"/>
        <CONGESTION><![CDATA[green]]></CONGESTION>
        <START UNITS="PERCENT" VALUE="0.0"/>
        <START_GEOLOCATION LATITUDE="39.71908551206389" LONGITUDE="-75.15395525140902"/>
        <END UNITS="PERCENT" VALUE="100.0"/>
        <END_GEOLOCATION LATITUDE="39.84737226472332" LONGITUDE="-75.09483004436201"/>
      </SEGMENT>
    </SEGMENTS>
  </DATA>
```

Figure 16A

```
<DATA>
  <TYPE>FLOW</TYPE>
  <ID><![CDATA[76WB]]></ID>
  <NAME><![CDATA[Schuylkill Exwy WB]]></NAME>
  <KEY_ROUTE_LENGTH UNITS="MILES" VALUE="23.11918274543741"/>
  <DESCRIPTION><![CDATA[between Walt Whitman Brg  and PA Tpk Tolls]]></DESCRIPTION>
  <SEGMENTS>
    <SEGMENT>
      <LENGTH UNITS="MILES" VALUE="15.556601731324413"/>
      <CONGESTION><![CDATA[green]]></CONGESTION>
1601  <START UNITS="PERCENT" VALUE="0.0"/>
      <START_GEOLOCATION LATITUDE="39.90972901923077" LONGITUDE="-75.15449640384617"/>
      <END UNITS="PERCENT" VALUE="67.28871821558883"/>
      <END_GEOLOCATION LATITUDE="40.06327551269178" LONGITUDE="-75.27570799214759"/>
    </SEGMENT>
    <SEGMENT>
      <LENGTH UNITS="MILES" VALUE="2.7841215973435225"/>
1602  <CONGESTION><![CDATA[yellow]]></CONGESTION>
      <START UNITS="PERCENT" VALUE="67.28871821558883"/>
      <START_GEOLOCATION LATITUDE="40.06327551269178" LONGITUDE="-75.27570799214759"/>
      <END UNITS="PERCENT" VALUE="79.3311923289654"/>
      <END_GEOLOCATION LATITUDE="40.06516919082" LONGITUDE="-75.32121359635555"/>
    </SEGMENT>
    <SEGMENT>
      <LENGTH UNITS="MILES" VALUE="4.778459416769476"/>
1603  <CONGESTION><![CDATA[green]]></CONGESTION>
      <START UNITS="PERCENT" VALUE="79.3311923289654"/>
      <START_GEOLOCATION LATITUDE="40.06516919082" LONGITUDE="-75.32121359635555"/>
      <END UNITS="PERCENT" VALUE="100.0"/>
      <END_GEOLOCATION LATITUDE="40.08794" LONGITUDE="-75.403535"/>
    </SEGMENT>
  </SEGMENTS>
</DATA>
```

Figure 16B

```xml
<?xml version="1.0" encoding="UTF-8"?>
<GRAPHICAL_NETWORK_DATA>
  <TIMESTAMP VALUE="01-Feb-2005 17:23:26 EST"/>
  <DATA>
    <TYPE>ITEM</TYPE>
    <ID><![CDATA[9178968]]></ID>
    <GEOLOCATION LATITUDE="40.0673164659521" LONGITUDE="-75.3075782723831"/>
    <DESCRIPTION><![CDATA[ slow approaching Conshohocken Curve to I-476/Blue Route]]></DESCRIPTION>
    <LOCATION><![CDATA[Schuylkill Exwy]]></LOCATION>
    <DIRECTION><![CDATA[Westbound]]></DIRECTION>
    <CRITICALITY><![CDATA[2]]></CRITICALITY>
    <ABBREVIATION><![CDATA[CONG]]></ABBREVIATION>
    <ZONE_ID><![CDATA[3]]></ZONE_ID>
    <ZONE_NAME><![CDATA[76/202/422]]></ZONE_NAME>
    <START_TIME VALUE="01-Feb-2005 15:02:00 -0500"/>
    <END_TIME VALUE="01-Feb-2005 17:42:54 -0500"/>
    <CONGESTION>
      <TRAVEL_TIME UNITS="MINUTES" VALUE="0"/>
      <SPEED UNITS="MPH" VALUE="49"/>
      <DELAY UNITS="MINUTES" VALUE="0"/>
    </CONGESTION>
    <ROUTE>
      <ID><![CDATA[76WB]]></ID>
      <NAME><![CDATA[Schuylkill Exwy WB]]></NAME>
      <DESCRIPTION><![CDATA[between Walt Whitman Brg  and PA Tpk Tolls]]></DESCRIPTION>
      <START UNITS="PERCENT" VALUE="76.14575587224327"/>
      <START_GEOLOCATION LATITUDE="40.0673164659521" LONGITUDE="-75.3075782723831"/>
      <END UNITS="PERCENT" VALUE="79.3311923289654"/>
      <END_GEOLOCATION LATITUDE="40.0673164659521" LONGITUDE="-75.3075782723831"/>
    </ROUTE>
  </DATA>
  <DATA>
    <TYPE>ITEM</TYPE>
    <ID><![CDATA[7955984]]></ID>
    <GEOLOCATION LATITUDE="39.9333" LONGITUDE="-75.20012"/>
    <DESCRIPTION><![CDATA[ between University Av and Vare Av - scheduled overnight bridge construction ]]></DESCRIPTION>
    <LOCATION><![CDATA[Schuylkill Exwy]]></LOCATION>
    <DIRECTION><![CDATA[Westbound]]></DIRECTION>
    <CRITICALITY><![CDATA[3]]></CRITICALITY>
    <ABBREVIATION><![CDATA[CONST]]></ABBREVIATION>
    <ZONE_ID><![CDATA[3]]></ZONE_ID>
    <ZONE_NAME><![CDATA[76/202/422]]></ZONE_NAME>
    <START_TIME VALUE="27-Jan-2005 20:00:00 -0500"/>
    <END_TIME VALUE="31-Mar-2005 20:30:00 -0500"/>
    <ROUTE>
      <ID><![CDATA[76WB]]></ID>
      <NAME><![CDATA[Schuylkill Exwy WB]]></NAME>
      <DESCRIPTION><![CDATA[between Walt Whitman Brg  and PA Tpk Tolls]]></DESCRIPTION>
      <START UNITS="PERCENT" VALUE="14.605955121949844"/>
      <START_GEOLOCATION LATITUDE="39.9333" LONGITUDE="-75.20012"/>
      <END UNITS="PERCENT" VALUE="15.371679613374791"/>
      <END_GEOLOCATION LATITUDE="39.9333" LONGITUDE="-75.20012"/>
    </ROUTE>
  </DATA>
  <DATA>
```

```
<DATA>
   <TYPE>ITEM</TYPE>
   <ID><![CDATA[9180595]]></ID>
   <GEOLOCATION LATITUDE="39.98418" LONGITUDE="-75.20824"/>
1705   <DESCRIPTION><![CDATA[ at Montgomery Dr - accident - Police on scene.]]></DESCRIPTION>
   <LOCATION><![CDATA[Schuylkill Exwy]]></LOCATION>
   <DIRECTION><![CDATA[Westbound]]></DIRECTION>
   <CRITICALITY><![CDATA[2]]></CRITICALITY>
1702   <ABBREVIATION><![CDATA[ACC]]></ABBREVIATION>
   <ZONE_ID><![CDATA[3]]></ZONE_ID>
   <ZONE_NAME><![CDATA[76/202/422]]></ZONE_NAME>
   <START_TIME VALUE="01-Feb-2005 16:24:00 -0500"/>
   <END_TIME VALUE="01-Feb-2005 17:42:53 -0500"/>
   <ROUTE>
      <ID><![CDATA[76WB]]></ID>
      <NAME><![CDATA[Schuylkill Exwy WB]]></NAME>
      <DESCRIPTION><![CDATA[between Walt Whitman Brg  and PA Tpk Tolls]]></DESCRIPTION>
1703   <START UNITS="PERCENT" VALUE="34.969985207511264"/>
1704   <START_GEOLOCATION LATITUDE="39.98418" LONGITUDE="-75.20824"/>
      <END UNITS="PERCENT" VALUE="38.232281653333409"/>
      <END_GEOLOCATION LATITUDE="39.98418" LONGITUDE="-75.20824"/>
   </ROUTE>
</DATA>
```

Figure 17B

```xml
<?xml version="1.0" encoding="UTF-8"?>
<GRAPHICAL_NETWORK_DATA>
  <TIMESTAMP VALUE="20-Aug-2004 10:06:44 EDT"/>
  <DATA>
    <TYPE>POINT</TYPE>
    <ORDER_NUMBER>0</ORDER_NUMBER>
    <ID><![CDATA[18]]></ID>
    <DESCRIPTION><![CDATA[PA-452/MARKET ST/EXIT 2]]></DESCRIPTION>
    <ROUTE>
       <ID><![CDATA[95NB]]></ID>
       <NAME><![CDATA[I-95 NB]]></NAME>
       <DESCRIPTION><![CDATA[I-95 NB]]></DESCRIPTION>
       <START UNITS="PERCENT" VALUE="0.0"/>
       <GEOLOCATION LATITUDE="39.83171" LONGITUDE="-75.42751"/>
    </ROUTE>
  </DATA>
  <DATA>
    <TYPE>POINT</TYPE>
    <ORDER_NUMBER>1</ORDER_NUMBER>
    <ID><![CDATA[996]]></ID>
```
1801 `<DESCRIPTION><![CDATA[Ramp to RT-322 West]]></DESCRIPTION>`
```xml
    <ROUTE>
```
1802 `   <ID><![CDATA[95NB]]></ID>`
```xml
       <NAME><![CDATA[I-95 NB]]></NAME>
       <DESCRIPTION><![CDATA[I-95 NB]]></DESCRIPTION>
```
1803 `   <START UNITS="PERCENT" VALUE="1.4936731188340289"/>`
```xml
       <GEOLOCATION LATITUDE="39.834745" LONGITUDE="-75.42228"/>
    </ROUTE>
  </DATA>
  <DATA>
    <TYPE>POINT</TYPE>
    <ORDER_NUMBER>2</ORDER_NUMBER>
    <ID><![CDATA[1231]]></ID>
    <DESCRIPTION><![CDATA[RT-322]]></DESCRIPTION>
    <ROUTE>
       <ID><![CDATA[95NB]]></ID>
       <NAME><![CDATA[I-95 NB]]></NAME>
       <DESCRIPTION><![CDATA[I-95 NB]]></DESCRIPTION>
       <START UNITS="PERCENT" VALUE="1.4936731188340289"/>
       <GEOLOCATION LATITUDE="39.834745" LONGITUDE="-75.42228"/>
    </ROUTE>
  </DATA>
  <DATA>
    <TYPE>POINT</TYPE>
    <ORDER_NUMBER>3</ORDER_NUMBER>
    <ID><![CDATA[19]]></ID>
    <DESCRIPTION><![CDATA[US-322/HIGHLAND AVE/EXIT 3]]></DESCRIPTION>
    <ROUTE>
       <ID><![CDATA[95NB]]></ID>
       <NAME><![CDATA[I-95 NB]]></NAME>
       <DESCRIPTION><![CDATA[I-95 NB]]></DESCRIPTION>
       <START UNITS="PERCENT" VALUE="3.156496551056667"/>
       <GEOLOCATION LATITUDE="39.8391" LONGITUDE="-75.40875"/>
    </ROUTE>
  </DATA>
  <DATA>
    <TYPE>POINT</TYPE>
    <ORDER_NUMBER>4</ORDER_NUMBER>
    <ID><![CDATA[998]]></ID>
    <DESCRIPTION><![CDATA[RT-322 On Ramp]]></DESCRIPTION>
    <ROUTE>
       <ID><![CDATA[95NB]]></ID>
       <NAME><![CDATA[I-95 NB]]></NAME>
       <DESCRIPTION><![CDATA[I-95 NB]]></DESCRIPTION>
       <START UNITS="PERCENT" VALUE="4.470482214458274"/>
       <GEOLOCATION LATITUDE="39.8424832702231" LONGITUDE="-75.398532006649"/>
    </ROUTE>
  </DATA>
```

Figure 18

Cameras for 3D Products
3D Flythrough Camera
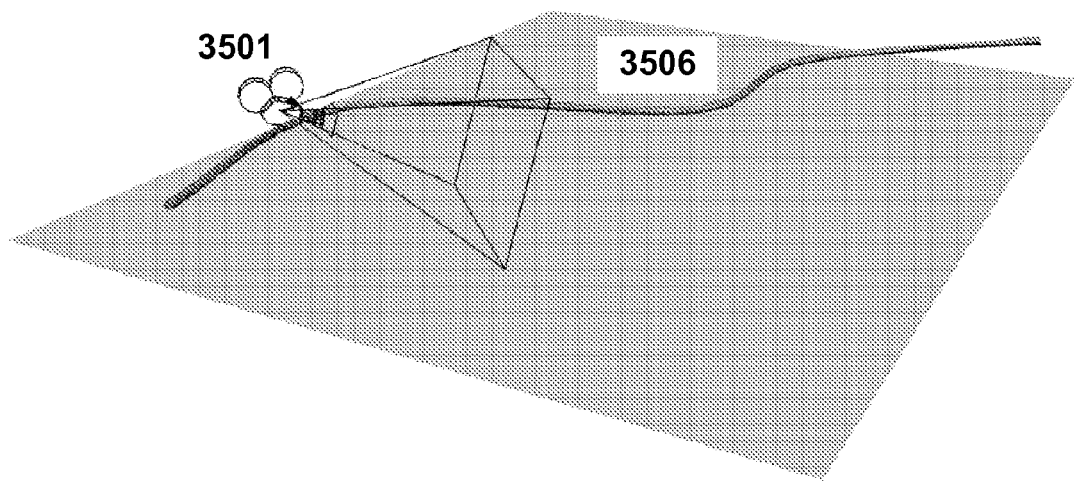
Skyview Camera
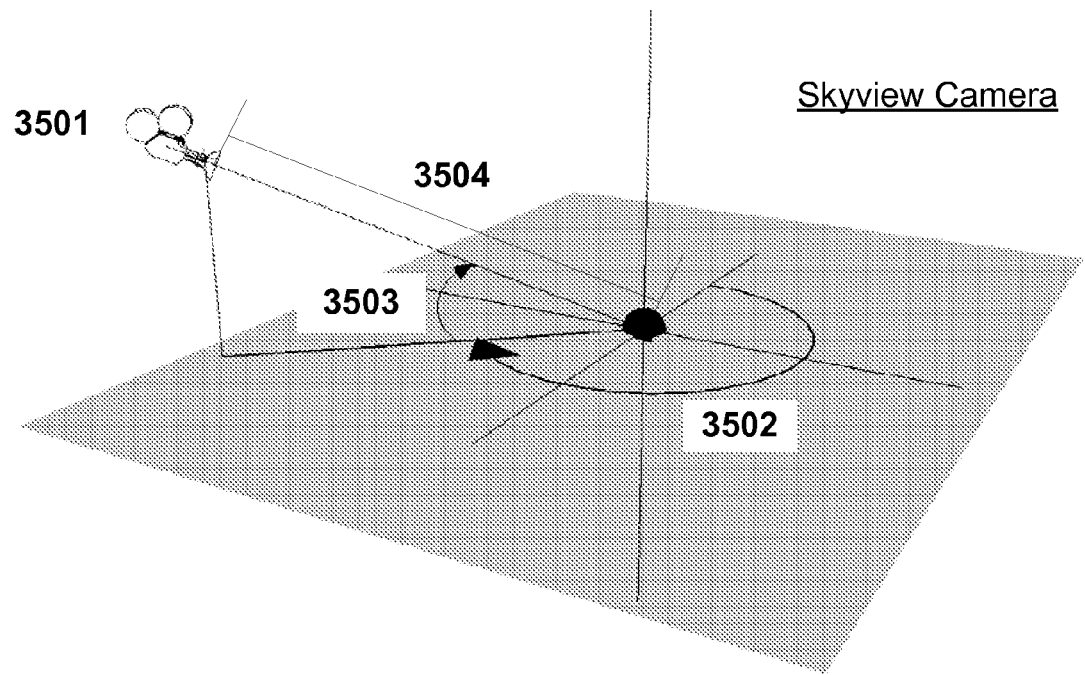
Figure 35

1

DATA-DRIVEN 3D TRAFFIC VIEWS WITH THE VIEW BASED ON USER-SELECTED START AND END GEOGRAPHICAL LOCATIONS

CROSS REFERENCE TO RELATED APPLICATION

This application is a continuation of U.S. patent application Ser. No. 11/405,228. U.S. patent application Ser. No. 11/405,228 claims the benefit of U.S. Provisional Patent Application No. 60/672,413 filed Apr. 18, 2005 and entitled "Data-Driven 3-D Traffic Views and Traffic/Weather Views."

This application is related to the following copending U.S. applications:

1. U.S. application Ser. No. 11/405,653 filed Apr. 17, 2006 entitled "DATA-DRIVEN COMBINED TRAFFIC/WEATHER VIEWS."
2. U.S. application Ser. No. 11/405,237 filed Apr. 17, 2006 entitled "DATA-DRIVEN TRAFFIC VIEWS WITH THE VIEW BASED ON A USER-SELECTED OBJECT OF INTEREST."
3. U.S. application Ser. No. 11/405,216 filed Apr. 17, 2006 entitled "DATA-DRIVEN TRAFFIC VIEWS WITH CONTINUOUS REAL-TIME RENDERING OF TRAFFIC FLOW MAP."
4. U.S. application Ser. No. 11/405,214 filed Apr. 17, 2006 entitled "DATA-DRIVEN TRAFFIC VIEWS WITH KEY-ROUTE STATUS."

COPYRIGHT NOTICE AND AUTHORIZATION

Portions of the documentation in this patent document contain material that is subject to copyright protection. The copyright owner has no objection to the facsimile reproduction by anyone of the patent document or the patent disclosure as it appears in the Patent and Trademark Office file or records, but otherwise reserves all copyright rights whatsoever.

BACKGROUND TO THE INVENTION

Commuters and transportation service companies have long desired to receive traffic reports that provide detailed traffic information than the generalized information (e.g., I-95 is backed up, I-495 is jammed) given with most conventional traffic reports broadcast by media outlets today. Traffic service providers such as Traffic.com, Inc. have developed highly sophisticated traffic reporting systems that now deliver such detailed information in a real-time manner. Nonetheless, there is still a need to improve upon such services to provide enhanced traffic reporting capabilities to media outlets for delivery to their customers. The present invention addresses such a need.

BRIEF SUMMARY OF THE INVENTION

Different preferred embodiments of the present invention provide at least the following capabilities:

1. Integration of weather data and weather conditions into graphical maps of road systems.
2. Instant creation of graphical maps that show traffic flow data related to user-selected objects of interest.
3. Viewing of traffic data along a particular travel route in a 3D flythrough mode with user control of the flythrough process.
4. Creation of an animated traffic flow map that is continuously rendered in real time, wherein the traffic flow map immediately reflects the updated traffic data.
5. Processes for defining congestion status along a keyroute (i.e., one or more contiguous road segments).
6. Different zoom levels of a graphical map of a road system that presents key information in a manner that is easy to comprehend.
7. A single display screen that shows continuously updated, real-time status of traffic flow data on one or more keyroutes, wherein the status is continuously updated on the single display screen.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

FIGS. 14-18 show different types of traffic information that can be downloaded via a TV data feed for use with the present invention.

FIGS. 34-35 show the camera generation process used in the present invention.

DETAILED DESCRIPTION OF THE INVENTION

Figure 1:
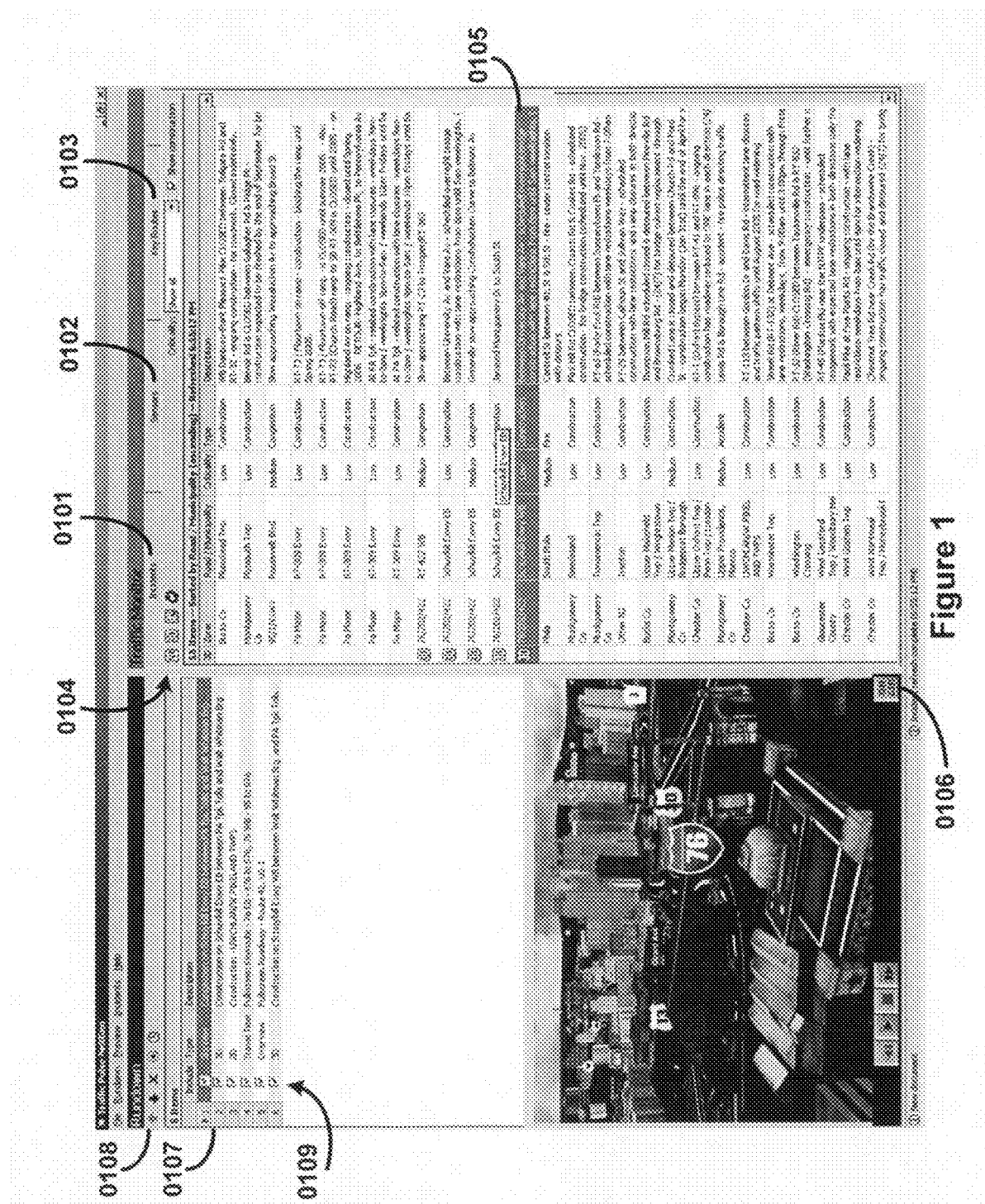
FIGS. 1-6 show user interface displays for use with the present invention.

Certain terminology is used herein for convenience only and is not to be taken as a limitation on the present invention. In the drawings, the same reference letters are employed for designating the same elements throughout the several figures.

The NeXGen™ software application (NeXGen) described herein utilizes real time traffic data to create and display data-driven maps and informational graphics of traffic conditions on a road system for display on a video device. With the NeXGen software application, traffic maps or informational graphics do not need to be pre-rendered into movies, thus providing a dynamic view of traffic data on a road system. Specifically, 2D or 3D traffic maps or informational graphics will change as traffic data changes in real-time. Also, with the NeXGen software, the show content is dynamically created to best illustrate the traffic data that the user selects. For example, a 2D map is created centered on an accident location with an icon illustrating the position of the accident and the related congestion. Furthermore, the system can also show the interaction between weather and traffic. This is done by showing weather conditions and traffic conditions on the same maps to show where bad weather is causing traffic problems.

I. Definitions

The following definitions are provided to promote understanding of the invention.

VGSTN: The virtual geo-spatial traffic network is a server side application responsible for collecting and disseminating traffic information from a variety of sources. The VGSTN provides all real time traffic data to the NeXGen application. One preferred embodiment of the VGSTN is provided in U.S. Patent Application Publication No. 2004/0143385 (Smyth et al.), which is incorporated by reference herein. This patent publication also provides a description of the VGSTN and the Traffic Information Management System ("TIMS") used with the VGSTN, both of which are components of the present invention.

Traffic Data: Traffic related information that the VGSTN generates, stores and reports to the end user or application through a variety of means. Traffic data may include travel time, delay time, speed, and congestion data. Traffic data may be the same as the traffic information once inside the VGSTN.

Road System: The actual, physical network of roads.

Traffic Event: An occurrence on the road system which may have an impact on the flow of traffic. Traffic events include incidents, weather, construction and mass transit.

Incident: A traffic event which is generally caused by an event, planned or unplanned, which directly or indirectly obstructs the flow of traffic on the road system or is otherwise noteworthy in reference to traffic. Incidents are generally locatable at a specific point or across a span of points. Some examples of incidents include: accidents, congestion, construction, disabled vehicles, and vehicle fires.

Sensor Data: The data collected from roadway sensors. These sensors can be point detector sensors, toll-tag readers, etc, including probe data, where probe data is point data collected from a moving vehicle. Sensor Data indicates some combination of a vehicles' speeds, volume, occupancy (% of time a vehicle is located over a point), classification volumes (i.e., truck count, etc), or calculated derivative data (e.g., speed relative to normal).

Traffic Information: Information about traffic events which is input to the Traffic Incident Management System (TIMS) part of the VGSTN by the traffic operator. Traffic information includes details of incidents, congestion, weather and other traffic events. Traffic information may be entered according to traffic parameters.

Traffic Parameter: A specific detail about a traffic event, including location, police presence, injuries, damage, occurrence time, cleared time, etc.

Traffic Flow Data: Digital data collected from independent road sensors or from human observations describing the interruption of the traffic movement. This may include some combination of Sensor Data or congestion data and can also include calculated derivative data (for example, travel time/ speed relative to historical data).

Traffic Operator: A person who gathers and enters traffic information. The traffic information may be collected through any number of traditional methods, including conversing with surveillance aircraft or vehicles and monitoring emergency scanner frequencies.

Graphical Map: A graphical representation of the road system.

II. Overview of Present Invention

In one preferred embodiment of the present invention, a 2D or 3D graphical map of a road system simultaneously displays traffic data representing traffic conditions on the road system, and weather data. The traffic data may be traffic flow data associated with respective road segments, and the weather data may be weather conditions.

In another preferred embodiment of the present invention, traffic flow data representing traffic conditions on a road system is displayed on a graphical map. The road system encompasses a predefined geographical region. A user selects an object of interest within the geographical region. The object of interest has a corresponding geographical location. The graphical map is created in a manner such that it includes, and optionally, is centered around, the geographical location of the user-selected object of interest. The graphical map may be a 3D graphical map which may be rotated around, or zoomed toward or away from, the user-selected object of interest. The view angle with respect to the ground plane may also be adjusted while maintaining focus on the object of interest. A user may select a start geographical location and an end geographical location, and a 3D animated flythrough graphical map may be created and displayed beginning at the start geographical location and navigating toward the end geographical location, wherein the 3D traffic flow data is continuously displayed during the flythrough. The start and end locations may represent a keyroute. The flythrough may be stopped at a point between the start and end geographical location while continuously displaying the 3D traffic flow data, even though the flythrough has stopped.

In another preferred embodiment of the present invention, traffic flow data is displayed on a graphical map of a road system. The graphical map includes one or more segments, and the traffic flow data represents traffic conditions on a road system. A status of each segment on the graphical map is determined, the status corresponding to the traffic flow data associated with that segment. An animated traffic flow map of the road system is created by combining the graphical map and the status of each segment. The animated traffic flow map is created by being continuously rendered in real time. The traffic flow data is updated in real-time such that the traffic flow map immediately reflects the updated traffic data.

In another preferred embodiment of the present invention, traffic flow data representing traffic conditions on a road system is displayed on a graphical map, wherein the graphical map includes one or more keyroutes, each keyroute being defined by one or more contiguous road segments. Congestion status of the one or more keyroutes is determined. The congestion status corresponds to traffic flow data associated with the one or more segments of each respective keyroute. The congestion status is defined by partitioning the keyroute into one or more congestion segments. Each congestion segment is defined in terms of a percentage range of the keyroute from the start of the keyroute. Each congestion segment thus has a congestion status. The traffic flow data on the graphical map of the road system displays the congestion status of the one or more keyroutes. The graphical map of the road system may be provided in either a 2D or 3D view, and each keyroute may be animated to reflect its respective status by simulating different vehicle speeds that are representative of actual vehicle speeds.

In another preferred embodiment of the present invention, traffic flow data is displayed on a graphical map of a road system. The graphical map includes one or more segments, and the traffic flow data represents traffic conditions on a road system. A plurality of identification objects to be shown at fixed positions in the graphical map are defined, and a plurality of different views of the graphical map are defined. Each identification object is coded to be either displayed or not displayed for each of the different views. A status of each segment on the graphical map is determined, and the status corresponding to the traffic flow data is associated with that segment. A view of the graphical map is selected. The selected view determines which identification objects will appear in the graphical map. An animated traffic flow map of the road system is then created by combining the graphical map having the corresponding identification objects, and the status of each segment. The identification objects may include road shields, geographic labels, and secondary roads. At least some of the different views are predefined zoom levels.

In another preferred embodiment of the present invention, traffic flow data representing real-time traffic conditions of one or more keyroutes on a road system is displayed. Each keyroute is defined by one or more contiguous road segments. First, one or more keyroutes is selected. Second, the real-time status of each keyroute is determined. The real-time status corresponds to the traffic flow data associated with that keyroute. Third, a single display screen displays keyroute identifying information for each selected keyroute, and its real-time status, wherein the status is continuously updated on the single display screen. The traffic flow data may represent average vehicle speeds, average travel time, or average delay time along the keyroute. The keyroute identifying information may include a roadway's name and/or route shield. The size of the displayed information on the single display screen may be automatically adjusted for each keyroute based on the number of selected keyroutes, such that a greater number of selected keyroutes causes the size of the displayed information for each keyroute to be decreased.

III. Detailed Disclosure

1. Video Output

The NeXGen system renders each frame of the animated video output in real time. The term "render" is used in the 3D computer graphics sense of the term where it is defined as follows: Rendering is the process of generating an image from a description of three dimensional objects, by means of a software program. (See, Wikipedia, The Free Encyclopedia; on Computer rendering.) In a more technical fashion, "render" is described as, "The process of converting the polygonal or data specification of an image to the image itself, including color and opacity information." (See, HyperVis (A project of the Association for Computing Machinery SIGGRAPH Education Committee, the National Science Foundation), and the Hypermedia and Visualization Laboratory, Georgia State University). These frames are produced and played in an NTSC video format at a sufficient rate such that the objects in the frames appear to move, thereby creating animation. This is substantially different from previous systems. In many TV graphics animation systems (including traffic and weather systems), the frames were rendered into a movie and then the movie or movies were played in sequence to produce a traffic report. This two-step process had obvious disadvantages. The rendering process could take about a minute for a simple looping 2D map to 15 minutes for a complicated 3D world fly-through. Therefore, when the movies are played in the second step, the data, which may have been current when the movie was made, was now somewhat stale. One example of a system that renders in this manner is described in U.S. Patent Publication No. 2004/0046759 (Soulchin et al.), which is incorporated by reference herein.

Figure 9:
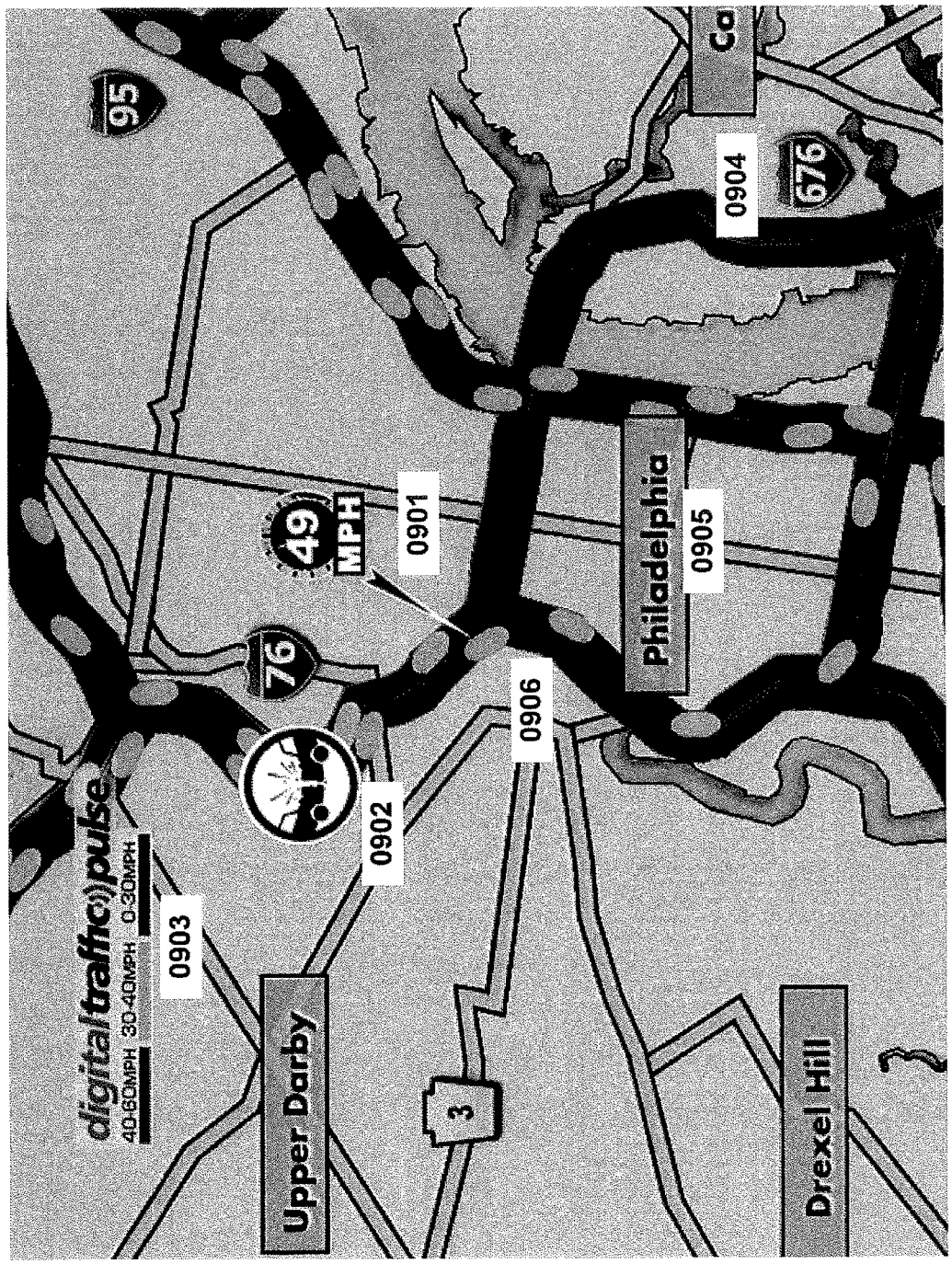
FIG. 9 is a 2D overhead map generated by the present invention.

There is only one step in NeXGen system. The image is rendered from the data and displayed, and then the next image is rendered and played, etc. There is no long waiting time while the frames are grouped into a movie file and then played. Therefore, in NeXGen, when new data arrives, it is immediately incorporated into the images and is displayed. For example, FIG. 9 displays a sensor speed 0901. When new data arrives that changes the value from 49 mph to a different value while the map in FIG. 9 is being displayed, the numerals that are displayed will visually change immediately. This real-time data display update is a key feature of NeXGen and is available in all of the VGSTN data driven elements of the various maps and graphics.

2. Video Output Types

The NeXGen software application according to the present invention produces video output in a variety of formats. Among these formats is a 2 dimensional overhead map as seen in FIG. 9. The NeXGen user interface provides real time traffic data to the user which can be in the form of Traffic Incidents or Sensor Data. This data can then be selected by the user to create a 2D map. A user can select a piece of this data, select "create as 2D map" and the application will build a map around it. FIG. 9 shows a 2D map created with sensor data from a section of Interstate 76. The NeXGen application generates this map with the sensor data located at the center point 0901. A user may choose to include other incident or sensor data in this map, as seen in 0902, by selecting it from the Edit Map dialog box. The map can also be adjusted by panning it in any direction or by zooming it in or out.

Traffic flow data controls the graphical representation of vehicles on the map. Vehicle color (e.g., red, yellow, and green), animation speed and proximity to one another are dictated by this data 0906. For example, speeds of 0 to 30 miles an hour cause a vehicle to be displayed as red; speeds of 30 to 40 miles an hour cause a vehicle to be displayed as yellow; and speeds of 40 to 60+ miles an hour cause a vehicle to be displayed as green. The specific speed ranges can be controlled by the user through a configuration file. Also, red vehicles move slowly, yellow vehicles move at moderate speed and green vehicles move quickly. Finally, slow moving, red vehicles appear densely packed together; moderate speed, yellow vehicles are less densely situated; and fast moving, green vehicles are sparsely positioned.

Incident data, if selected, is displayed on a 2D map as icons denoting traffic events. These include but are not limited to vehicle accidents, vehicle fires, disabled vehicles, construction events and sporting events. An incident 0902 will be displayed as an icon depicting the specific traffic event it represents. Sensor Data 0901 is displayed on a map in real time, updating the numeric indicator of average vehicle speed, in miles per hour, on a specific roadway. Other forms of Sensor Data could also be displayed such as: volume, occupancy, truck volume or calculated derivative data (e.g., speed relative to normal). As mentioned above, incident and sensor data can be used as the focal or center point from which a map is created and may also be used to provide more detail to the map. Banners 0903 can be displayed on a map to show a product name or other textual/graphic information desired by a customer. Road shields 0904 and city tags 0905 are displayed on the map to provide easily identifiable markers for viewers.

Figure 8:
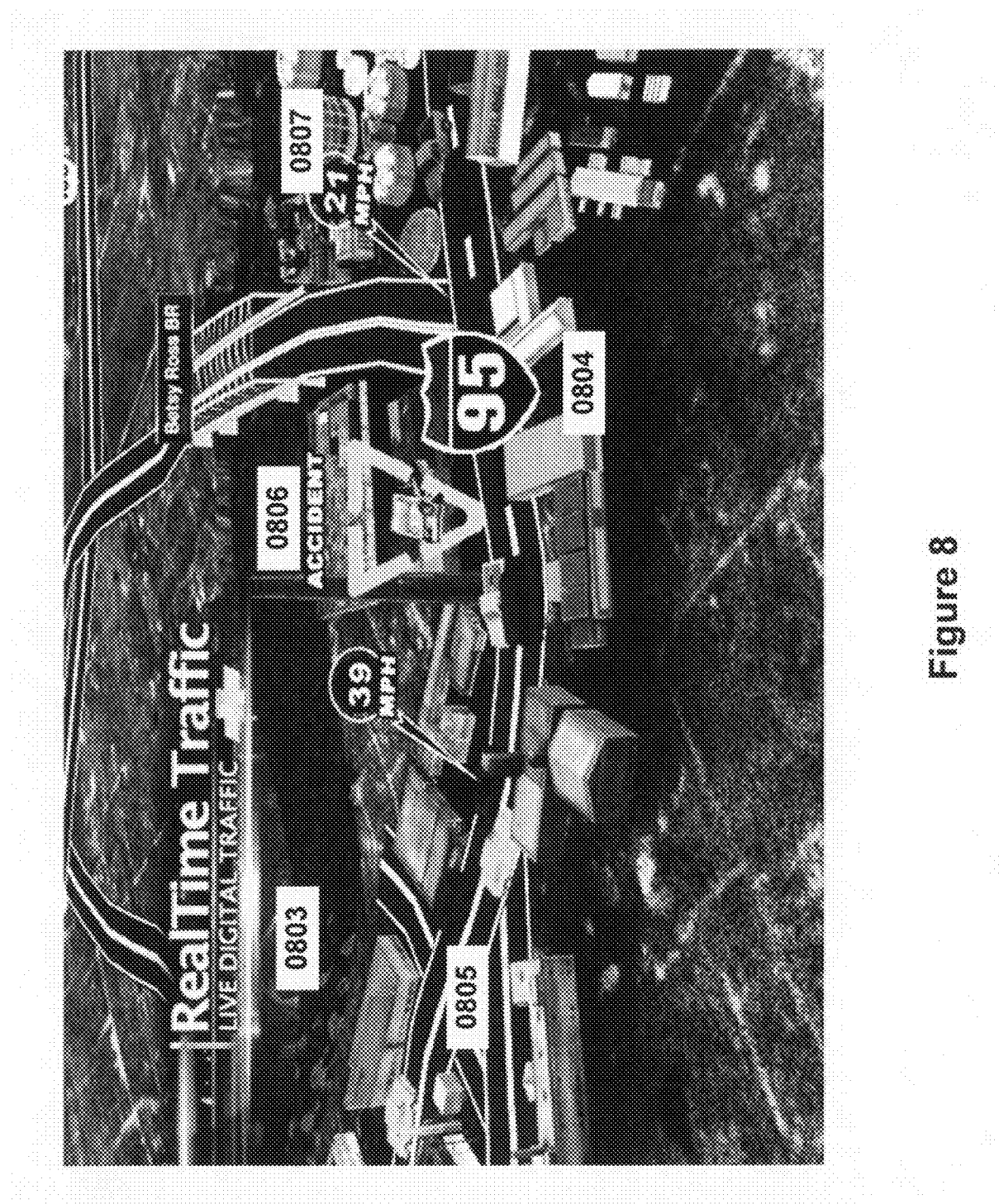
FIG. 8 shows a Skyview map generated by the present invention.

A Skyview map is another format of the NeXGen application's video output. See FIG. 8. A Skyview map is a 3D representation of a traffic map. Similar in structure to the aforementioned 2D map, the Skyview map adds model landmarks and terrain. A movable camera also allows a user, at map creation, to rotate and tilt the view of the map for a desired presentation. (In FIG. 8, the view is not parallel to the I-95 road, but rather is perpendicular to it.) These adjustments can also be made while On-Air. As with the 2D map, a Skyview map is created by selecting a piece of incident or sensor data from the NeXGen user interface 0806. This piece of data will become the center point around which the Skyview map is created. Additional Incident and Sensor Data can then be added by selecting it from a dialog box at map creation to provide more detail to the map 0807. Banners 0803 can be displayed on a map to show a product name or other textual/graphic information desired by a customer. Road shields/signs and city tags 0804 are displayed on the map to provide easily identifiable markers for viewers. Traffic Flow, as described above, is also displayed in a Skyview map. However, vehicles representing flow are displayed in 3D. Vehicles are modeled to resemble cars, trucks, buses, etc. 0805.

Figure 7:
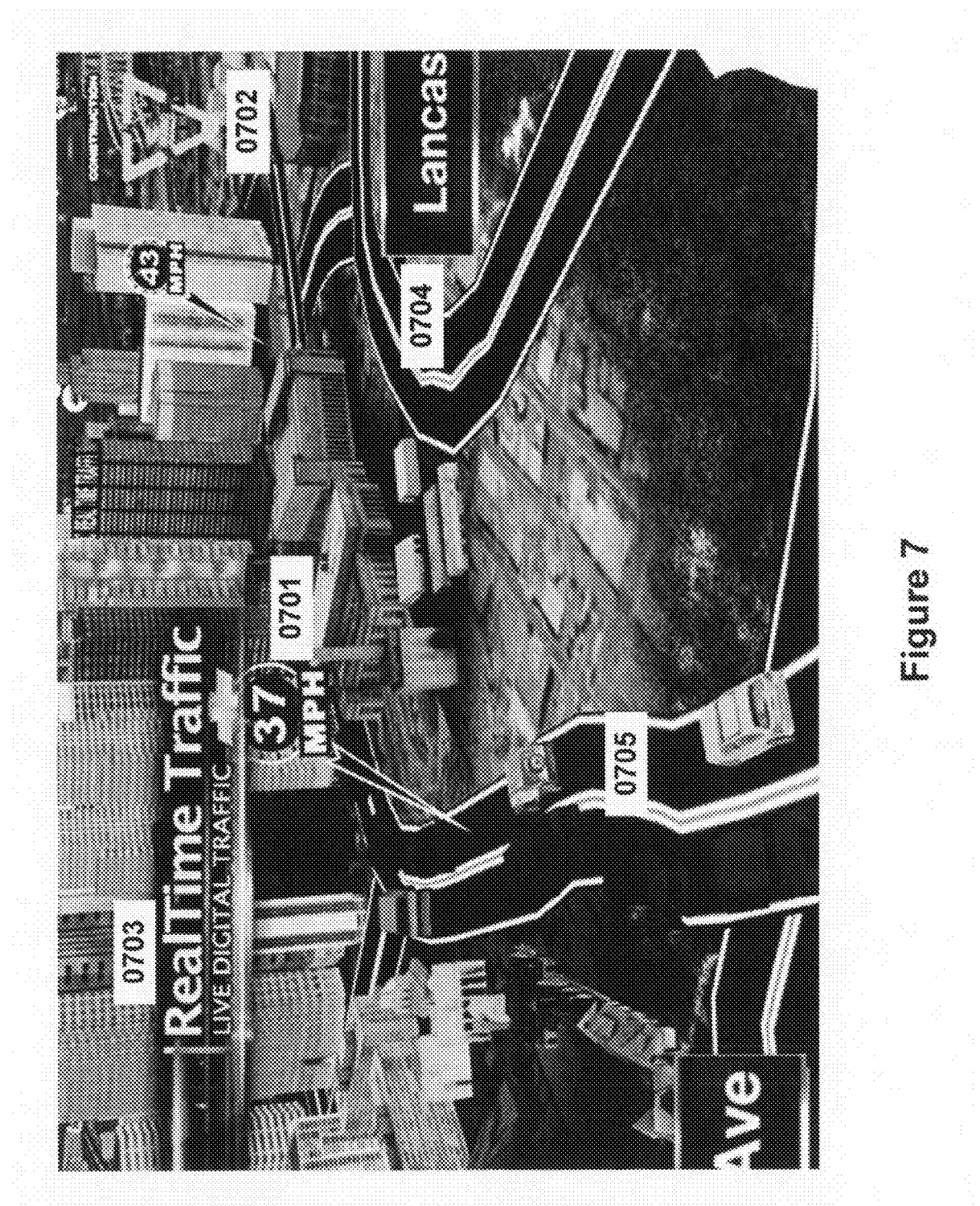
FIG. 7 shows a 3D fly-through map generated by the present invention.

A 3D fly-through map is a dynamic presentation of a 3D world detailing traffic conditions along a predefined roadway or series of roadways. Fly-through routes are generally created for traffic-notable areas and include easily recognizable landmarks (see FIG. 7). Incident 0702 and sensor data 0701 can be added by selecting it from a dialog box at map creation to provide more detail to the map. Banners 0703 can be displayed on a map to show a product name or other textual/graphic information desired by a customer. Road shields/signs and city tags 0704 are displayed on the map to provide easily identifiable markers for viewers. Traffic flow is displayed in a fly-through in the same manner as the aforementioned Skyview map 0705. The view moves along this route showing the traffic data and the 3D world objects. Thus, the 3D flythrough is different from the Skyview in that in a 3D flythrough, the camera moves, but the view is nominally in the direction of the traffic flow being illustrated.

Figure 11:
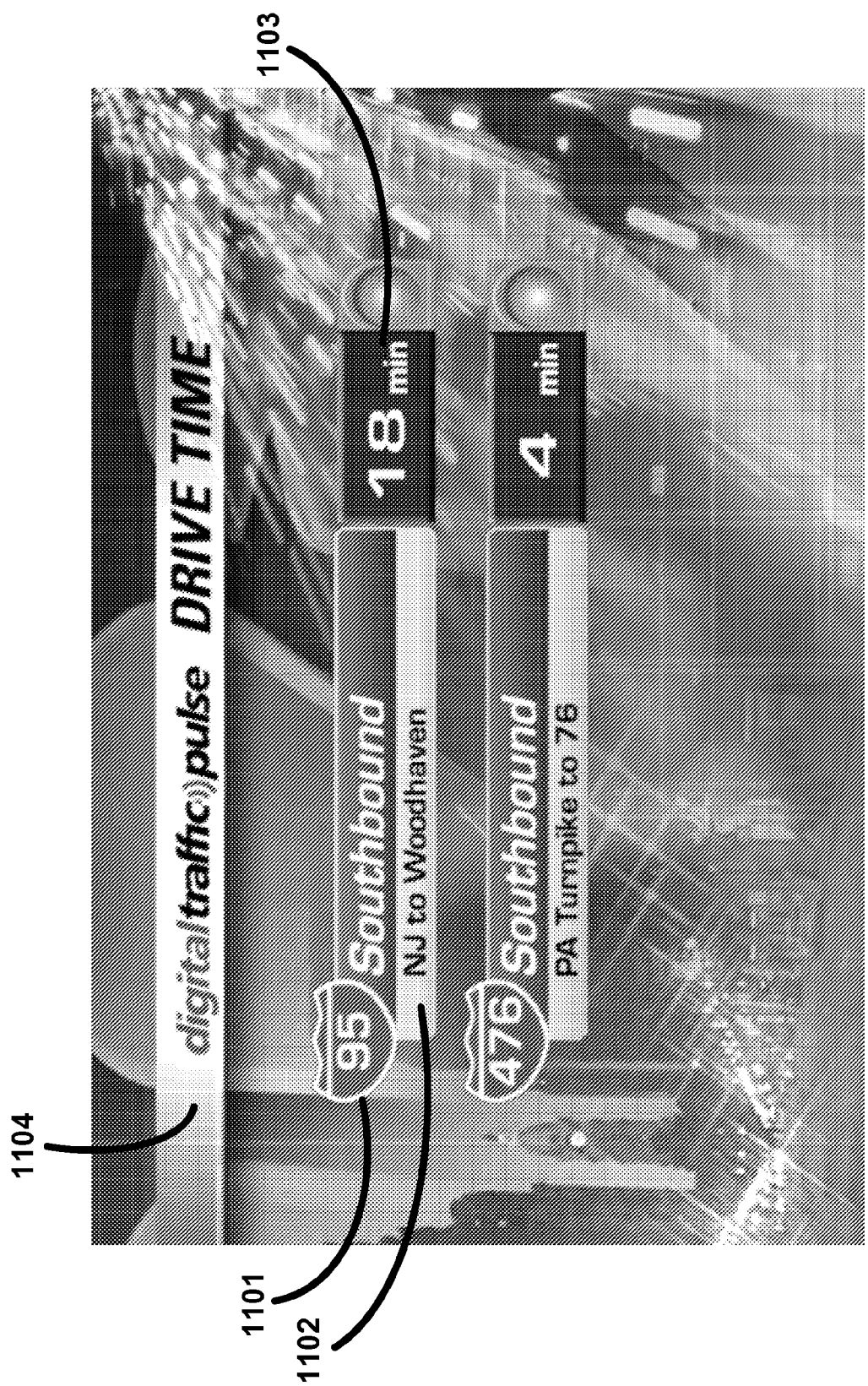
FIG. 11 is a Travel Time graphic representation of the time needed to traverse a predefined stretch of a roadway.

A Travel Time graphic (FIG. 11) is a graphic representation of the time needed to traverse a predefined stretch of a roadway. The graphic displays a roadway's name/route shield 1101 and the stretch covered 1102. Various animation effects can be added to attract a viewer's attention. For example, a slide out animation reveals the numerals for the time needed for travel between the stretch's two points 1103. Average speed and delay time information can also be displayed for the route. Adding display of other VGSTN data is within the scope of this invention. If enough other data is added, it also could be separated into a new type of 2D graphic. There also can be combination of products like a 2D map overlaid with this type of data. A banner 1104 can be displayed to show a product name or other textual/graphic information desired by a customer.

Figure 10:
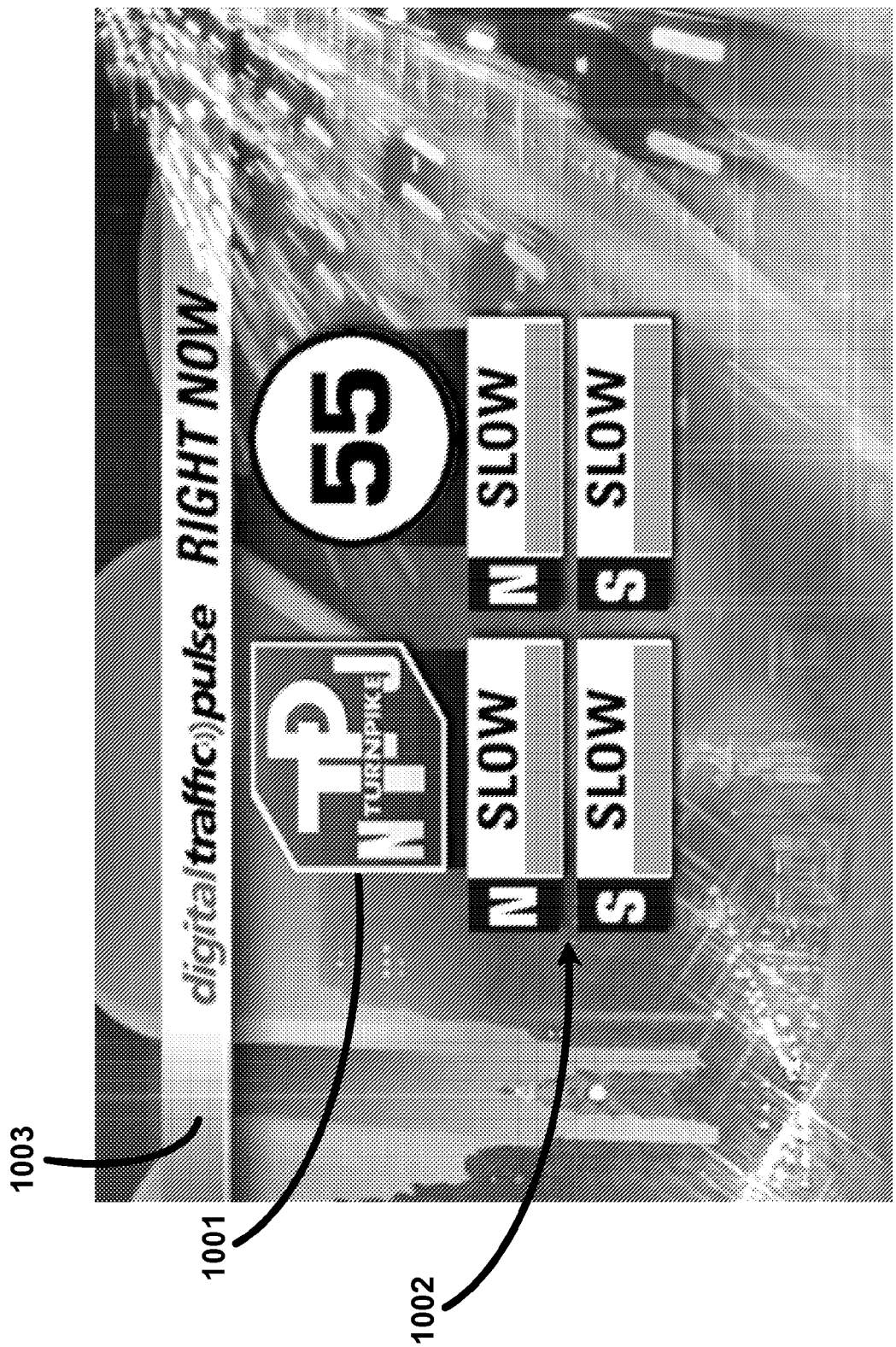
FIG. 10 is an Overview graphic generated by the present invention that provides a graphic representation of current traffic conditions on a predefined roadway.

The last NeXGen graphic is the Overview (FIG. 10). It is a graphic representation of current traffic conditions on a predefined roadway. The graphic displays a roadway's shield 1001 and the traffic conditions existing in its two directions of travel 1002. A banner 1003 can be displayed to show a product name or other textual/graphic information desired by a customer.

Figure 21:
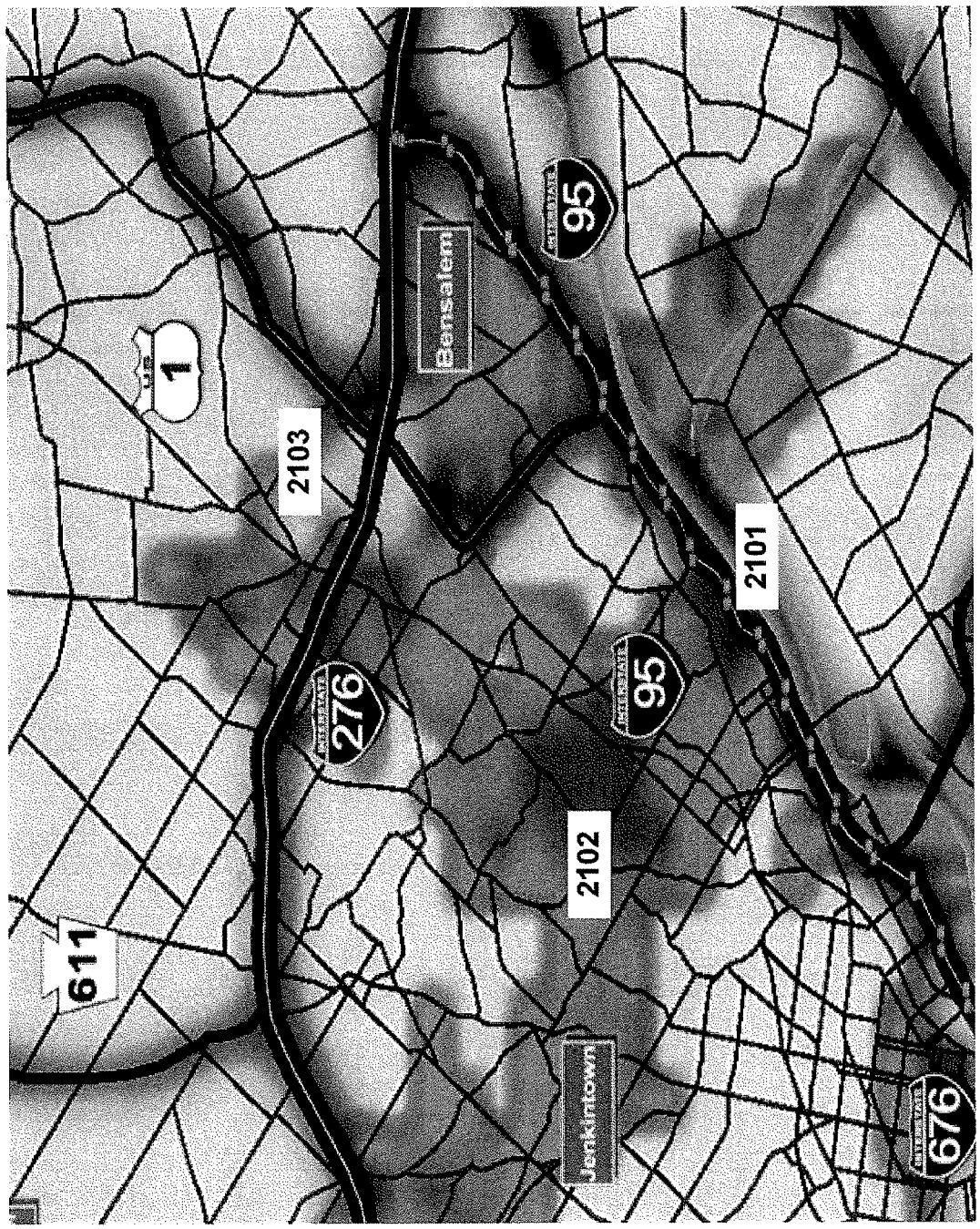
FIG. 21 shows a 2D map generated by the present invention that simultaneously depicts traffic and weather conditions.

The system can also optionally display weather conditions on the various map formats to show where weather conditions are causing undesirable traffic conditions (see FIG. 21). The system displays the weather data as a visual layer over the map background effect under the normal map annotations showing where the weather conditions are occurring 2101. Therefore, all of the traffic information can still be seen in the product, but the view is augmented by the addition of the weather information. The depicted embodiment shows precipitation information, but other information (snow coverage, temperature, etc.) may be shown within the scope of this invention.

Figure 22:
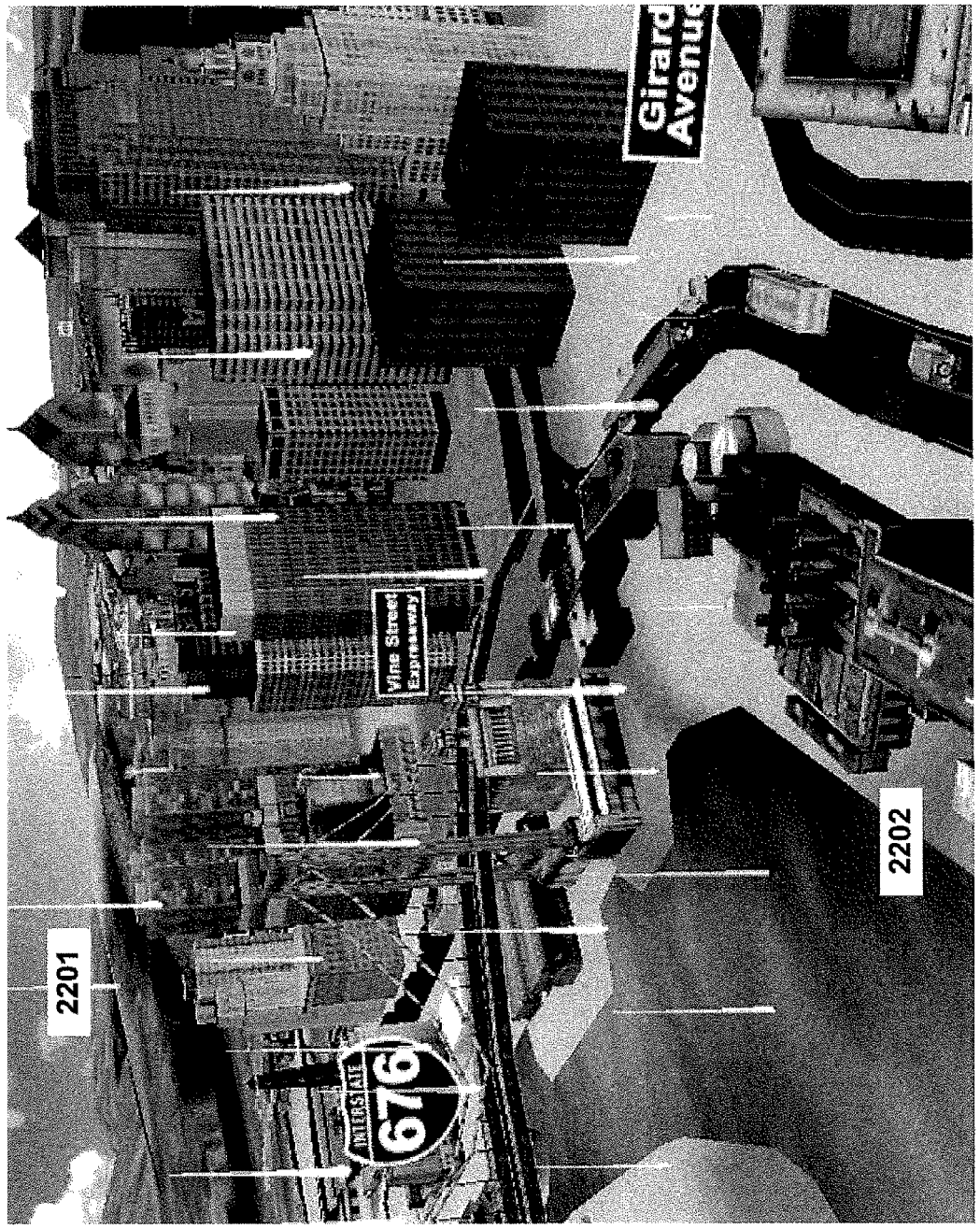
FIG. 22 shows a 3D map generated by the present invention that simultaneously depicts traffic and weather conditions.

The system shows the precipitation by using a radar image that shows locations as colored according to the precipitation intensity. For example, locations with no precipitation have no colors added. Locations with low intensity have blue or green colors 2102. Locations with higher intensity have yellow or orange colors 2103. Locations with the highest intensity have red and violet colors. For the 3D products (3D flythrough and SkyView), the same graphical data underlay is used over the terrain and under the roads, signs, landmark models, etc. (see FIG. 22). However in 3D, the actual precipitation is also shown. For example if it is raining, actual rain drops 2201 are seen falling in the 3D world at the precipitation locations. The density of the snowflakes is varied based on the precipitation intensity information.

3. User Interface

NeXGen allows a user to view traffic information and create maps or graphics through the user interface shown in FIG. 1. Referring again to FIG. 1, the Traffic Monitor categorizes traffic information according to Incidents 0101, Sensors 0102, and Key Routes 0103. This real time information is delivered to the NeXGen application from the VGSTN. Incident, Sensor and KeyRoute traffic data can be refreshed automatically at intervals ranging from 30 seconds to 5 minutes or invoked manually by the user.

Figure 4:
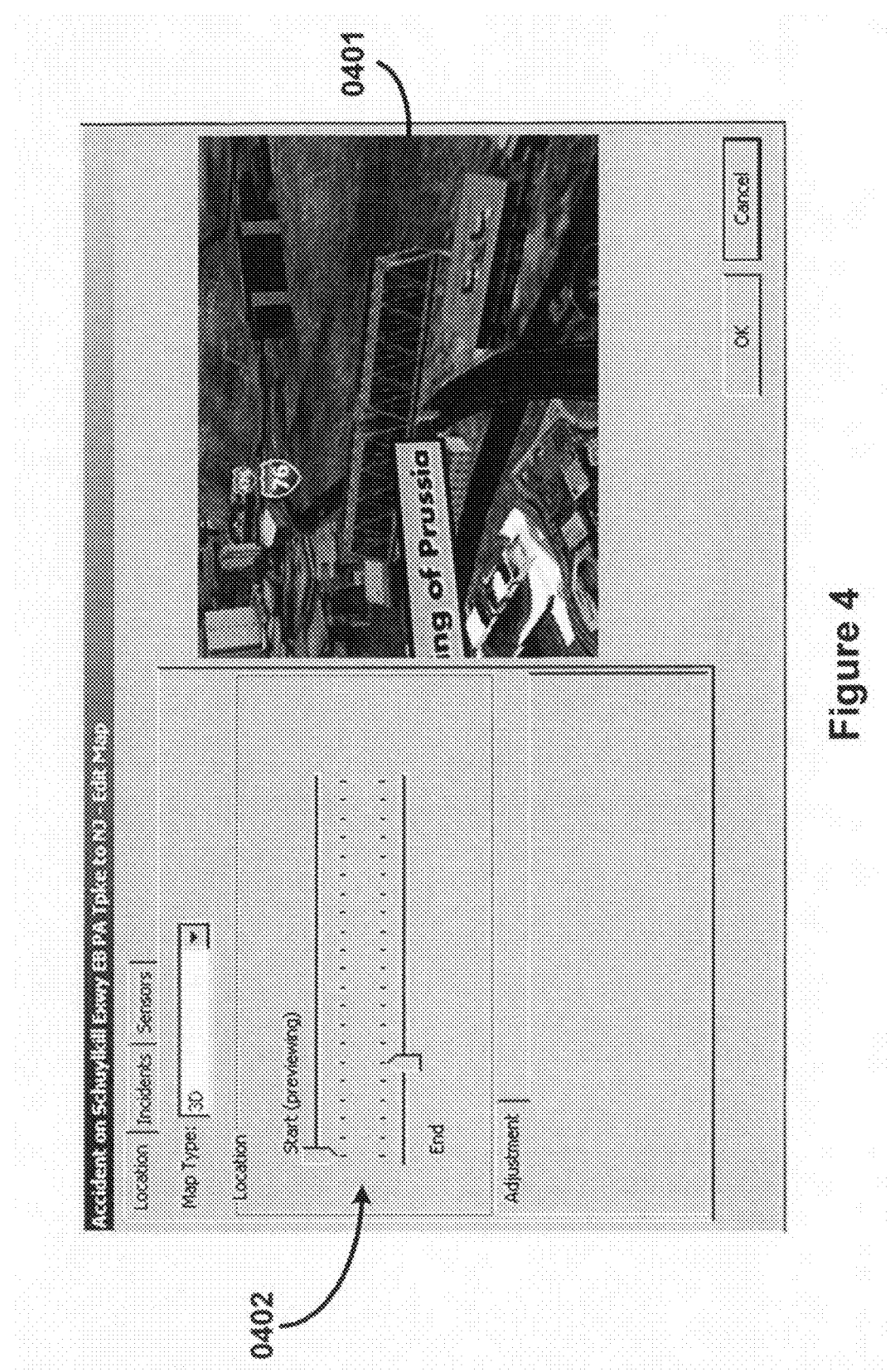

In FIG. 1, the Incidents tab is selected and the traffic incidents are displayed. A user can select an incident 0105 and create a 3D, 2D or skyView map by right clicking on an item or highlighting it and clicking on the desired create map icon 0104. FIG. 4 shows the edit map dialog box which will allow the user to adjust the map including the area shown, what data to include, and the type of map. After making selections and clicking the OK button, the map is created and added to the Rundown section 0107.

Figure 2:
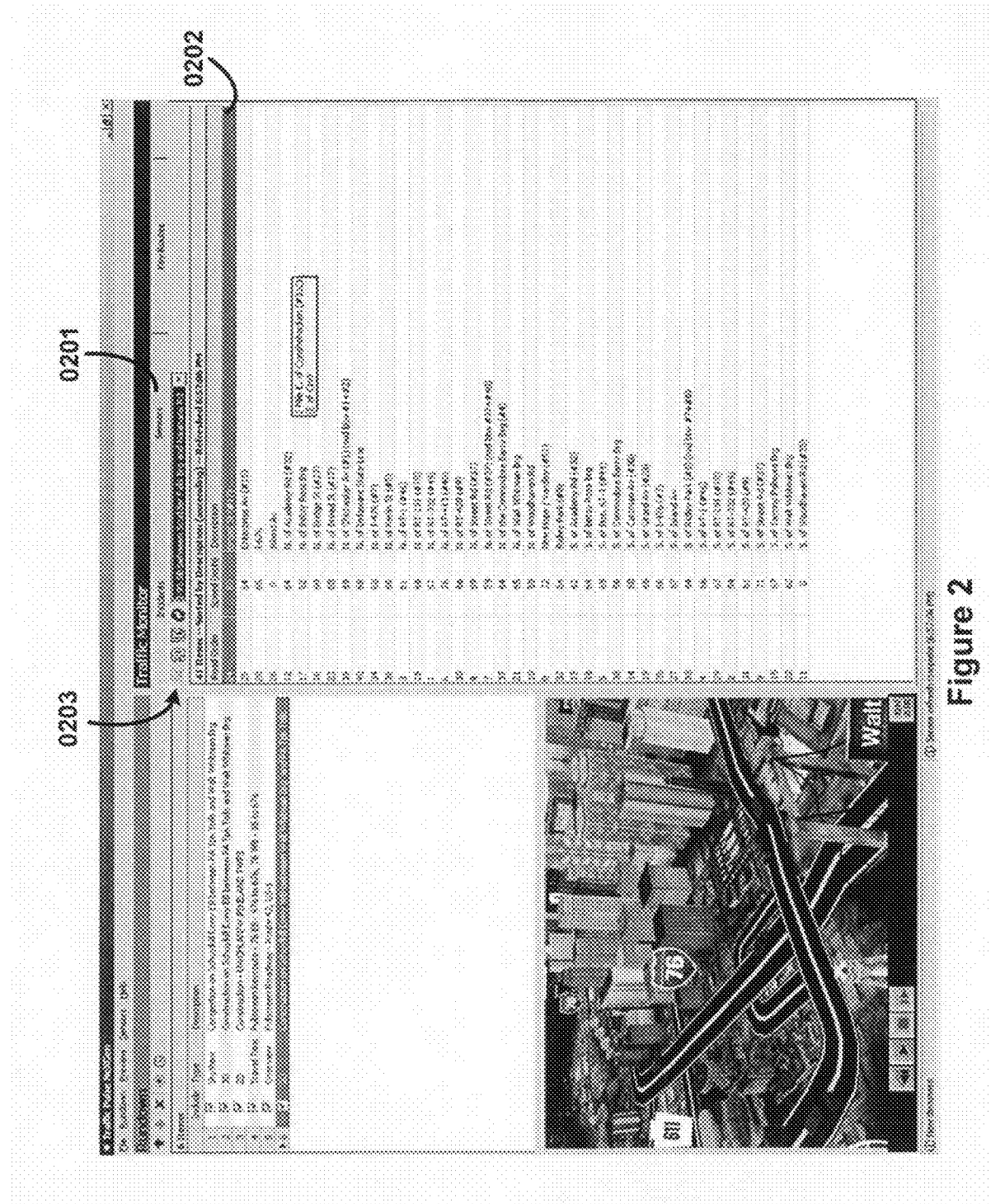

In FIG. 2, the Sensors tab 0201 is selected and sensor traffic data is displayed. Here, a user can select a sensor item 0202 from the list and build a 3D, 2D or Skyview map by right clicking on an item or highlighting it and clicking on the desired create map icon 0203. At this point the edit map dialog box is displayed for adjustments in the same manner as described previously. After making selections and clicking the OK button, the map is created and added to the Rundown section 0107.

Figure 3:
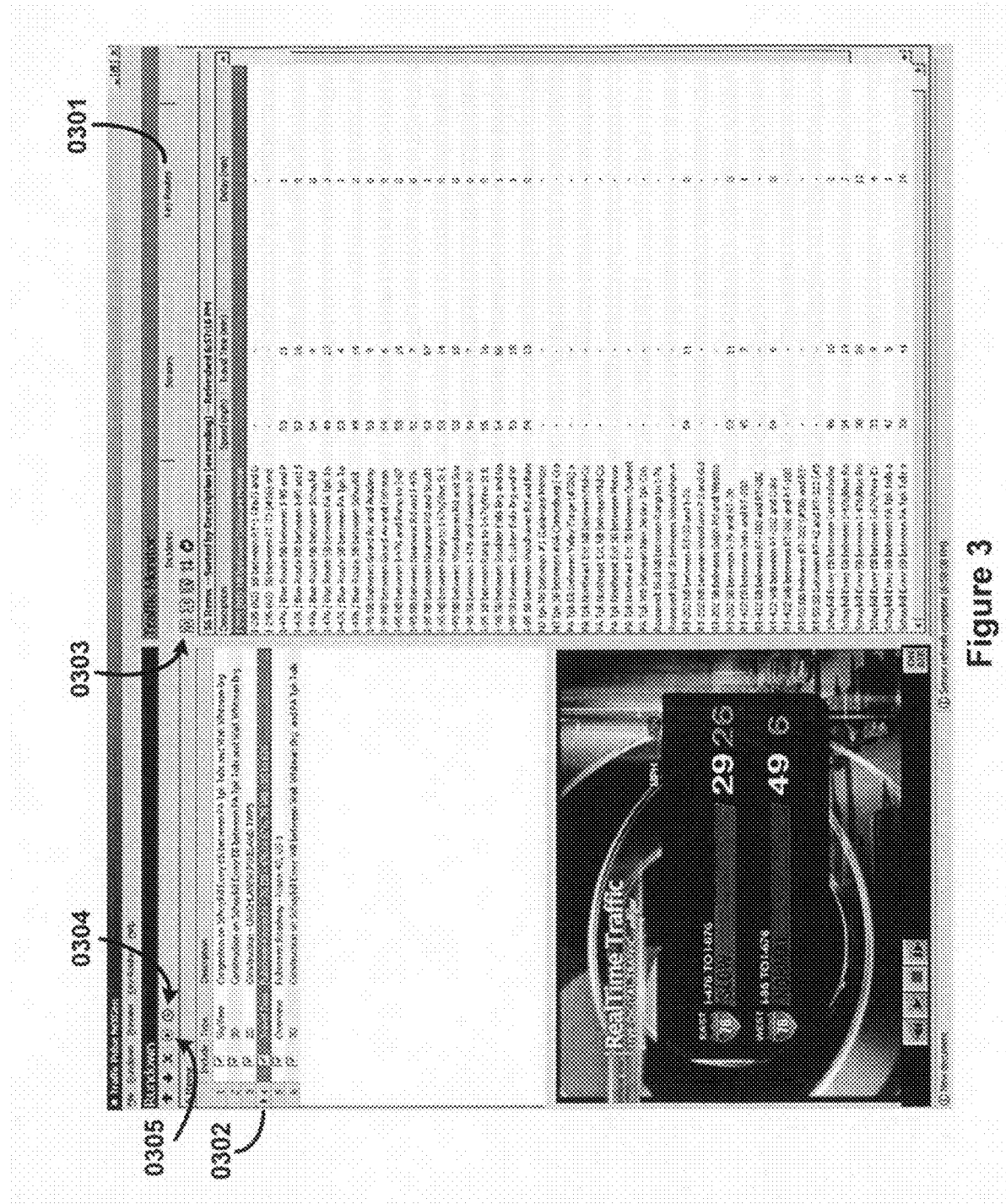

In FIG. 3, the Key Routes tab is selected 0301 and Key Route data pertaining to speed and travel time is displayed. Key Routes, which are predefined sections of a road system, can be selected by a user to create maps of a portion of the map or informational graphic showing the route's speed or travel time. A user can select a Key Route 0302 item from the list and build a map or informational graphic. The user can create a map by right clicking on an item or highlighting it and clicking on the desired create map icon 0303. As described previously, the edit map dialog window is shown to allow the user to modify the map. When created from a keyroute, the 2D or skyview maps are created centered on the midpoint of the keyroute. This center point can then be adjusted in the edit map window. The 3D flythrough is create to fly over this keyroute. In the edit map window, the start and end points of the fly-through can be adjusted as desired 0402.

Figure 5:
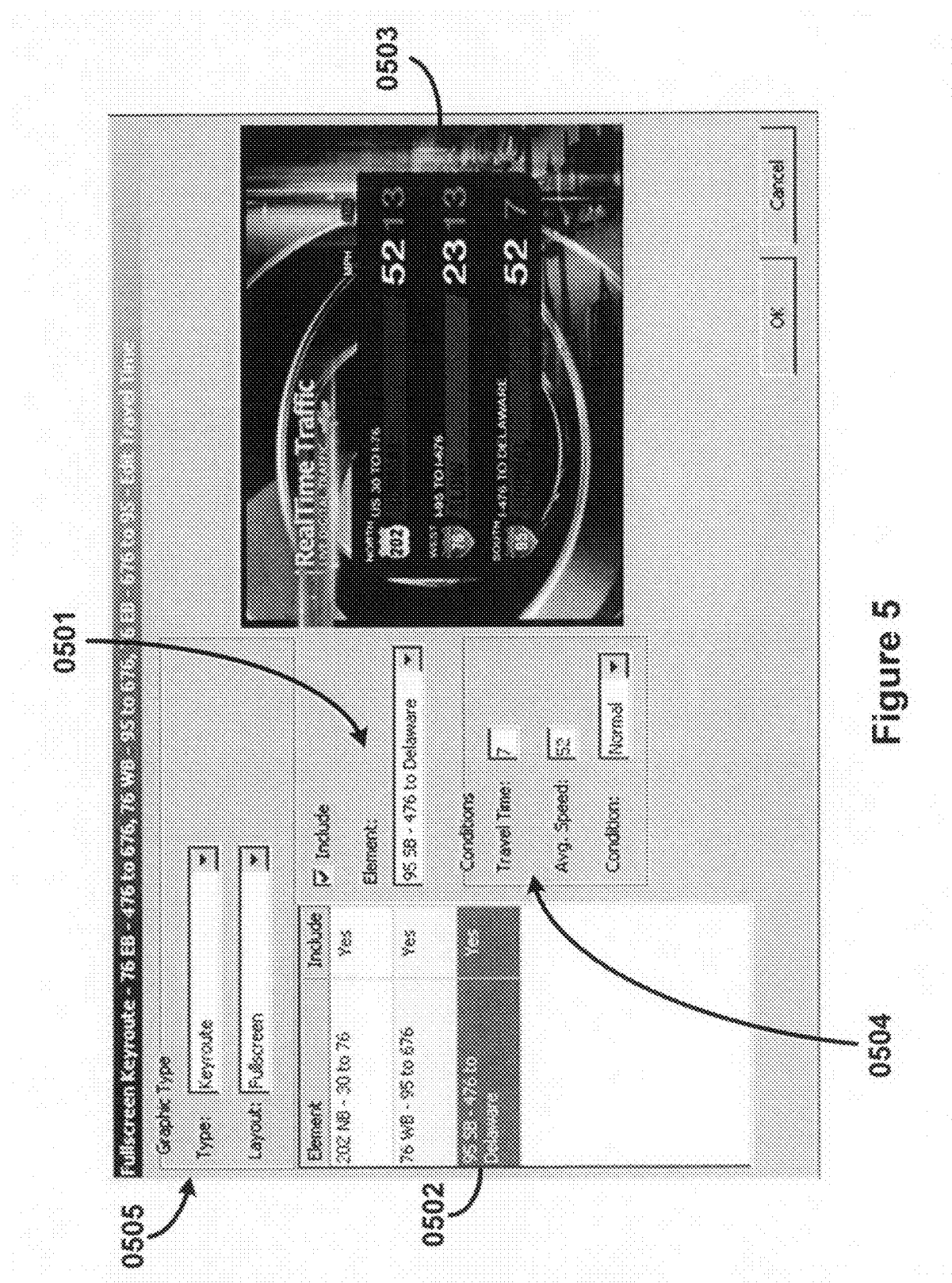

The user can also choose to create an informational graphic to display numeric data about a keyroute. Currently the system will allow the user to display a travel time and/or average speed for the keyroute. The user clicks on the travel time icon 0304 to create the travel time graphic. The Edit Travel Time window is then displayed (FIG. 5). The user can choose which keyroute should be displayed in each element of the graphic. The user selects the element in the element list 0502 and then chooses the desired keyroute from the element menu 0501. The data for the keyroute is automatically displayed in the graphic 0503. The data is also displayed in the Conditions area 0504 of the user interface as well. In an error situation (network problems, etc.), the user can override the data and the new data will be displayed. The system allows different graphical layouts of the data to be utilized by choosing from the menus in the Graphic Type section 0505.

Figure 6:
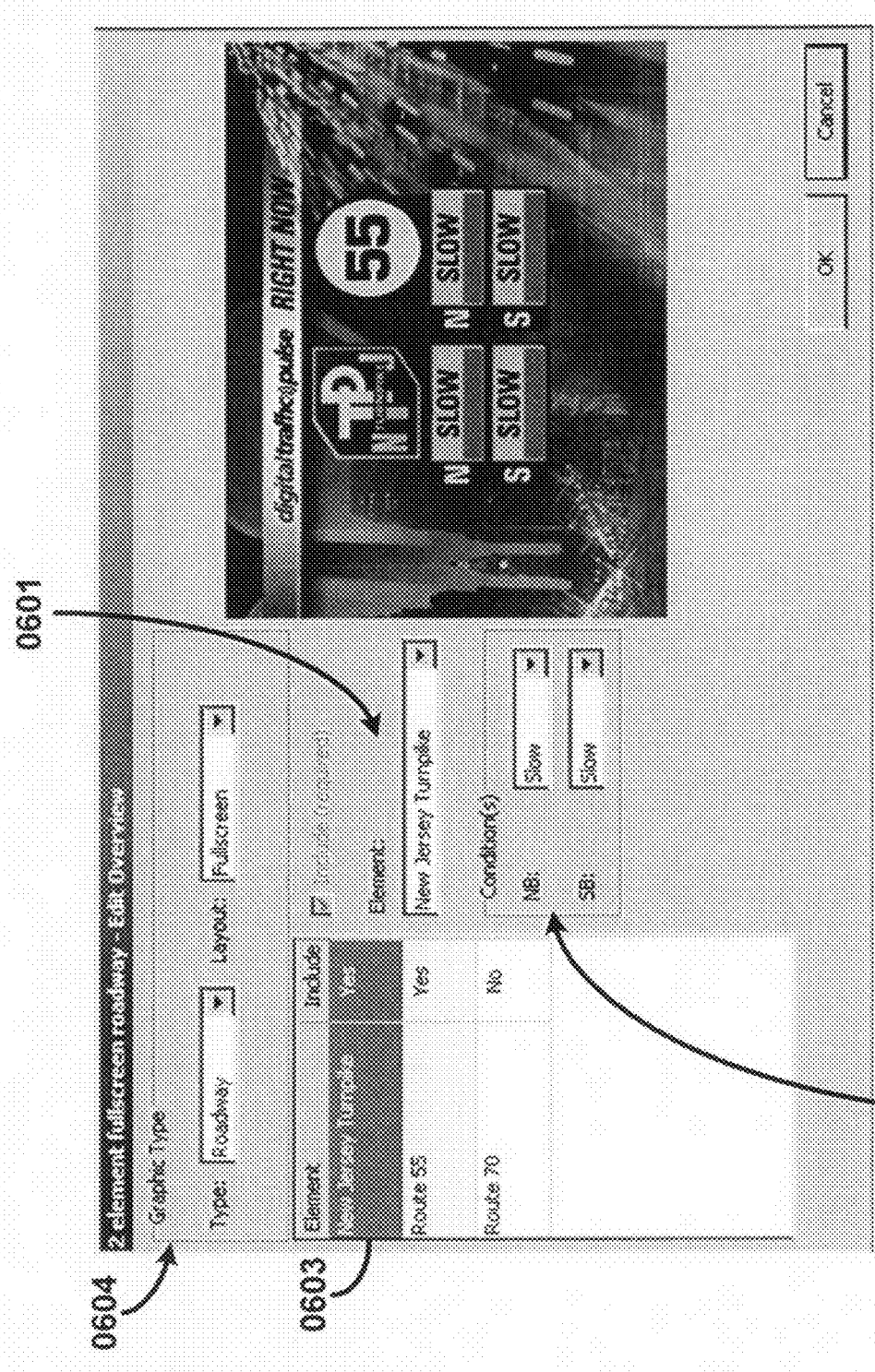

The user can also choose to display an overview graphic showing general conditions on a roadway. The user clicks on the overview icon 0305 to create the overview graphic. The Edit Overview window is displayed (FIG. 6). In a manner similar to the overview graphic, the user can choose which roads to display for each element of the graphic. The user selects the element in the list and chooses the desired road from the element menu 0601 and the conditions from the Conditions menu 0603. The user can also choose different graphic layouts in the graphic type menu 0604.

Once a user completes map and graphic creation, the elements can be reordered as necessary using the rundown management icons 0108. The arrows are used to move elements up or down in the play order and the "X" is used to delete unwanted elements. The elements can also be removed from the show but not fully deleted by clicking on the "include" checkbox 0109. When the rundown order is finalized, the maps and or graphics can be launched by clicking the ON AIR button 0106. When ON AIR is activated, NeXGen sends the graphic images to the user's computer monitor 1201 and a SDI 601 digital video signal 1202 to the TV station switcher 1203. See FIG. 12. At this point, animated graphic images like that pictured in FIGS. 7-11 will be displayed on said devices. A user or on-air talent can then play, pause or rewind the created map and or graphic content by using an input device, such as a keyboard 1204 or handheld clicker 1205.

4. Physical System Description

Figure 12:
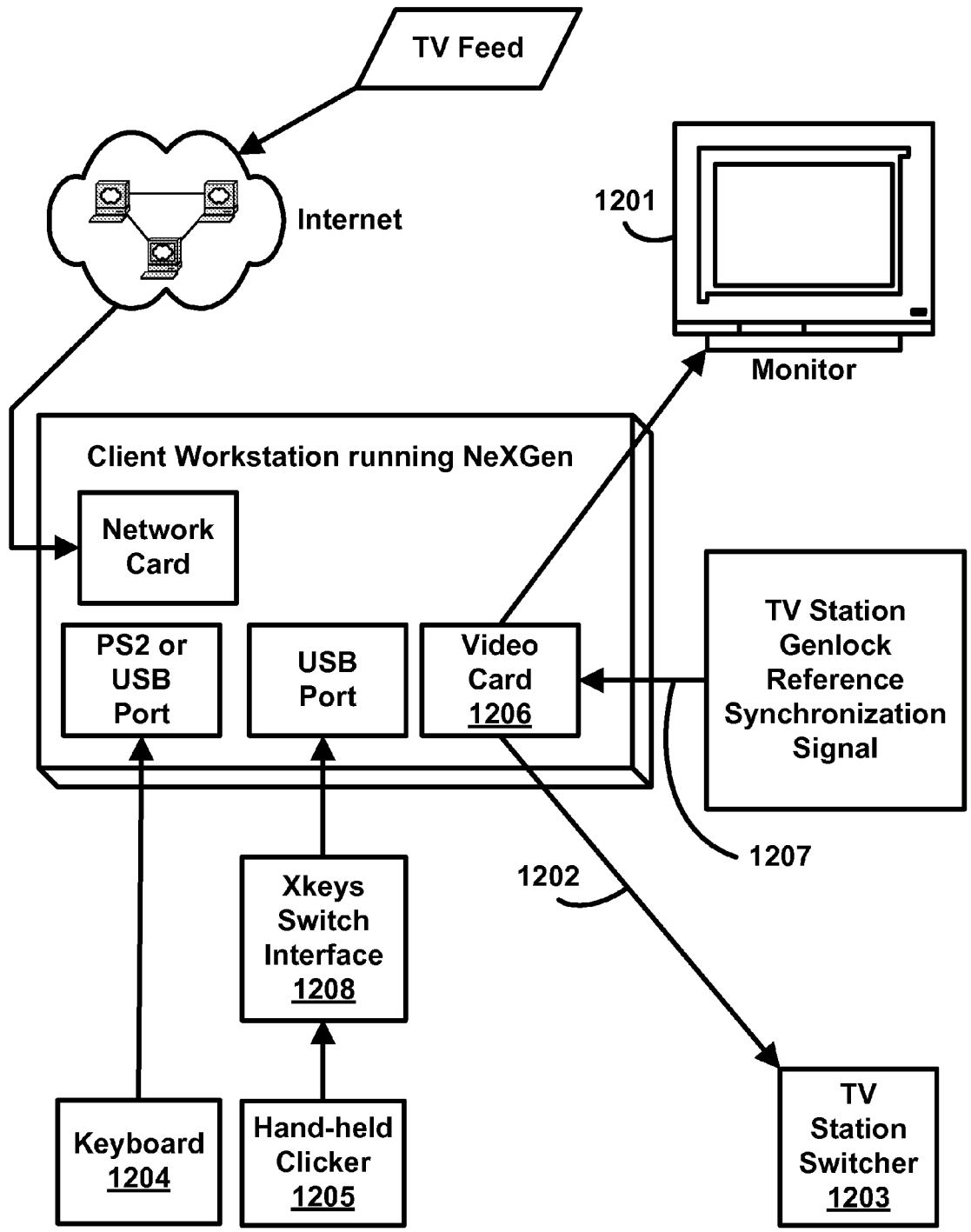
FIGS. 12 and 13 show one preferred embodiment of the computer architecture of the present invention.

One preferred embodiment of the NeXGen software application includes a computer architecture as seen in FIG. 12. The NeXGen application will typically run on a client workstation. One preferred embodiment is a Windows XP based PC workstation with dual 3.0 GHz Xeon processors and having 2 Gbytes of RAM memory. This PC is connected to the Internet via a network card to allow download of the traffic data. The client workstation includes a graphics video card 1206, (e.g., a Nvidia Quadro FX 4000 SDI) capable of sending both an SDI digital video signal to a TV Station Switcher and a video signal to the workstation's attached monitor. The video card is also capable of accepting a TV Station genlock reference synchronization signal 1207. Finally the client workstation uses a keyboard emulator, or switch interface, making possible the use of a handheld clicker 1208. The actual handheld clicker 1205 will vary depending on the TV station studio environment. Any device (wireless or wired) that is capable of a simple momentary contact closure is sufficient. Other hardware equipment and or configurations may be used without departing from the spirit and scope of the present invention.

5. Software Components Description (FIG. 13)

Figure 13:
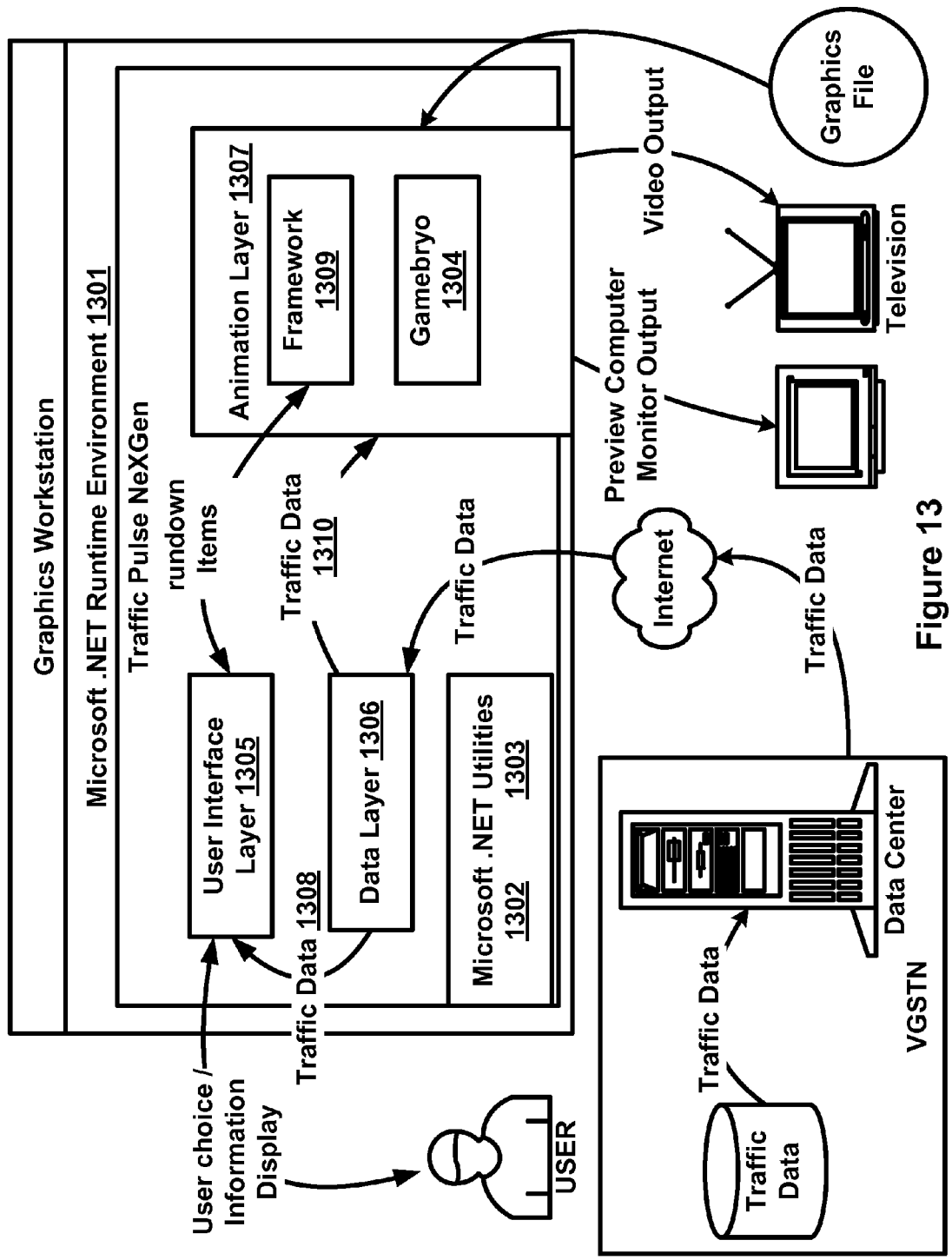

One preferred embodiment of the NeXGen software application comprises a software architecture as seen in FIG. 13. The NeXGen application utilizes the Microsoft .NET framework and is run inside the .NET runtime environment 1301. Several of the utilities of the .NET framework are also used. .NET controls are used for the user interface 1302 and .NET software utilities are used for loading data via the Internet 1303. Gamebryo® graphic engine software by Numerical Design Limited (NDL), Chapel Hill, N.C., is used to handle the real-time geometry-processing requirements to produce the graphic show output of the NeXGen application 1304. Other graphic software may be used without departing from the spirit and scope of the present invention.

6. Per Station Development

The NeXGen software application according to the present invention utilizes data to create different maps and informational graphics. While traffic data can be displayed in real time with NeXGen, a map's roads, terrain, waterways, landmarks, road shields, city tags and banners, among other things, must be developed prior to the application being used. This underlying map information is achieved through graphic artists creating a 2D world map for a customer's needs. A 3D world map is created by making adjustments to the corresponding 2D world map. 2D Informational graphics are also designed and created by graphic artists prior to NeXGen's use. In one preferred embodiment of the present invention all of this data is created with 3ds max (commercially available from Autodesk's Media and Entertainment division, formerly known as Discreet) to create a 'scene file' for each station. The Gamebryo exporter is used to take this content from the 3ds max development environment and create a Gamebryo runtime graphics data file (referred to as a ".nif" file). This .nif file contains all the maps, 2D graphics, and 3D worlds that must be accessed by the running application.

Figure 24:
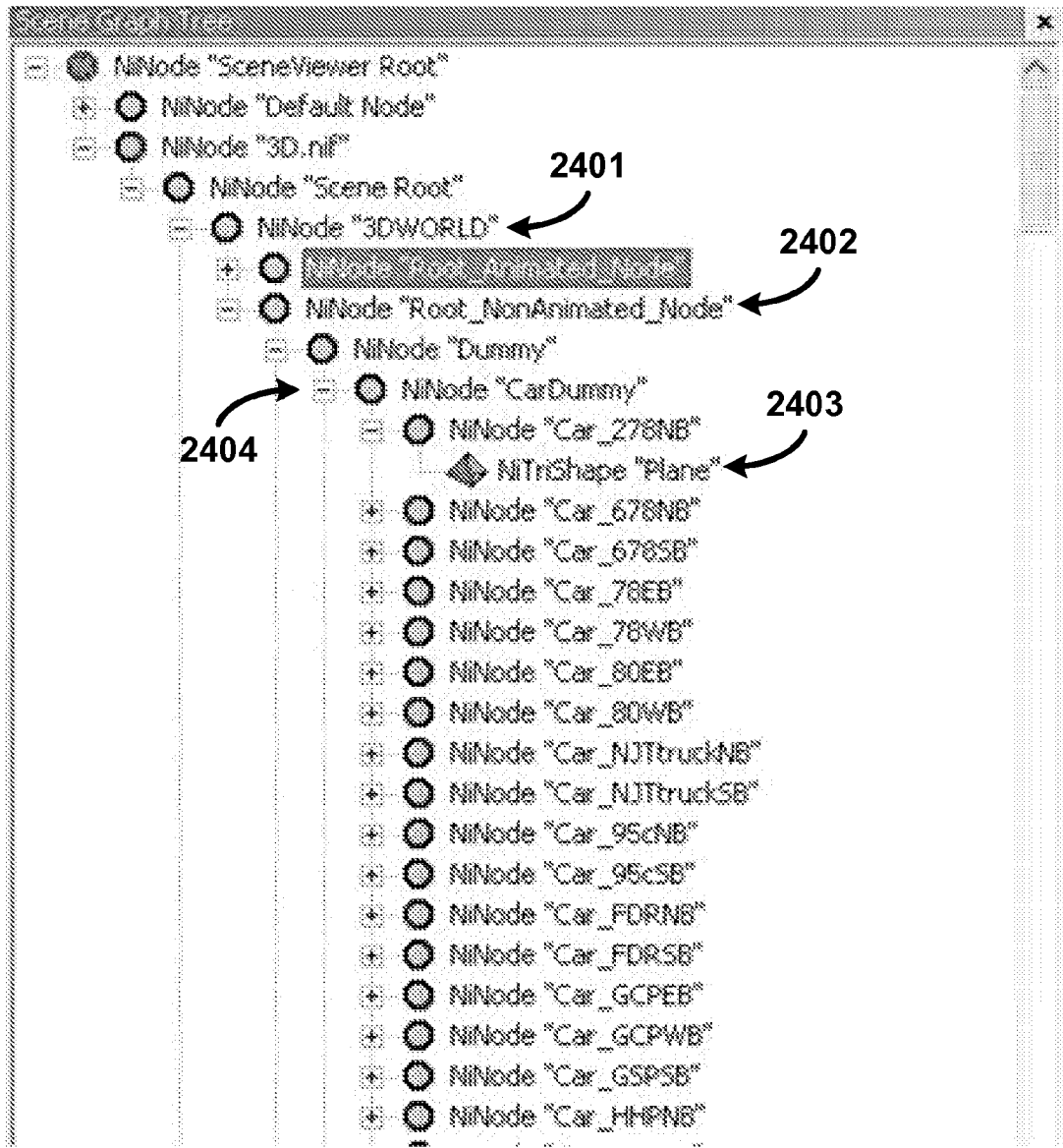
FIG. 24 shows a scene graph tree specified in a graphics data file for creating graphics used in the present invention.

All of the objects created in 3ds max must be organized for maximum efficiency into a tree structure. This tree structure allows objects to be designated as parents, children, and sibling nodes relative to other nodes. This tree structure (known as the "scene graph.") is not visible in the end product and is purely for runtime object organization and control. An example listing is shown in FIG. 24. This example shows the scene graph structure as it is specified in the graphics data file (i.e., a .nif file). This example shows some of the nodes for a 3D world .nif file 2401. The 3D landmark models in the 3D world are mostly not animated. These non-animated models are grouped together under a parent node (called the non-animated node) 2402. The code then does not have to update the animation characteristics of these models, thereby greatly improving performance.

At runtime, the NeXGen system also creates dynamic objects that are added to the scene graph. The scene graph is utilized for functional and optimization purposes. For example, the characteristics of a node higher up in the tree are used to control the behavior of a node lower in the tree 2403. If the node higher up in the tree is moved, all of the nodes below it are also moved. Also the nodes and leaves of the tree are grouped according to their function (e.g., all the car "dummies" are under the "CarDummy" node 2404).

Figure 20:
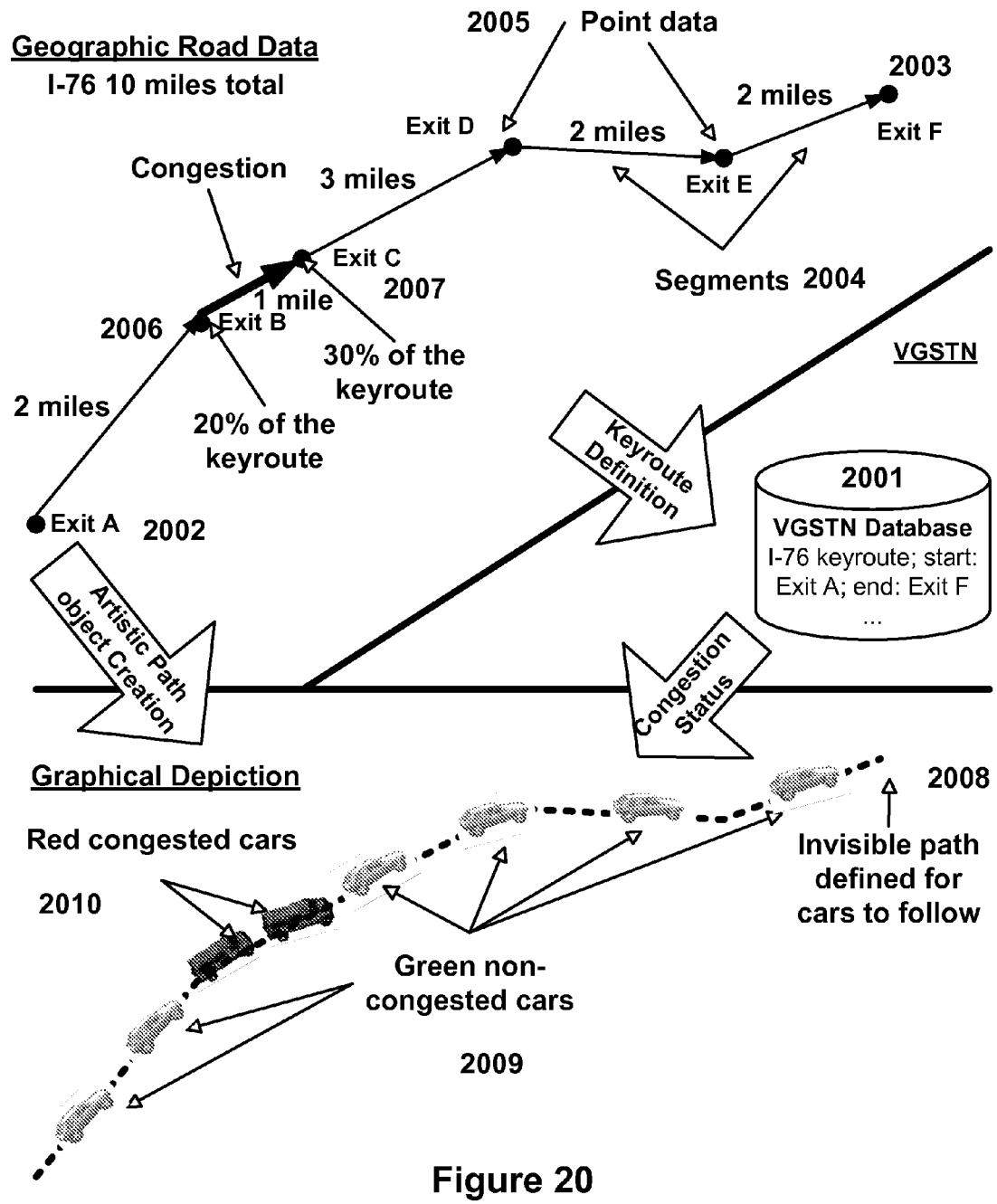
FIG. 20 shows keyroutes used by the present invention.

All of the types of map graphics display traffic flow information by changing the characteristics (color, speed, etc.) of the vehicles flowing along the road 0705. This information is displayed for the major highways in a metropolitan area. However, it is only displayed on the portions of these routes where this flow information is known. The source of this flow information includes traffic sensors, cameras, police reports, aircraft, mobile ground units, etc. These portions of highways are determined and entered in the VGSTN as keyroutes 2001. A keyroute is defined by two endpoints on a roadway (e.g., exit A 2002 to exit F 2003 on I-76) and is made up of all the segments 2004 connecting all the points 2005 between these end points (see FIG. 20). The VGSTN will report congestion information to NeXGen based on its location relative to this keyroute. For example if the keyroute were 10 miles long and a one mile segment was congested starting 2 miles from the beginning, the VGSTN would report that the congestion was from Exit B 2006 (20% of the keyroute length) to Exit C 2007 (30% of the keyroute length) and the rest of the keyroute was clear.

To display this information, a visual object matching each keyroute must be created in the map (2D and 3D). From within 3ds max, a path object for each keyroute will be created on the maps 2008. The placement of the path's points will match the geographic characteristics of the points of the keyroute. Dummy objects are added to the path as placeholders to be overlaid at runtime with vehicle models 2403. These vehicle models will be altered to illustrate the flow data. Continuing the earlier example, the application will make the green vehicles fast and widely spaced for the first 10% of the path and the last 80% 2009. It will, however, make the red vehicles slow-moving and densely spaced between 10% and 20% of the path 2010.

Figure 23:
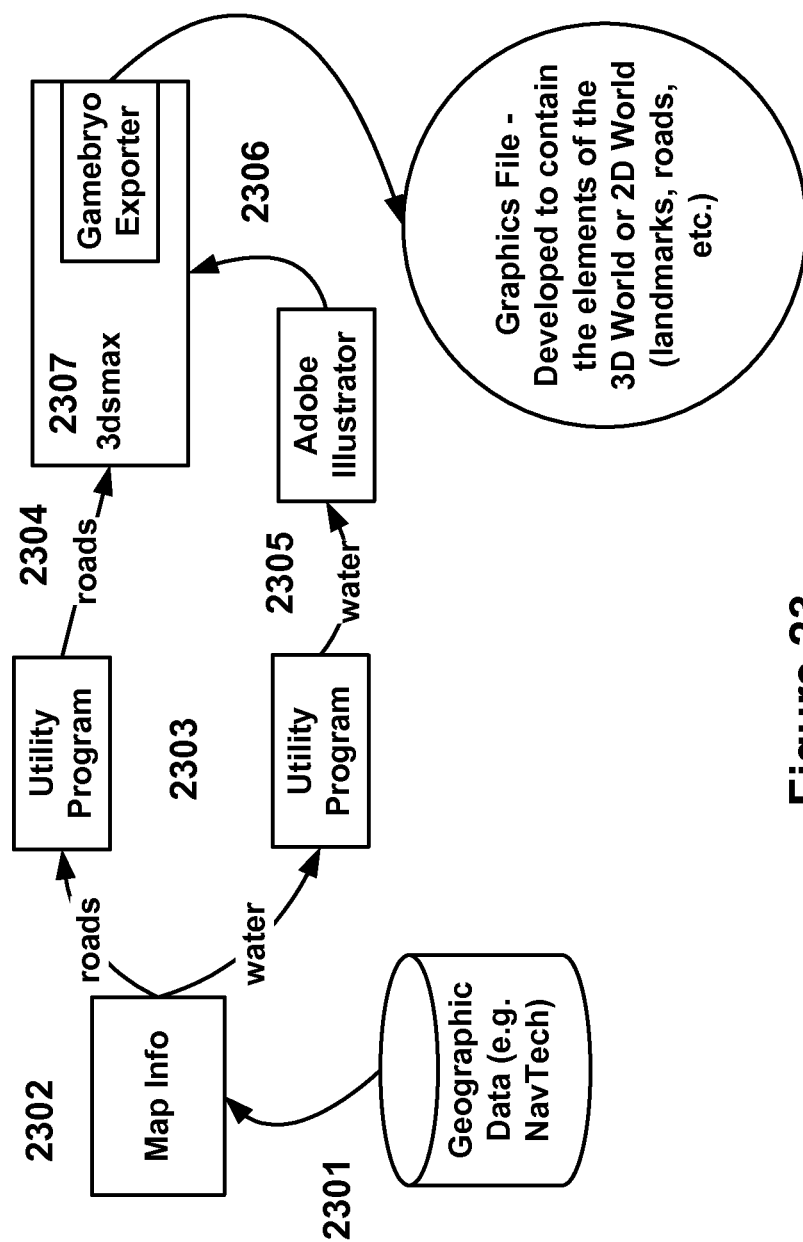
FIG. 23 shows a 2D map creation process used in the present invention.

7. 2D Map Creation (FIG. 23)

In one preferred embodiment of the present invention the process of creating a 2D world map starts with the loading of geographic data (nominally supplied by NAVTEQ Corporation) 2301 into the MapInfo software program 2302. One preferred MapInfo program is the MapInfo Pro version 7.0, commercially available from MapInfo Corporation, Troy, N.Y. This data is loaded for an area selected by the customer. Usually, this is an area where traffic flow data is readily available from roadside sensors or other means. MapInfo organizes data into layers which include major highways, secondary highways, waterways, oceans, and counties. From within the MapInfo program, the layer control is used to make only one of these layers selectable. After a layer is selected the user exports it as a .dxf (Autocad) file. This process is repeated to create .dxf files for each layer. Each .dxf file is a 2D representation of the map using a square-projection where x=longitude and y=latitude for each point. The map data is represented as a list of points and polylines. Polylines are a set of points that make up a segmented line. These .dxf files are then processed with a utility program 2303 that receives a .dxf file as input and extracts out these points and polylines. The clustering step examines all groups of two points, and combines their respective polylines together if the distance is greater than the threshold distance supplied by the user. Next, it examines all groups of 3 adjacent points in a polyline, and computes an angle. If the angle is below the threshold supplied by the user, the middle point is removed. Finally all coordinates are transformed using a rectangular-projection where x=longitude×cos(latitude) and y=latitude and a user-supplied scale factor is often used to eliminate the majority of floating-point errors that occur when using very small numbers of high precision. As seen in the above-noted equation, the utility program 2303 adjusts a map's longitude values to compensate for the curvature of the earth. Without this adjustment, roads would not be displayed accurately. When finished adjusting map data, files are again saved in the .dxf format.

The 'curve-cleaned' .dxf files for major and secondary highways are loaded into the software program 3ds max 2304. The line tool is used to trace the roads and is converted to an editable polygon. Textures are added to the roads and UVW unwrap is performed on the roads with the textures. When all roads are mapped, they are collapsed and the file is saved. The 'curve-cleaned' .dxf files for waterways are opened in Adobe Illustrator®. The object's path is simplified and all small lakes and single line rivers are deleted. The file is then saved as an Illustrator file 2305. This file is then exported into 3ds max where the waterway graphics are finalized 2306. Also, in 3ds max 2307, Road shields, city signs 4101 and secondary roads 4103 are added and marked with a zoom level variable to control their display 4105. This affects their visibility on the map at different zoom settings. Fewer shields are desired to be displayed at a more distant zoom level. If more of the map is shown, it becomes cluttered with shields if this is not done.

After the main static elements of the world are established, the artists must also place the dynamic elements in the scene 3502. These dynamic elements are placed in the scene file outside of the viewable area. At runtime, the system clones these dynamic objects and places them at the appropriate places in the animated environment 3504. For example, the car path scene object copies the "car" objects from outside the viewable area 3506 and places them on the road with the appropriate color and speed. The icons that mark traffic incidents 2407 are cloned and placed on the 2D map in the same way. Lastly, the "bubble" containing the sensor speeds 2408 is cloned and placed at the sensor location.

Figure 25:
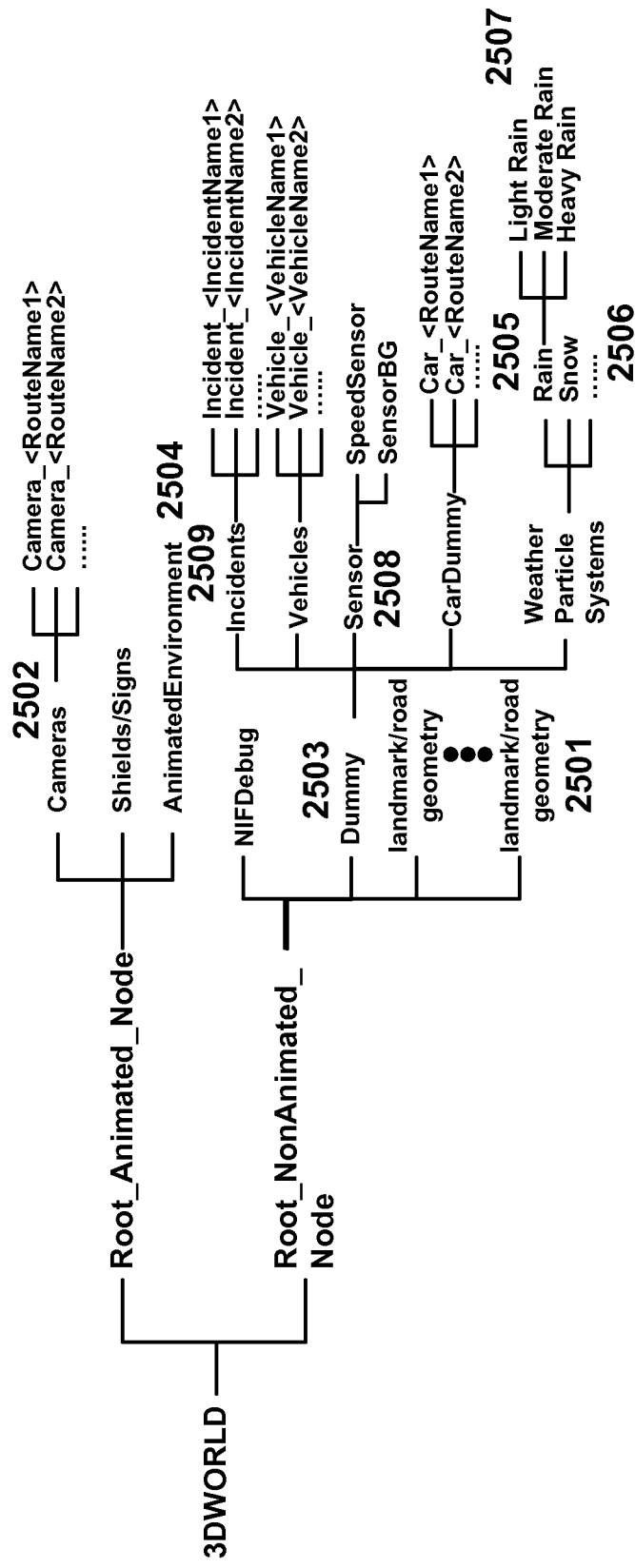
FIG. 25 shows a 3D World Scene Graph for 3D Fly-Through Scene Creation used in the present invention.

8. 3D Fly-Through Scene Creation (FIG. 25)

Development of a 3D fly-through scene begins after creation of a 2D map as illustrated above. To create a third dimension, ground textures are stretched and landmarks 2501 of notable interest are added to the 2D map geometry to create the 3D world. Landmarks may include buildings, billboards, signage and any other structure located on or near a roadway. A reference image is used to model the structure of a landmark. The resultant model then has a texture/skin applied to it. The finished, textured model should closely resemble the reference image, thus making it recognizable to someone familiar with the landmark. The 3D map retains the underlying 2D map's 'curve-cleaned' latitude and longitude point values. Landmarks are placed on the 3D map using these values. The roadway signs, town name signs, and other 2D labels are replaced by 3D versions. These changes are made in the 3ds max application to produce the completed 3D scene for a metropolitan area.

A camera path is then created to follow each keyroute for the 3D map 2502. This camera path object is named to reflect the keyroute's name allowing it to be referenced by the application's code. In the same way as the 2D world, the dynamic elements of the 3D world must also be created and placed outside of the viewable 3D world 2503. This includes the flow vehicle models, the traffic incident models, and the sensor display "bubbles". At runtime, the system also clones these dynamic objects and places them at the appropriate places in the animated environment 2504.

9. Skyview Map Creation

A skyview map uses the same 3 dimensional world as used by the 3D fly-through explained above. No additional per station development is needed because the 3D world is already created.

Figure 42:
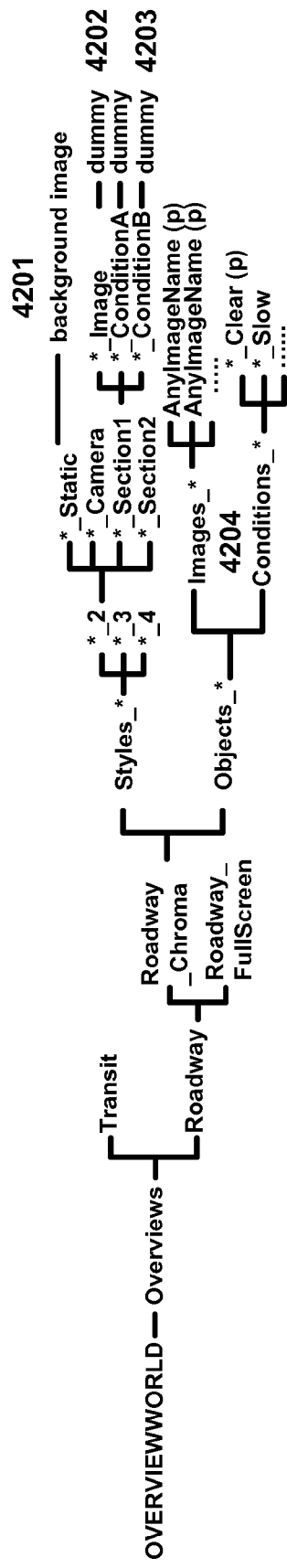
FIG. 42 shows an Overview Graph used in the present invention.

10. 2D Informational Graphics Creation 2D informational graphics representing 'travel times' or 'overviews' are designed in 3ds max as flat worlds. Each world has a texture applied to it based on a customer's needs to serve as a background for the 2D graphic. This texture can be a graphic image of a local landmark, station logo or generic traffic scene. Placeholders are inserted in the flat world for display of items such as road shields, roadway conditions and travel times.

a. Overview Graphic (FIG. 42)

A 2D overview's layout and design are created, according to station requirements, in a graphics program such as Adobe Photoshop®. Certain aspects of the design are static (e.g., the background) and others are dynamic and can be switched according the user's choice (e.g., the road shields, the traffic conditions). The static background is saved as an image file. The dynamic content portions are also created as images (e.g., one image for each road route number shield). When the user makes the choices of different roads, these will then be switched by the running system.

Figure 26:
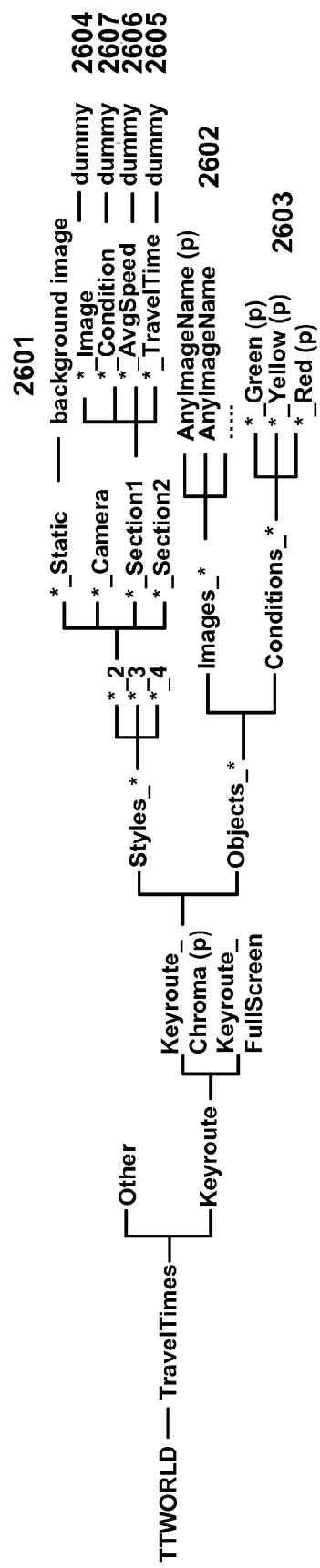
FIG. 26 shows how to create a Travel Time Graph for use in the present invention.

The background image file 4201 is then used in 3ds max to create a 2D overview world. In 3ds max, placeholders are added to the 2D overview world to account for a roadway's name/direction of travel 4202 and traffic condition 4203. Most overview graphics have two conditions for each road to reflect each direction of travel. The images for all the roads, directions of travel and conditions are stored outside the visible world in the 3ds max file 4204. At runtime, this data is inserted in the placeholders within the 2d overview world according to the user's preference. Also, in the 3ds max file, "extra data" on each object is used to store a unique string to dynamically build the user interface drop down menu lists for the user to select a roadway, its direction(s) of travel and traffic condition. The extra data functionality is a way to annotate a graphical object with textual data and does not usually affect the visual appearance of the object. For example, in this case, the extra data is used to populate the user interface menu text allowing the user to select the desired roadway image 0601 or condition image 0602.

b. Travel Time Graphic (FIG. 26)

The process for the travel time graphics is similar to the 2D overview graphic. A 2D travel time's layout and design are also created, according to station requirements, in a graphics program such as Adobe Photoshop®. The various background 2601, roadway description 2602, and condition 2603 images are then saved in image files and included in the scene graph using 3ds max to create a 2D world. In 3ds max, placeholders are added to the 2D world to account for a roadway's name 2604 and travel time 2605 or average speed 2606 or condition 2607. The complete set of roadway name images are stored outside the visible world in the 3ds max file. At runtime, the user's selection is copied to the visible portion of the world (where the placeholders are located).

The travel time or average speed placeholders have specially named parent nodes such that the application will generate a dynamic texture containing the numerals for speed/travel time for the selected road. The generated texture will be placed on the appropriate placeholder at runtime. All roads for travel time graphics are based on keyroutes stored in the VGSTN. Keyroutes are used in the NeXGen system for both travel time values and for the placement of congestion indication on the car paths (e.g., red and yellow car locations). In the 3ds max file, extra data is used to store a unique string to account for a keyroute's name, default road condition color indicators, and the font to be applied in creation of dynamic numeral textures. In a manner similar to the Overview 2D graphic, the extra data capability is also used to populate the user interface menu text, thereby allowing the user to select the desired roadway image 0501.

11. NeXGen Software Organization (FIG. 13)

In one preferred embodiment of the present invention, the NeXGen software application is comprised of three layers. These layers are the user interface layer 1305, the data layer 1306 and the animation layer 1307. The user interface layer displays traffic data updated from the data layer thereby allowing a user to create and manage content 1308. With this layer, a user can create 2D and 3D maps or informational graphics and control this content through the use of a rundown. The user interface layer is connected to the user through the pc monitor, keyboard and mouse. The data layer is responsible for continually downloading data from the VGSTN via the NeXGen Data Feed. It is connected to the VGSTN externally through a network access point. The data layer is used by both the user interface layer and the animation layer. Finally, the animation layer is charged with handling the graphical presentation of traffic content created with the user interface layer. It displays the selected world and its associated animations using flow, sensor and incident data. The animation layer contains a framework which serves as a bridge between the user interface layer and itself 1309. By storing data about the world and rundown elements created, this framework manages part of the NeXGen application's animation. The animation layer uses the Data Layer by receiving the traffic data updates 1310 and then altering the data that is visually displayed as the show is playing on air.

12. NeXGen System Activity Flow

When the NeXGen application is started, the user interface layer checks software entitlements, instructs the animation layer to load .nif files and has the data layer start its auto-downloader. At application launch, the user interface layer checks an initialization file for a customer's entitlements. These entitlements govern the functionality of the user's software. This allows certain program features to be excluded from the user's control and use. Also, at application launch, the user interface layer instructs the animation layer to load the relevant .nif files into memory in accordance with the entitlements. The .nif files loaded are created as part of the "per station" development process and house the graphical world and its attributes. Depending on a customer's entitlements, these files may encompass 2D, 3D, travel time and overview worlds.

Figure 19:
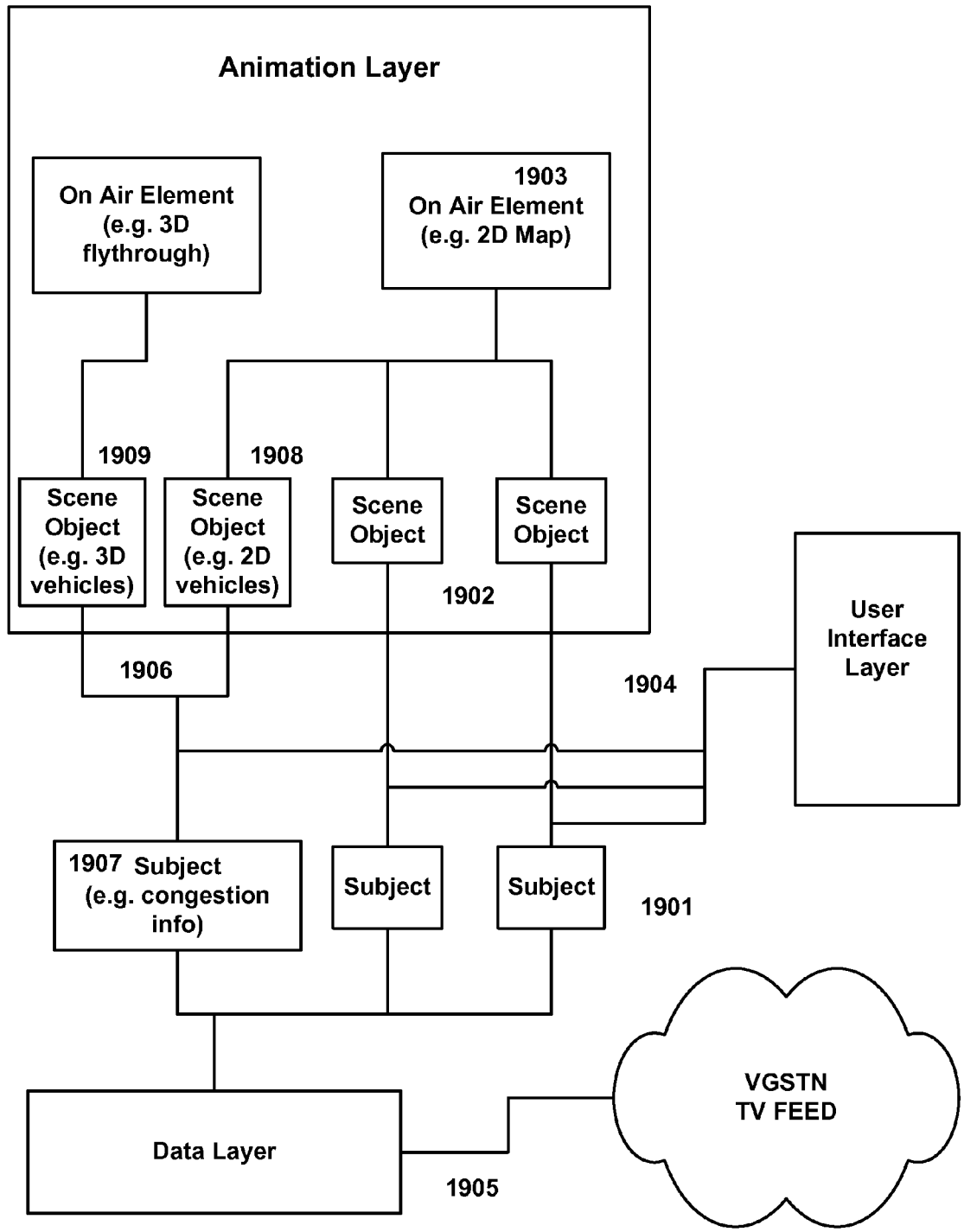
FIG. 19 shows various types of objects that are created in the present invention at runtime.

At runtime, various types of objects are created in the system (see FIG. 19). Subject objects 1901 are objects that contain traffic data (e.g., sensor speeds, congestion locations, incident locations, etc.). Scene objects 1902 are a visual representation of some piece of traffic data (e.g., the incident marker for a car accident). Scene objects are associated with a subject that contains the traffic data. As the data changes, the scene object is responsible for showing the changed data. The On Air Element object 1903 is associated with an item in the rundown (e.g., a 2D map, 3D flythrough, etc.). Via the user's choices, scene objects are added to On Air Element objects (e.g., choosing to display an incident on a map).

The runtime worlds are initialized based on the data in the .nif files. For the 2D graphic worlds (non-maps like travel times and overviews), the initialization involves accessing the data in the .nif file and setting up data in the framework. This data is provided to the user interface so it can build the menus for the user to choose the desired road, bridge, etc. 0601 to be displayed on the graphic. When the user makes the selection, the subject, scene object, and On Air element are created by the user interface.

Figure 41:
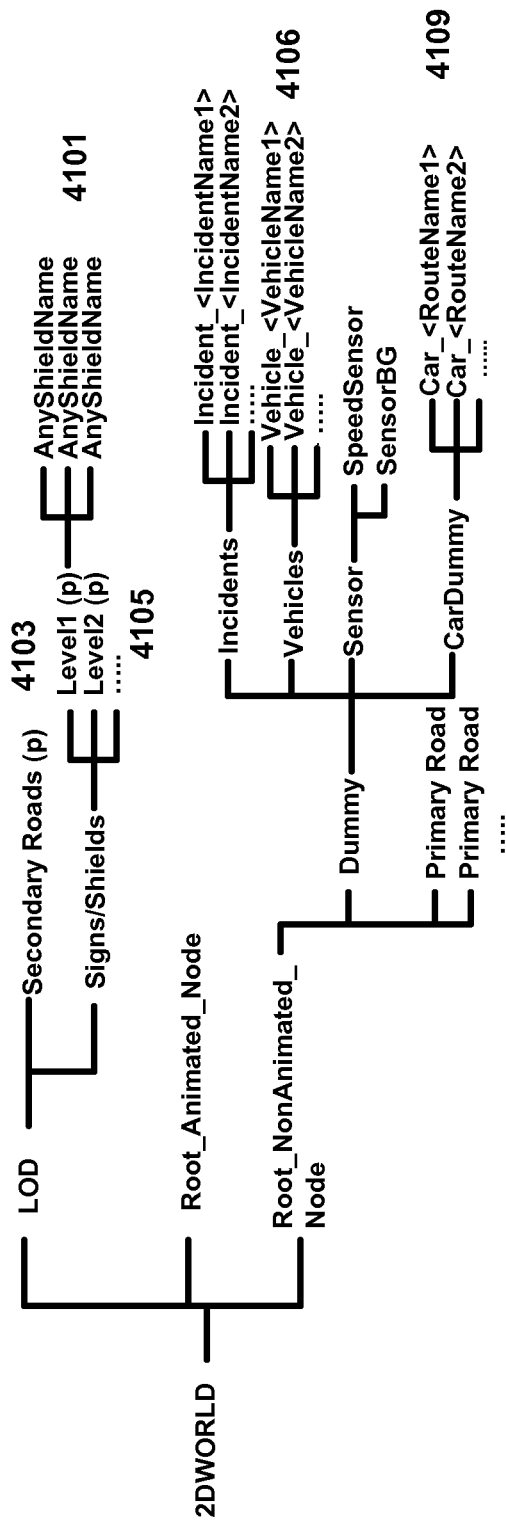
FIG. 41 shows a 2D World Scene Graph used in the present invention.

The system initializes the 2D and 3D worlds by reading in the graphic data from the .nif file. One of the main activities that must be done is to create the flow indication scene objects on the paths throughout the world. This is done when the first element associated with the world is created. The keyroute flow data feed subjects are accessed to color the vehicles and place the vehicles appropriately. In the .nif files, there are invisible dummy objects placed on each path by the artists when the path object was created during the "per station" development 2505 4109 (FIG. 41). The world initialization effort determines the number of vehicles that will be needed for each path based on the current data. The animation layer clones the number of path dummies needed for each path. There are various vehicles used in the 3D visualization (e.g., cars, pickup truck, bus, etc.). These are selected via a weighted average. Referring again to FIG. 41, the selected vehicle 4106 is cloned and added to the world in a fashion such that the path dummy controls its location to follow the path. This is accomplished by placing the vehicle object below a cloned dummy 4109 in the scene graph.

Finally, at program launch, the user interface layer requests the data layer to initiate its auto downloader process to provide continuous data updates 1308 from the VGSTN TV Data Feed to populate a portion of the user interface called the traffic monitor 0101. From the NeXGen application's traffic monitor, a user may explore traffic data to create a rundown of show items 0107. The traffic monitor updates data through the user interface layer, sending one of several possible queries to the data layer. One query can be for all data of a certain type such as incident, sensor, flow, or keyroute. Another, more limited query, can be for data relating to a specific keyroute. Data is received back from the data layer as subject system objects 1901. The user interface layer will extract data from these subjects 1904 for display in the traffic monitor in a grid format that is easy for users to peruse, filter, and sort.

The user then selects a single data item 0105 (incident, sensor value, or keyroute), which they would like to include in the traffic report. The user decides which type of map they would like to use to visualize this piece of data (e.g., 2D Map, 3D Skyview, 3D flythrough, etc.). After the data item is selected and the user indicates the type of map to create 0104, the system dynamically creates a map of the specific area showing the data. Internally, the user interface layer provides this user selection information to the Animation Layer 1307. The Animation Layer has a framework functionality 1309 that receives this information and stores it. To store the user's choice, element data objects are created and stored in the framework. The user interface also allows the user to adjust the map item.

To facilitate these adjustments, the user interface displays a preview of the graphic in a portion of the user interface 0401. The animation layer is responsible for producing the image for this preview. To do this, the Animation Layer creates active objects from the framework's record keeping elements. The On-Air-Element object 1903 is created and contains the information about the world on which the element is based, the camera information, and the scene objects in the on air element. Scene objects 1902 are individual objects in a scene that portray some type of traffic data. Examples of scene objects are incidents, sensor data, flow illustration cars (red, yellow, or green colored), etc.

As mentioned in the world creation description, some scene objects are available because they are part of the world (e.g., the flow congestion cars). However, others must be explicitly created for a particular rundown item. These would be things that the user has requested to be in the item. For example, if the user requested that an incident icon and two sensor data displays be shown in a 2D map item, an incident icon scene object and two sensor data scene objects would be created based on the data in the associated subject objects. A 2D map on-air element would be created, associated to the 2D world, and associated to the scene objects. The flow indication scene objects would also be available by default as a part of the 2D world.

The world object, the on-air-element object, and the scene objects all utilize the per-station developed artwork in the .nif file and utilize Gamebryo utilities to produce the required preview image. As the user makes adjustments, the data in the objects is adjusted to change the resulting preview image. When the user is satisfied with the appearance of the rundown item (e.g., the 2D map), the user indicates this to the system (e.g., clicks the OK button on the map definition window). The system then saves the final data off in the element data objects in the framework.

The user can then repeat this rundown element creation for multiple items in the rundown. The result is to create the required numbers of element data objects that are stored in the framework. When the user wants to display the complete show on air, the element data objects of the framework are all converted into on-air-element objects and scene objects (animation layer objects). When the scene objects are created, they are created with the data from the corresponding subject, which has been kept updated by the auto downloader in the data layer. In this manner, the scene objects will display the latest information in the on-air graphics.

Creation of the animation layer objects for playing an On-air show is very similar to playing the preview. However, before the graphic visualization is started, the User Interface enables the digital video output (SDI) connection 1202 and sets the screen resolution to the SDI resolution (720×486 pixels) using NVidia video card control APIs. This allows the video to be fed into the TV-station switcher 1203 for broadcast on the air. Lastly, in the On-air show mode, the video is output to the entire screen instead of to just a small preview window that is part of the user interface. This video output is sent to both the computer monitor and to the digital video output. The screen resolution and video output type can be changed (e.g., to analog NTSC) within the scope of the present invention.

13. Weather Related Processing

Figure 27:
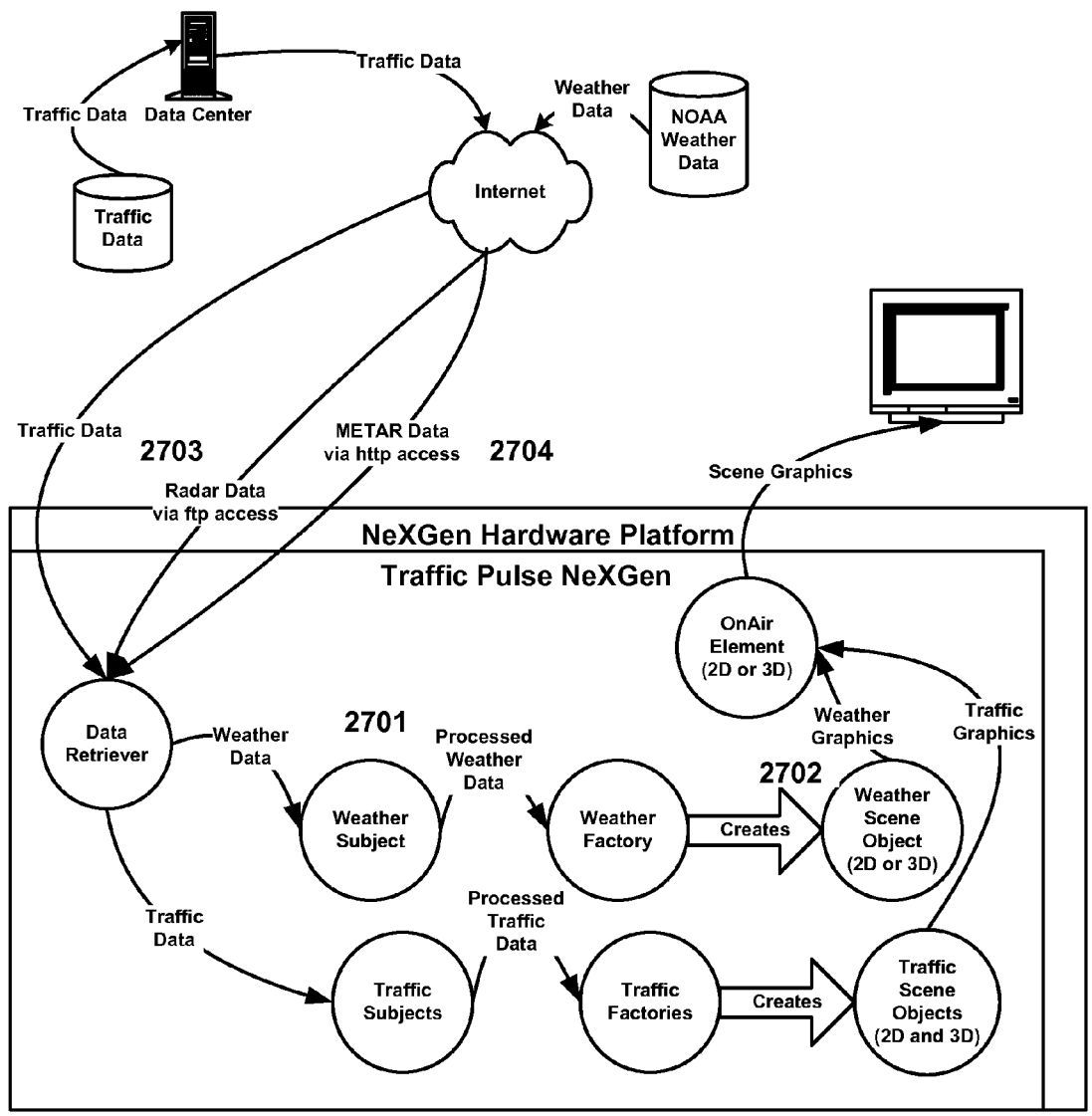
FIG. 27 shows how weather data is processed in one preferred embodiment of the present invention.

The processing of the weather data is done in a similar manner as the traffic data, but with different specific objects (see FIG. 27). For example, there is a specific Weather Subject object 2701 used to process the weather data. After the data layer retrieves the weather data, the Weather Subject is responsible for parsing the radar file. For more information on the weather data, see the "Data Layer Details" section below. This parsing is split up into two parts: (1) extracting the raw data from the file, and (2) translating that into a format that is easier to work with.

Figure 30:
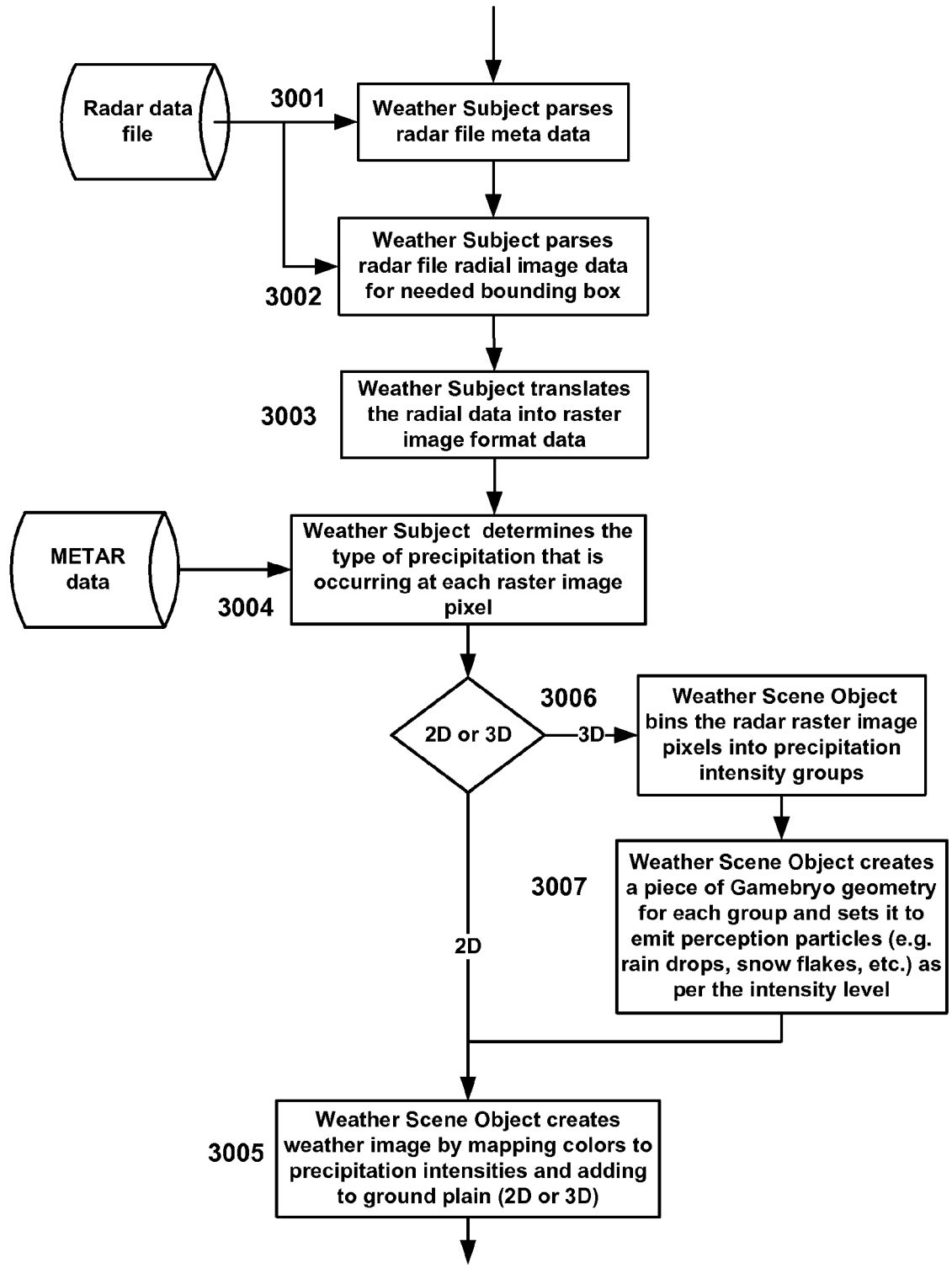

Referring to FIG. 30, extracting the raw data from the file consists of reading the metadata 3001 (latitude and longitude of the radar site, the mode of operation (precipitation or clear), the time at which the radar scan took place) and the radial image data 3002. Before this data is all stored, it is converted from big to little endian data format. Not all of the radar data needs to be preserved since most radar scans cover a much larger area than the scene. Therefore, it reads in the bounding box of the scene in latitude/longitude coordinates from a site-specific configuration file. Then, using the latitude/longitude of the radar scan, it finds where the bounding box of the scene is in a Cartesian coordinate system with the radar scan at the origin. Only the data in this bounding box is processed further.

Figure 28:
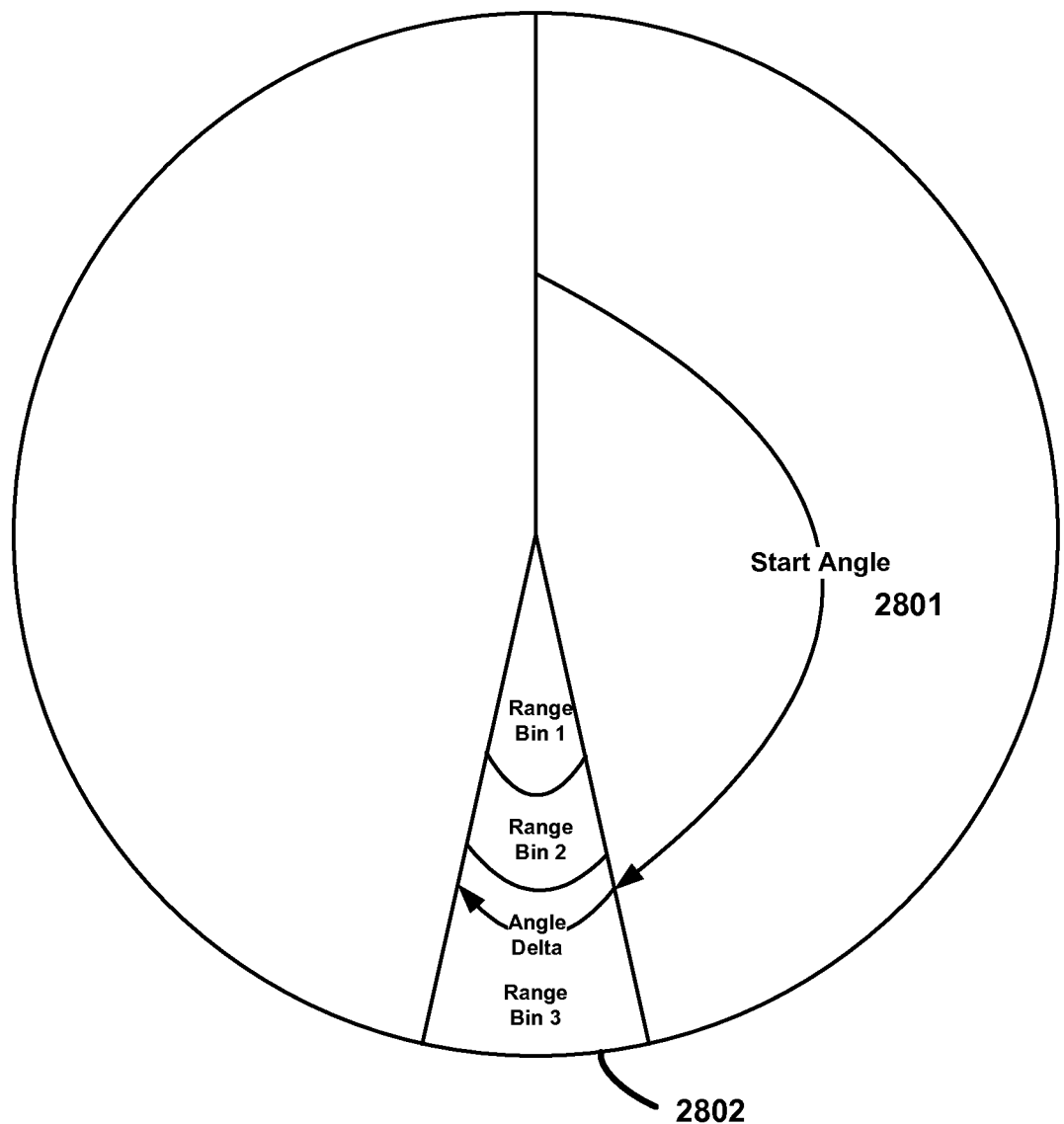
FIGS. 28-30 show how radial weather data is translated into raster image format data for use in the maps generated in the present invention.
Figure 29:
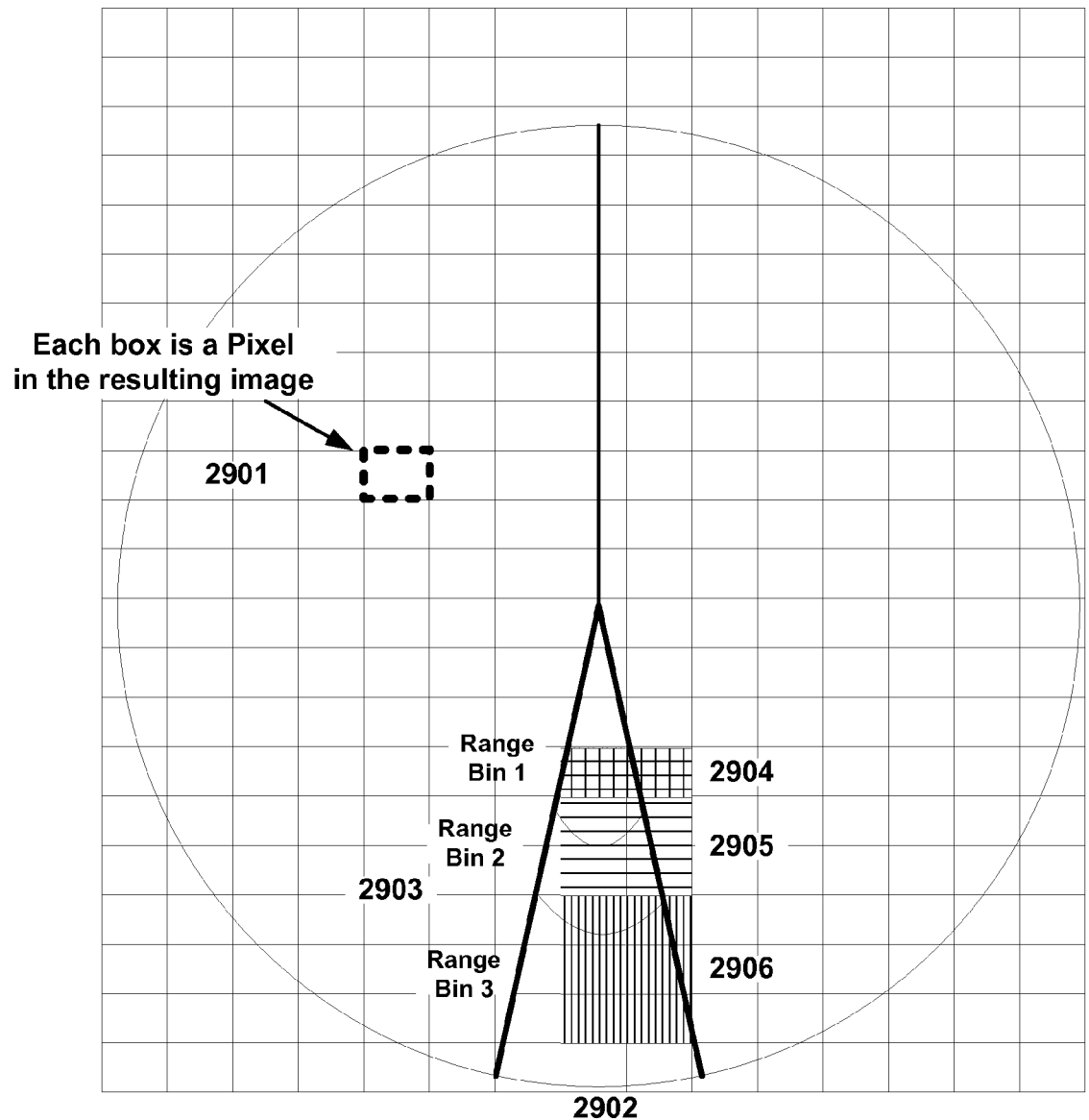

The second part of setting the data in the weather subject is translating the radial data into raster image format data 3003. The data is in a format where radials are specified via a start azimuth 2801 and an angle delta 2802, as shown in FIG. 28. Each one of these radials has reflectivity levels run-length encoded from the center of the image out in a series of bins. In order to convert this into a pixel based data format, the Weather Subject iterates through each pixel in the scene 2901 and queries the radial image data to decide what its color should be. In order to speed up the "pixel query," it uses the Microsoft .NET ArrayList->Sort method to sort the radials based on start azimuths and binary searches them to find out which radial each pixel belongs to (e.g., the highlighted wedge in FIG. 29-2902). Once it has found which radial it belongs to, it then binary searches the runs of reflectivities to find which range bin it belongs to where it can find its color (in FIG. 29 there are 3 range bins 2903). The point of the lower left corner of the pixel is used to determine if the pixel is in a particular bin. For example, in FIG. 29, the two crosshatched pixels 2904 are in the bin range in the given radial 2902 Likewise, the horizontally marked pixels 2905 are in the second bin range and the vertically marked pixels 2906 are in the third bin range. When this has been completed for each pixel, the Weather Subject is done processing the radar data. Each pixel in the image corresponds to an intensity level on a logarithmic scale. A radar pixel with intensity levels three or below is not considered to be precipitation so they are not included in the data. Also, radar pixels are equivalent to about a square kilometer.

Next, the weather subject determines the type of precipitation that is occurring at each pixel in the raster radar image 3004. The weather subject uses the METAR data, which the Data Layer has downloaded. (METAR is the acronym for METeorological Aerodrome Report, which provides surface meteorological data for aviation.) The METAR data contains the observed weather conditions at that location (e.g., clear, rain, snow, etc.). Each pixel of the radar image is assigned a weather type based on the METAR data of the closest METAR data location.

The Weather Scene Object 2702 creates the visual representation of the weather data which the Weather Subject Object has collected 3005. The Weather Scene Object performs different functions if it is part of 2D or 3D world. If it is part of a 2D world, it first calculates the size of the texture needed by finding the smallest width and height dimension that cover the entire scene and are powers of two. The Weather Scene Object then creates a NiPixelData (Gamebryo defined object) object of this size by mapping intensity levels of the radar raster image to color values (the intensity level to color mapping is provided in a property file). The NiPixelData object is then used to create a NiTextureProperty object (Gamebryo defined object), which is placed on the ground plain of the 2D world under all the roads, route shields, signs, etc 2102.

If the Weather Scene Object is part of a 3D world, it must place the radar precipitation intensity image on the ground plain like in the 2D 2202 world and also must create a graphical representation of the weather (e.g., rain drops, snowflakes, etc.) 2201. The graphical representation is accomplished by using Gamebryo particle system objects. When the scenes are created as part of the "per station development", the particle systems for each weather type (rain, snow, etc.) must be created and placed in the scene out of view (same strategy as vehicles, incident markers, etc.) 2506. Furthermore, three different particle systems with different particle density are created for each type to show different intensities of precipitation (low, medium and heavy intensities) 2507. Three graphical representations are sufficient because it is difficult to visually distinguish between more granular intensity level representations. Each of these particle systems is created using a PArray in 3ds max and placed under the non-animated node in the scene graph.

Some setup work must also be done to place the radar image on the 3D ground plane. At scene creation time, a bitmap of a radar image must be generated for the scene set-up purposes. This bitmap has the same dimensions as the texture dynamically created at runtime using Gamebryo functions. In order to match the texture up to the latitude/longitude of the scene, texture coordinates must be calculated to determine which part of the bitmap needs to be displayed in the scene. These texture coordinates are calculated by finding the bounding box of the scene in radar image space. Radar image space is the coordinate system where the center is the location of the NEXRAD radar and each unit is a square kilometer off of that. The bitmap contains all of the pixels in the radar image that are covered by this bounding box. To calculate the texture, first coordinates find the values for the bounding box within the bitmap, and then divide them by the size of the texture. In 3DS max, the texture is placed onto the ground plane using these coordinates. This default texture is then replaced at runtime by the actual downloaded radar data.

Then, at runtime in the 3D world, the Weather Scene Object bins the radar raster image pixels into groups according to light, medium and heavy precipitation intensity and precipitation type (e.g., light intensity rain bin, light intensity snow bin, medium intensity rain, etc.) 3006. The positions of these pixels are transformed from their pixel coordinate system to the latitude/longitude coordinate system of the scene. The Weather Scene Object then creates a piece of Gamebryo geometry for each bin from the points in the respective bin. Lastly it causes the predefined particle systems to emit from the vertices of the corresponding geometry (e.g., the light rain particle system emits from the light rain geometry) 3007. In order to maintain a consistent birthrate over the entire particle system, the birthrate at each vertex is changed to be some scalar multiplied by the number of vertices in the system. This makes the visual effect independent of the number of vertices in the geometry. The intensity of the precipitation is to be based on the intensity data and not on the number of vertices.

The next thing that the Weather Scene Object does is to add the radar texture to the ground plane 3005. It uses the multi-texture that was created when developing the scene. The scene object grabs this placeholder texture and replaces it with a texture that it creates from the radar data. However, this texture must be translated and flipped because of the way the Gamebryo exporter exports textures.

14. Data Layer Details

The data layer is responsible for providing updatable, real time data to the NeXGen application. After receiving a data request from the user interface layer, the data layer will query the VGSTN NeXGen Data Feed for the data. The VGSTN has the traffic data stored as part of a road network. This data can be presented to different applications in the appropriate format. This essentially provides a different view of the data for different clients of the VGSTN. For example, a textual format is a common format for a World Wide Web based application. Software was written for the VGSTN data servers that provide the traffic data in a format suitable for the NeXGen application. The majority of this data is provided based on the keyroute data structure previously discussed in various sections. For example, travel times and average speeds are provided for keyroutes. Also, congestion start and stop points are provided as percentages along these keyroutes (see the end of the "Per Station Development" section discussed above). Incident data that is not located on freeways is provided based on latitude/longitude data. This NeXGen Data Feed was written to format data provided by the basic VGSTN data service methods.

The NeXGen Data Feed will send XML formatted data back to the data layer 1303. The data layer will parse the XML file and create subjects for each individual feed item. A subject is an individual traffic item such as incident, sensor, flow or keyroute data. A subject object has associated data properties which store traffic data.

There are five types of traffic information that can be downloaded via the TV data feed (see FIGS. 14-18): sensor data, keyroute data, flow data, incident data, and point data.

The first data feed type is sensor data (see FIG. 14). It lists sensor data along a specific road. This data is displayed to the user in the traffic monitor portion of the user interface 0201 and can be added for display on the maps 0807. It can be seen that the data includes information regarding the textual description for listing in the traffic monitor 1401, the keyroute id 1402 and percent along the keyroute 1403 for display purposes, and the actual speed data 1404 for display in the traffic monitor and the visual graphic.

The data feed also provides keyroute data (see FIG. 15). This data includes the processed sensor data for an entire keyroute including: average speed 1501, travel time 1502, delay time over free flow 1503, etc. It also includes labeling metadata including the id 1504 and the description 1505. This data is displayed by the user interface Traffic Monitor section and then graphically shown on Travel Time graphic.

The flow data feed provides congestion information for the various routes (see FIGS. 16A and 16B). This is the data that drives the location of the red, yellow, and green colors for the vehicles moving along the roads. The main part of this feed is the specification of where the various colors are to occur on each path. The actual car path may have many sections with various colors. For example, in FIGS. 16A and 16B, a path has green vehicles for the first 67% 1601. Then, there is a section that is yellow for 12% 1602. The rest of the path is then green 1603.

The incident data lists traffic incidents that are occurring (see FIGS. 17A and 17B). This is used to display the incident list in the user interface Traffic Monitor section and is also used to place the traffic incident icons in the maps. This feed contains all of the data needed for these purposes, such as the incident type (e.g., CONST—for construction 1701, and ACC for accident 1702). This data feed also has location information for drawing the incident on the maps including both in placement along a keyroute 1703 (if available) and in latitude and longitude 1704. There is also information specifically for display in the Traffic Monitor, such as the incident description 1705.

The last data feed is the point data, which lists the various points 2005 along the keyroutes (see FIG. 18). This data is used when the user interface needs to allow the user to manipulate the system based on the various segments 2004. For example, the system has the capability for the user to override the flow colors of the vehicles, if necessary. The user does this by specifying the color change from one point to another point from the points that are listed. For the system to do this, the feed must contain the description to display to the user 1801, the route id 1802, and the percent along the route 1803.

As a separate functionality from the user interface data request service, the data layer maintains an auto downloader which continuously queries the NeXGen Data Feed, checking for updates to the traffic data that is being used. This data is also returned as an XML formatted file, which is parsed and used to update created subjects. If subjects are updated while the rundown is playing On-Air, the subjects will update their associated scene objects and the updated data will be displayed 1310.

15. Weather Related Data

The Data Layer is also responsible for getting the weather data. It contacts U.S. National Oceanic and Atmospheric Administration's (NOAA) FTP servers and retrieves a radar file (short range base reflectivity at 0.5 degree tilt is the data used in the implementation described herein) from the specified radar site for the metropolitan area 2703. It then creates a data set to be passed to the Data Messaging Service, which will then use this data set to notify the weather subject 2701 that new data has arrived.

In order to tell what type of precipitation is occurring, METAR data from the NOAA HTTP server is collected 2704. An HTTP request is made to get the METAR data for each airport with METAR data in the metropolitan area. This data is requested by using the International Civil Aviation Organization (ICAO) code for each airport. For example, in Philadelphia, the airports with METAR data are Philadelphia International Airport (ICAO code: KPHL) and North East Philadelphia Airport (ICAO code: KPNE). The METAR data is then parsed to access the current conditions at the ICAO. This data is then stored in a .NET data set along with the location of the ICAO in latitude/longitude and is passed to the weather subject 2701.

16. Animation Layer Details

The Animation layer heavily relies on the capabilities of the Gamebryo Graphics engine. The graphic functionality of the NeXGen system fits well with the capabilities that are provided with Gamebryo. There are several areas of the animation layer implementation that are of notable importance including both software organization areas and concrete details on the usage of Gamebryo.

Figure 31:
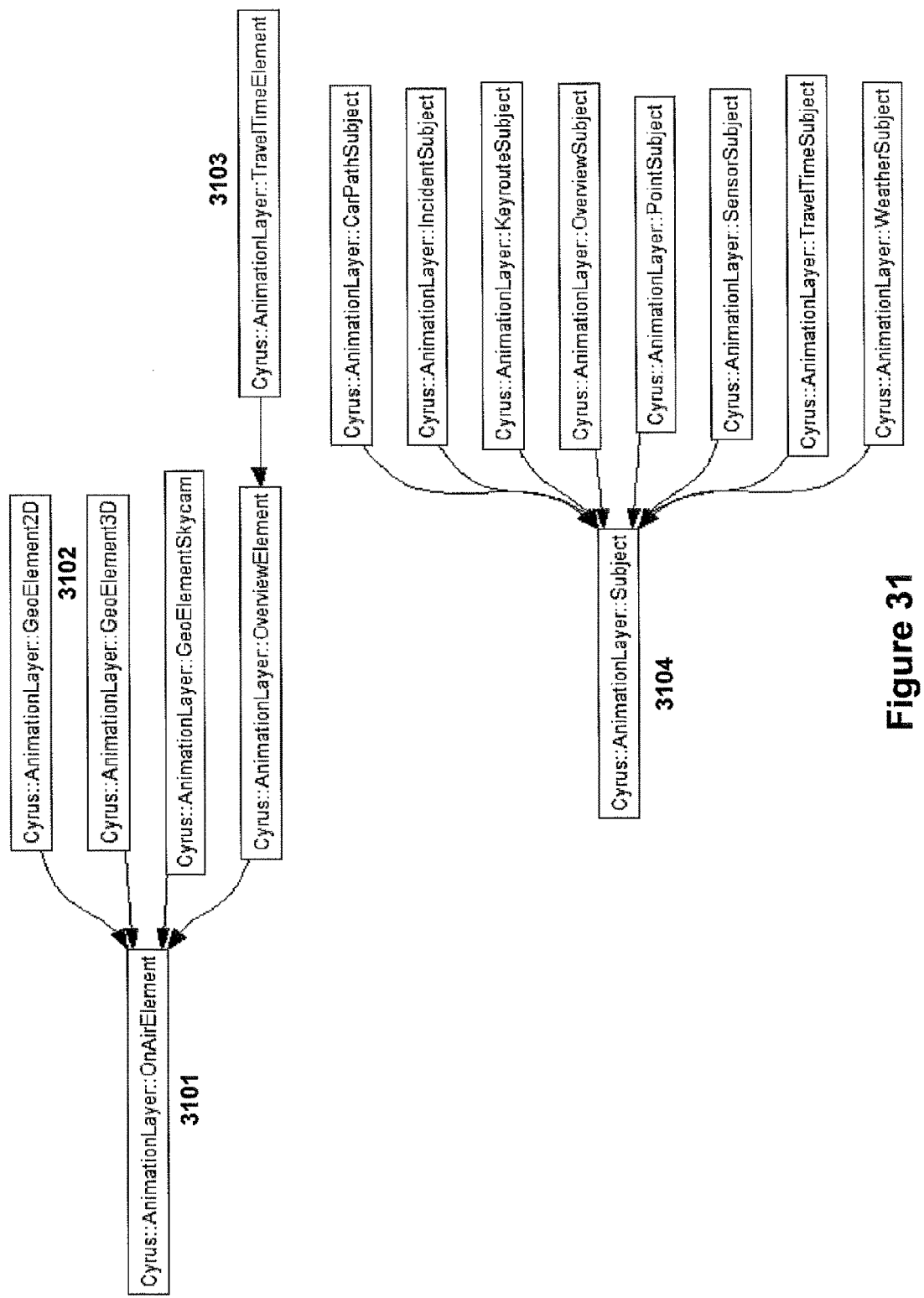
FIGS. 31-32 show the object-oriented architecture used to create the layers in the maps generated in the present invention.
Figure 32:
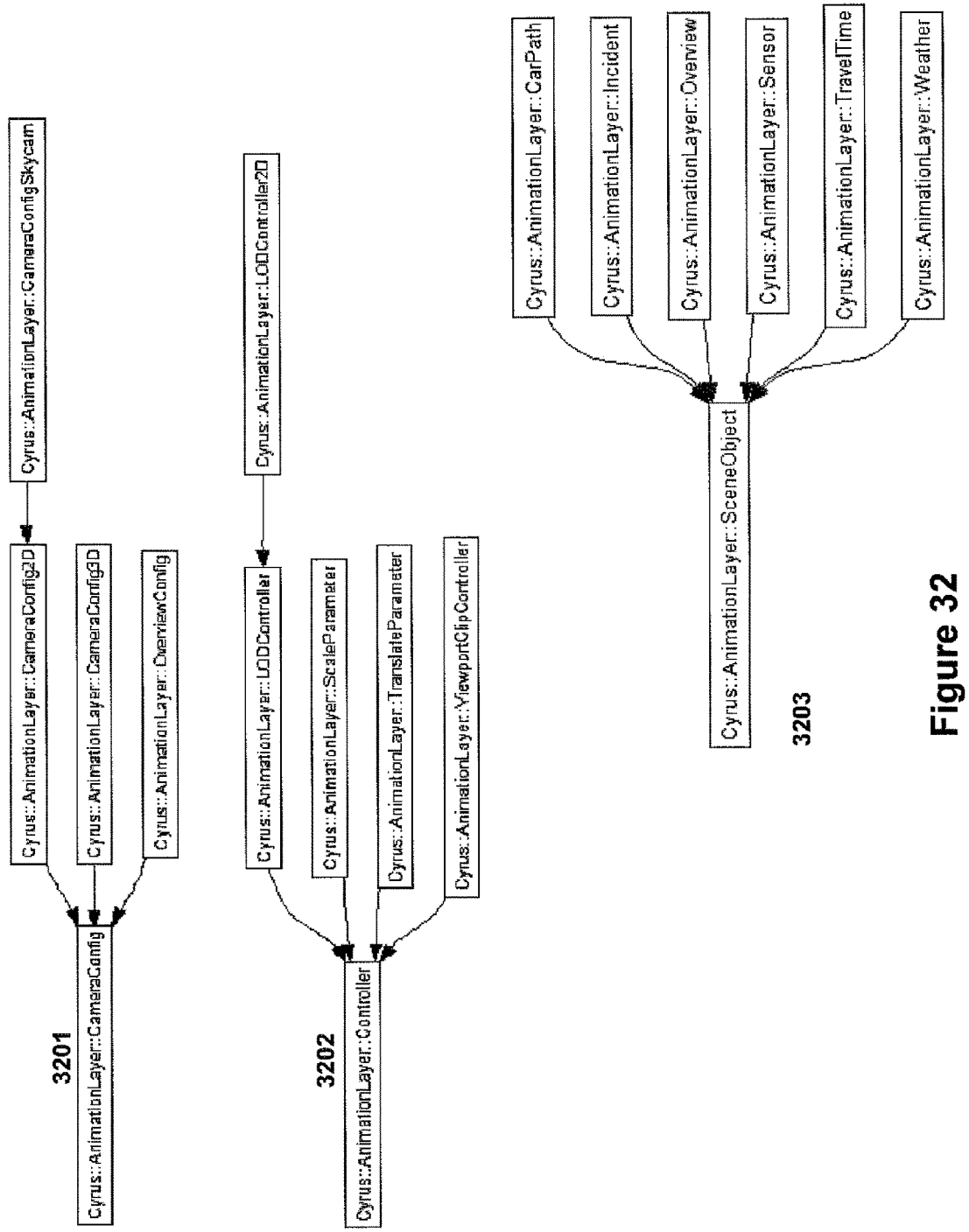

17. Object-Oriented Architecture (FIG. 31 and FIG. 32)

The NeXGen system architecture is based heavily upon the object-oriented design paradigm where inheritance is when one class extends the behavior of another class. This facilitates maximal re-use of machine logic and simplifies complex components by extending upon more generic components. For instance, the OnAirElement 3101 component exists as the base class for all six product types in the system. This abstract class defines the basic interface and implementation for creating, deleting, modifying, and updating an element. The sub-classes 3102 (e.g., GeoElement2D, GeoElement3D, etc) build upon this foundation to manage the detailed requirements of the element. These classes are further extended if the behavior is general enough to be re-used by another class of elements. For instance, the TravelTimeElement 3103, which inherits from OnAirElement, is able to be extended to the OverviewElement class. Other examples of inheritance include the Subject 3104, CameraConfig 3201, Controller 3202, and Sceneobject 3203 hierarchies.

Figure 33:
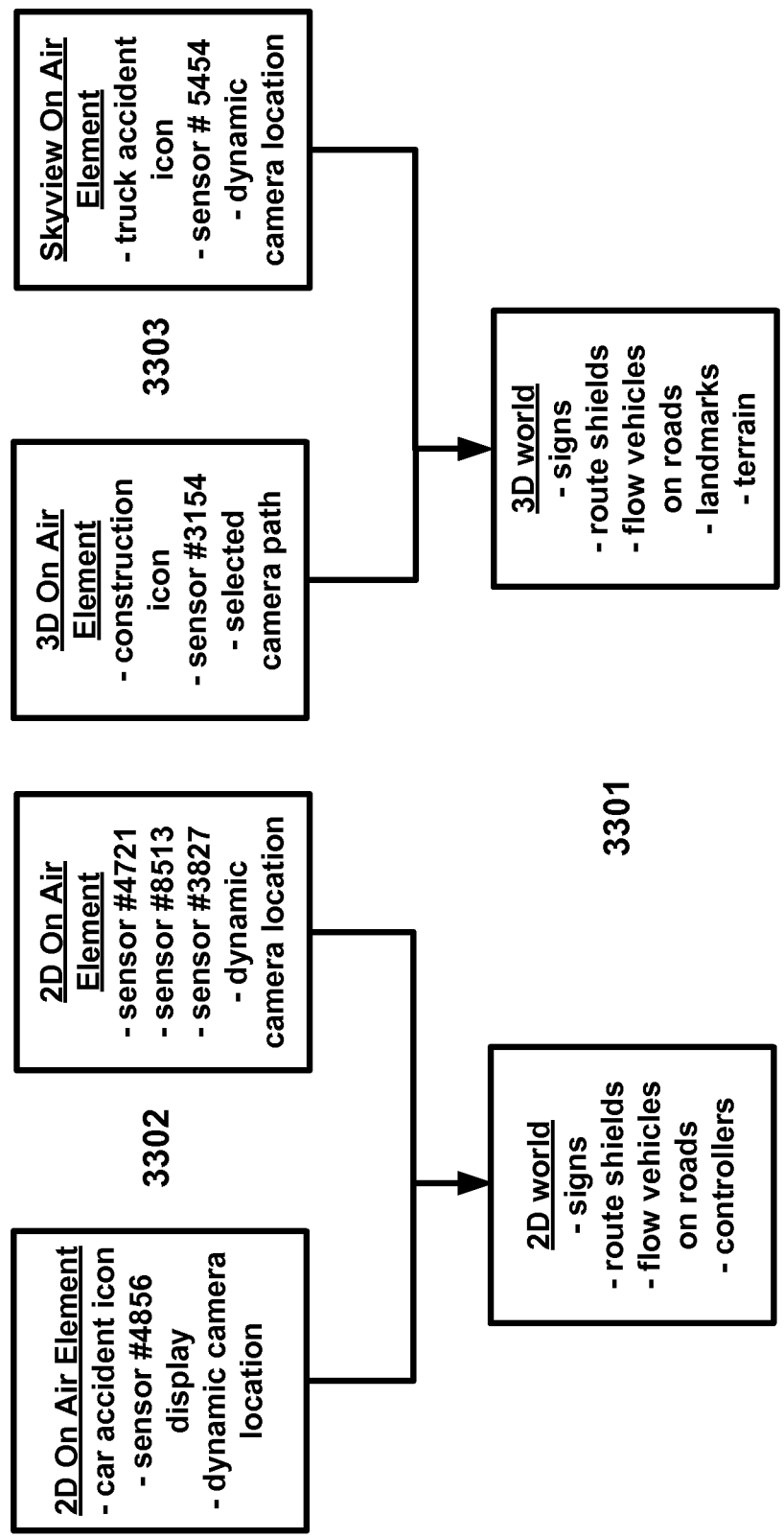
FIG. 33 shows how elements of the present invention share components with one another in order to increase memory efficiency.

18. Shared Worlds (FIG. 33)

Elements have the ability to share components with one another in order to increase memory efficiency. The application shares subject, scene object, and controller data structures 3301. This sharing occurs in multiple elements based in the same world (e.g., 2D maps in the 2D world 3302, Skyview in the 3D world 3303, etc). Art assets are also shared even though art in one element may be temporarily hidden when the next element instance is loaded. These shared data structures and art are what constitutes a "world" in NeXGen. Worlds are instantiated and initialized when the application is started. This shared world description is persistent in memory until the entire application is terminated.

Figure 34:
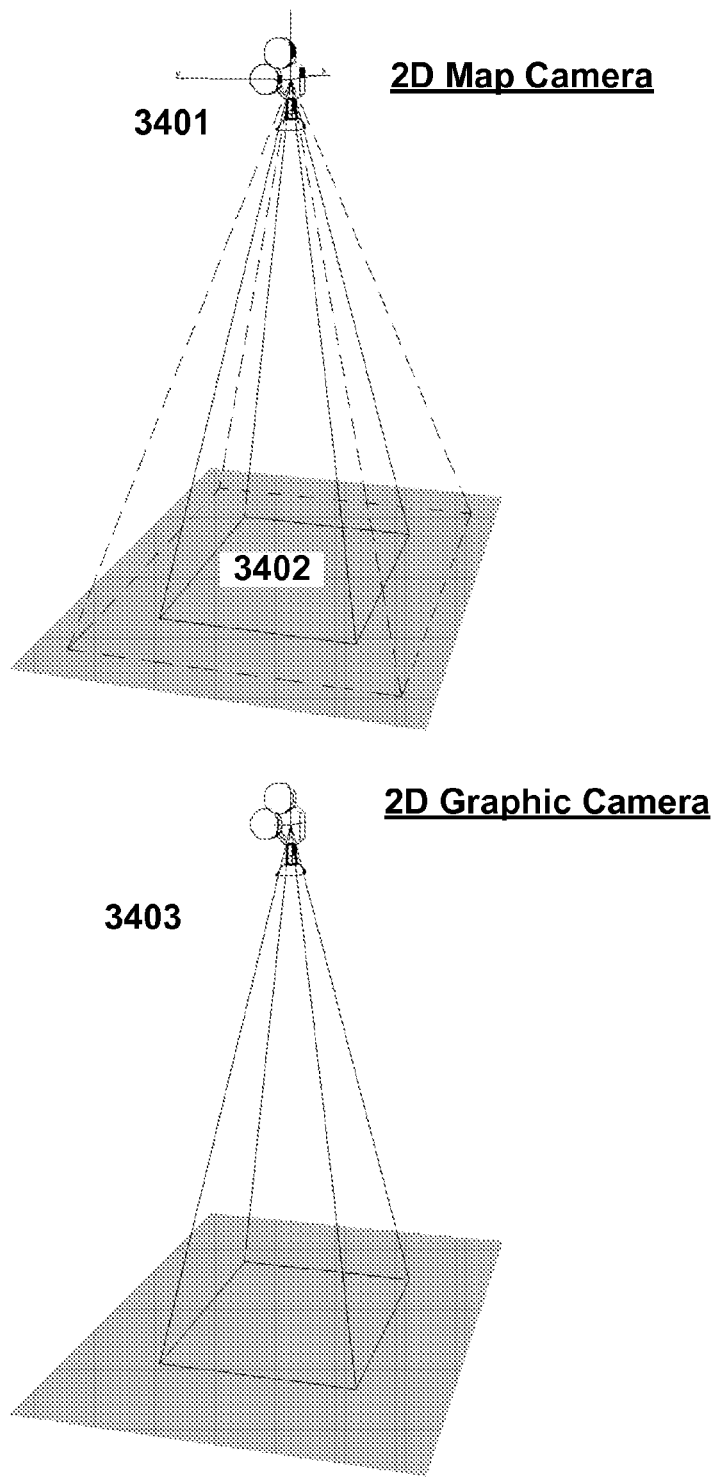

19. Camera Generation (FIG. 34 and FIG. 35)

Each element requires a camera to view the 3D scene from a particular viewpoint, or a set of points in the case of an animated flythrough. Even the 2D graphics are in 3D space, but due to the camera placement looking straight down, the viewer only sees a 2D product. Depending on the type of element, the cameras may be modeled by the art staff or generated dynamically by the application. Subject-based elements generate cameras dynamically based on the position of the subject chosen in the user interface (e.g., a SkyView or 2D map focused on a traffic incident). The 2D map element creates a camera at a fixed distance directly above the subject 3401. The camera uses the Gamebryo orthographic model representation where the viewing frustum is modified in order to change the zoom level of the scene, thereby showing more or less of the overall map 3402. The Skyview element creates a camera 3501 represented in the Spherical coordinate system (i.e., two angles 3502 3503 and a radius 3504), which can be easily converted into the Cartesian coordinate system, which is needed by the Gamebryo camera. The camera is represented using the Gamebryo perspective camera model, which takes the camera's position, viewing point, and normal vector as input. The default camera positions and viewpoint can be overridden in the user interface.

Other elements have statically defined cameras. Image-based elements (e.g., Overview, TravelTime, etc.) have a camera created by the art staff since the position of the billboard is static and thus not subject to modification 3403. 3D flythroughs have cameras 3405 that are set to follow a pre-defined path 3406. The art staff model this path taking into consideration accuracy of viewing highways and landmarks, and aesthetic appeal. Cameras constructed by the art staff use the perspective camera model since this is exported into Gamebryo more effectively.

Figure 36:
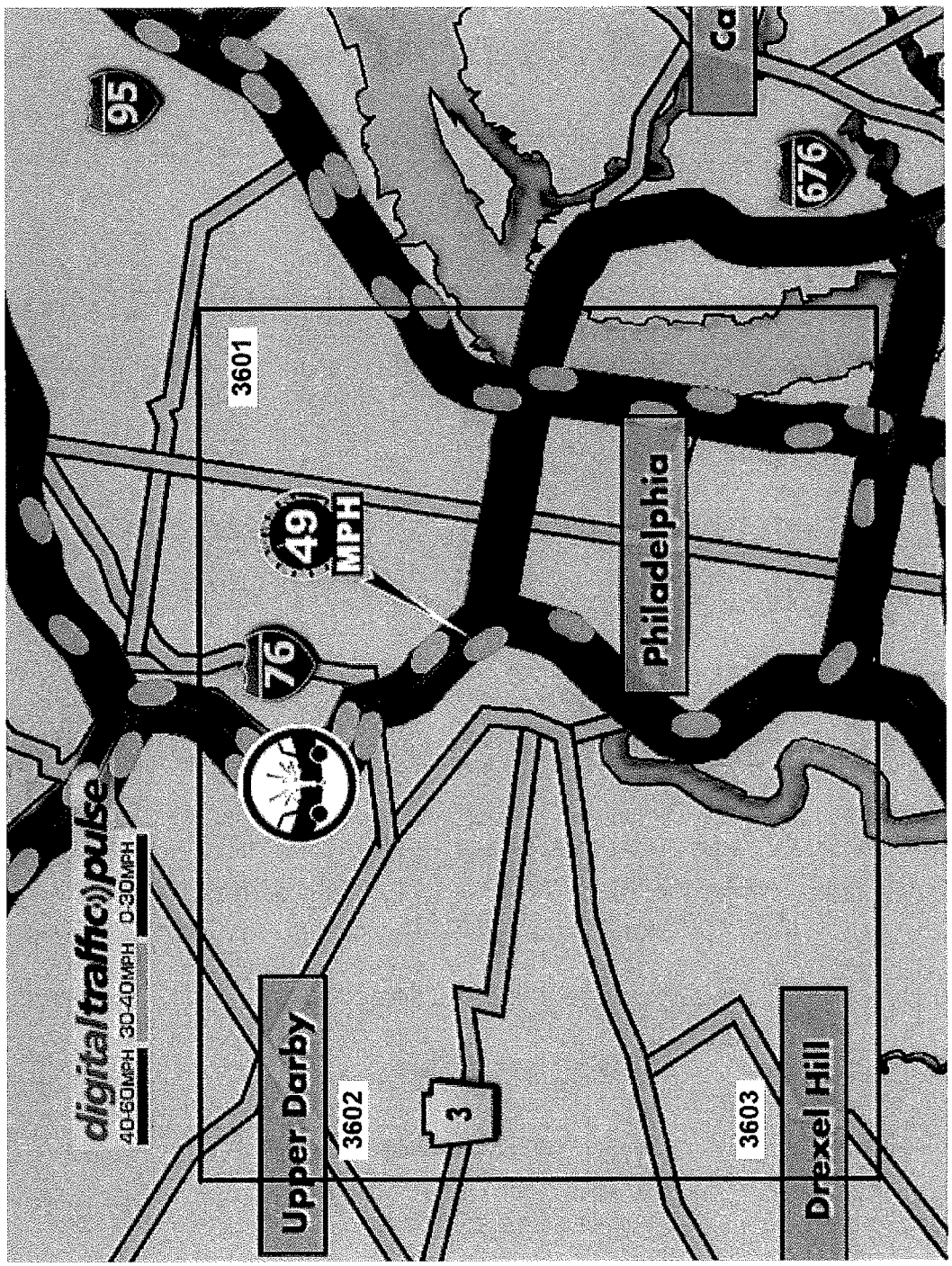
FIGS. 36-38 show 2D map views that illustrate the effects of various controllers on the objects viewed by the virtual camera in accordance with the present invention.

The system also uses controller objects that utilize the camera's properties (e.g., position, view frustum, etc.) to modify scene behavior. The viewport-clip controller detects which objects would be clipped in the viewport of the camera, and culls those objects from the scene. This keeps objects like route shields from partially being displayed. For example, if the map view in FIG. 36 was changed to only include the map outlined by the black box 3601, certain objects would be eliminated from the maps because they would only be partially displayed. In this case, the town signs 3602 3603 would be eliminated because they would be partially displayed.

Figure 37:
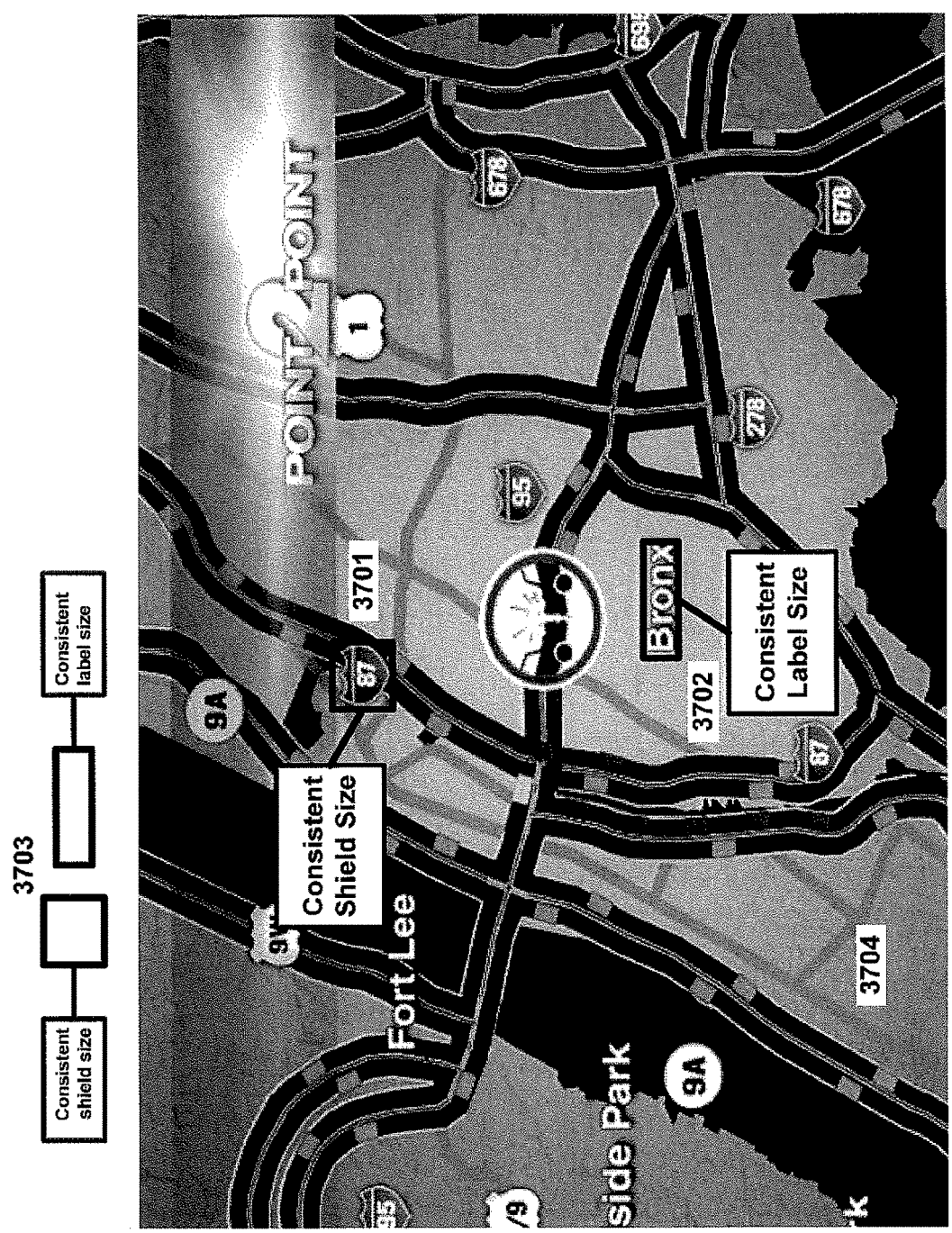
Figure 38:
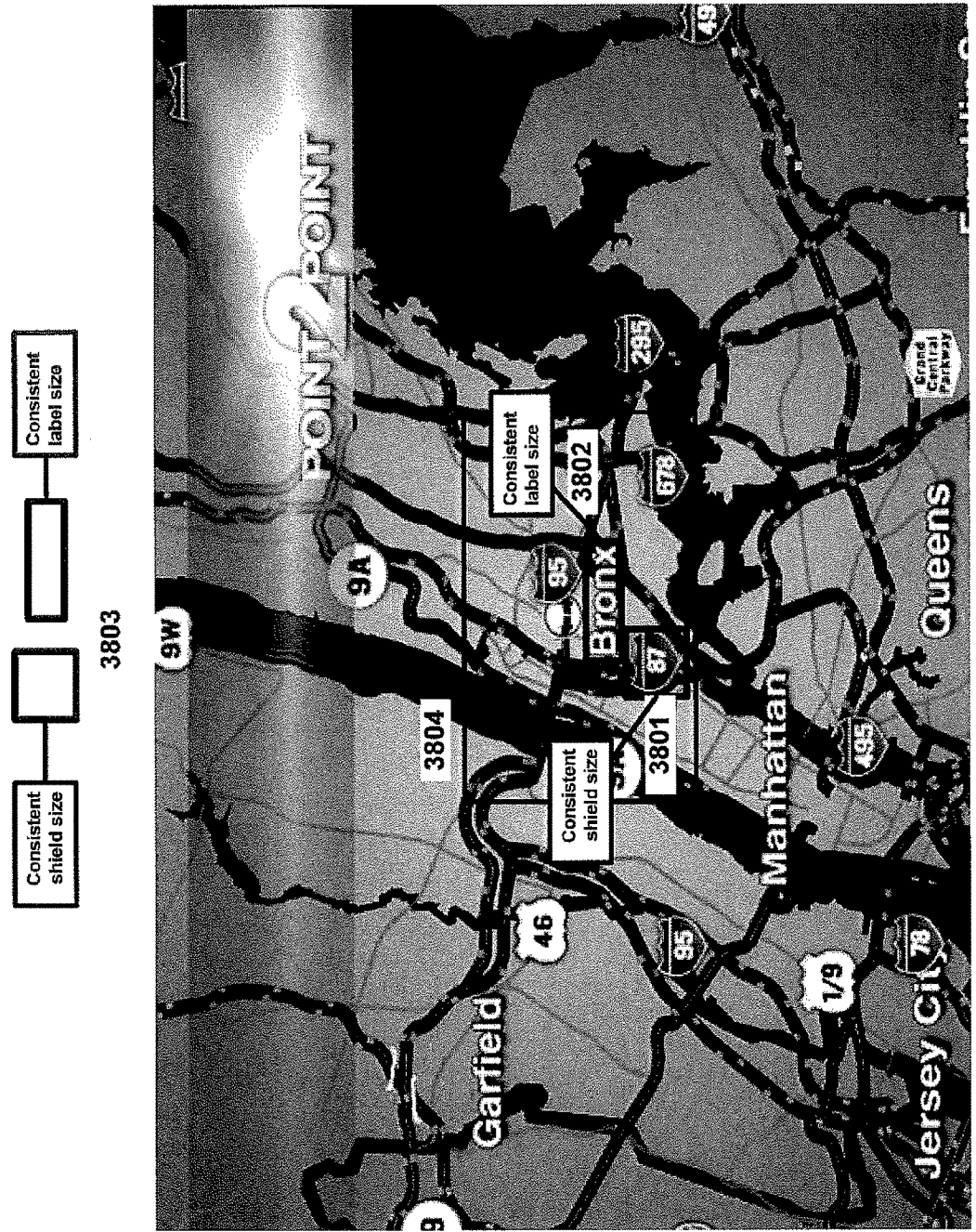

The scale controller maintains a constant scale for certain objects as the camera changes position. Thus, the route shields are maintained at a constant readable size. Zooming in does not enlarge the shield to an unreasonable size and zooming out does not make the shield too small to read. FIG. 37 shows a map with the I-87 shield 3701 and the "Bronx" town label 3702, each surrounded by a box. The sizes of the boxes can also be seen off of the map 3703. FIG. 38 shows the same basic map area but at a more zoomed out level so that more area can be seen. Note that the I-87 shield 3801 and the "Bronx" town label 3802 are still the same size. The boxes 3803 were copied from one figure to the other and they clearly still are the same size as the shield and the label. The scale controller enlarges the objects so that on the zoomed-out map, the objects can remain readable. Note that not all objects are enlarged. For example, the roads are almost the same width as the shields in FIG. 37, but are much smaller in FIG. 38.

The display-controller culls objects if the position of the camera does not fall within the artist's pre-defined zoom level boundaries where the object was designed to be visible. This is used to have more route visible shields when zooming in and less visible shields when zooming out. If this were not done, the map would be very readable at a certain zoom level. At a more zoomed-in level, there would not be enough labels and shields to identify the roads. At a more zoomed-out level, there would be too many objects that would clutter the map. For example, the area of the map in FIG. 37 is outlined in the box 3804 on the map in FIG. 38. It can be seen that on the map in FIG. 38, there are four road shields in this area. However, on the more zoomed-in map of the same area in FIG. 38, there are nine full shields in this same area. If the display controller did not hide some of these shields, the zoomed out map in FIG. 38 would be very cluttered with shields. The artist also sets a zoom level where the secondary roads 3704 are hidden. This further reduces clutter on maps at or above this zoom level.

20. Scene Object Creation

Subjects are created 1901 based on data obtained from the VGSTN 1905, and serve as the basis for all scene objects 1902 contained in an on-air element. A subject is shared among all on-air elements and can have many scene object instances created from it (i.e., one-to-many relationship) 1906. This allows the application to have different graphics and animations for each type of element while still representing consistent information across different elements. For example, the congestion-subject 1907 will have one scene object for the 2D element 1908 and another for the 3D element 1909. In addition to congestion, other noteworthy scene objects are sensors and incidents.

A congestion subject contains a keyroute identification string 3901, percentages that partition the keyroute into individual congestion segments 3902, and congestion labels representing the traffic conditions 3903 (e.g., delayed, normal, etc.) for each segment. The keyroute identification string is used to identify the keyroute geometry 3904 within the art assets of the on-air element. The art is annotated with the same string to make the association explicit between the static art assets and dynamic congestion data. Once identified, this string is stored in the Congestion Scene Object 3905.

The congestion subject uses keyroute congestion data (e.g., congested areas along the keyroute defined by start and stop percentages) from the VGSTN to alter the car characteristics (speed, color, and density) as they travel along the car path. In response to the arrival of new data, the congestion subject has the ability to modify its corresponding scene objects at runtime as the congested sections of the path change. If this data arrives when the traffic report graphics are actively playing, the congested sections of the car path will visually update.

Figure 39:
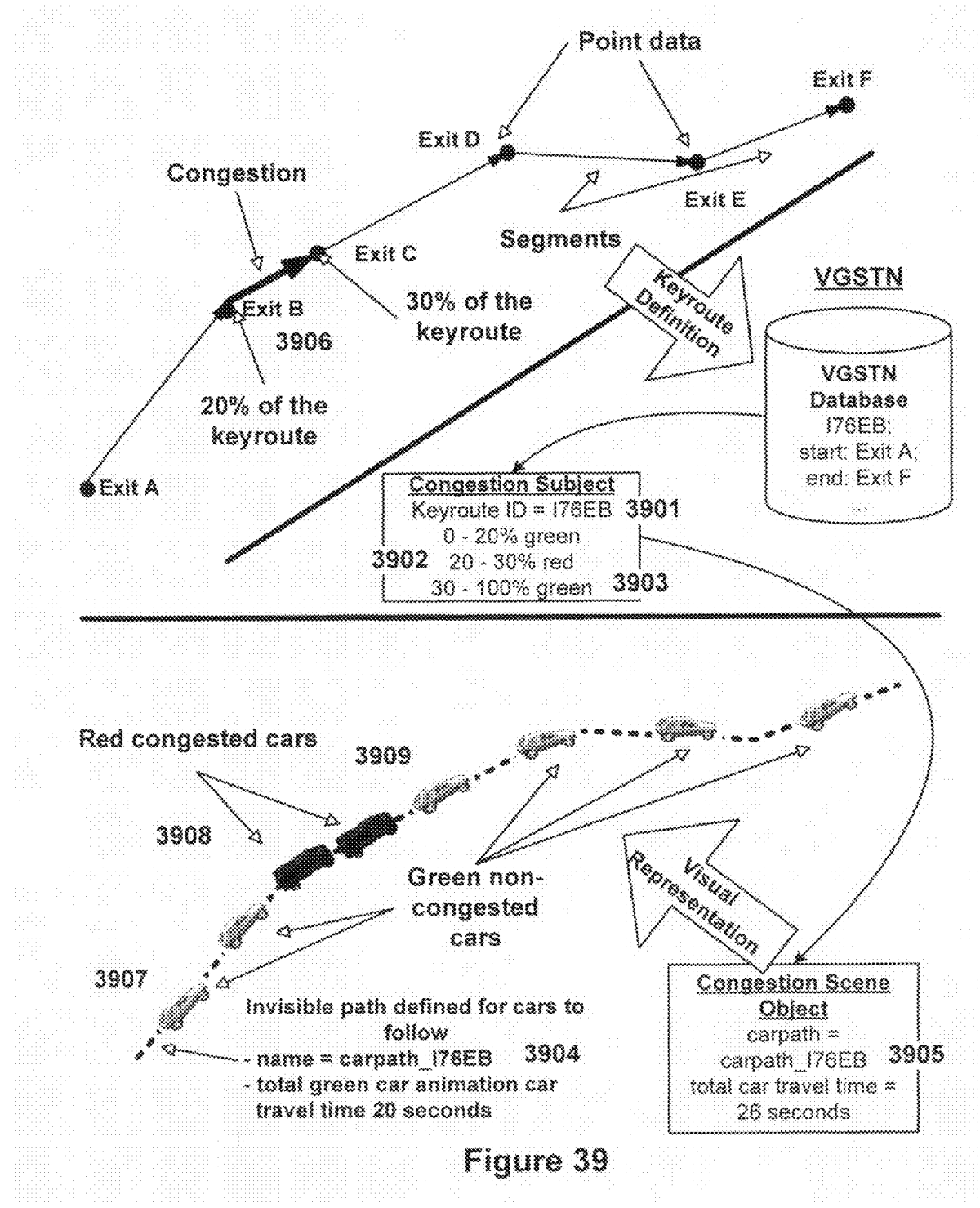
FIG. 39 shows how congestion scene objects are created in the present invention.

Using the laws of kinematics with the desired velocity for a congestion label, the percentages are used to calculate the starting and ending times of each segment given the car's starting location, since Gamebryo accepts input based on time. For instance using the example in FIG. 39, the congestion may be set to "jammed" between 20% along the path to 30% along the path 3906.

1. This car starts out green so this car would be set to green and placed at 0% of the path at second 0 3907.
2. If a green car travels across the total path in 20 seconds, a green car that starts at the beginning of the path will reach the congestion (20% of the path length) in 4 seconds (20% of 20 seconds=4 seconds). At 4 seconds, it would be set to the red characteristics and at the location 20% along the path 3908.

3. The red cars travel at a velocity of 1 so a red car would make the entire path trip in 80 seconds (green cars make the trip in 20 seconds and green cars are 4 times faster than the red cars). Thus, the red car will make it to the end of the congested area (10% further along the path) in 8 seconds (10% of 80 seconds=8 seconds). Since it reached the beginning of the congestion at 4 seconds and takes 8 seconds to reach the end of the congestion, it is changed back to green and 30% of the path at 12 seconds 3909.

These pairs of (color, time) and (percentage of length, time) are registered with each car in terms of the path dummy defined by the artists for each car on the path with the times phase-shifted based on the start location of each car. For example, for a car starting at the beginning of the path in the example of FIG. 39, the pairs would be:

0 sec.: green,
0 sec.: 0% path length;
4 sec.: red
4 sec.: 20% path length
12 sec.: green
12 sec.: 30% path length.

This provides Gamebryo with sufficient information to modify the velocity and color of a car as it travels along a path.

In response to new data arrival, the congestion subject has the ability to modify its corresponding scene objects at runtime as the keyroute congestion data changes. If this data arrives when the traffic report graphics are actively playing, this will result in a change to the red, yellow, and green sections that are displayed. This is accomplished by recalculating the pairs of (color, time) and (percentage of length, time) for a new set of cars, as was done at the original world creation. Then, the old and new sets of cars are swapped in the scene graph.

Figure 40:
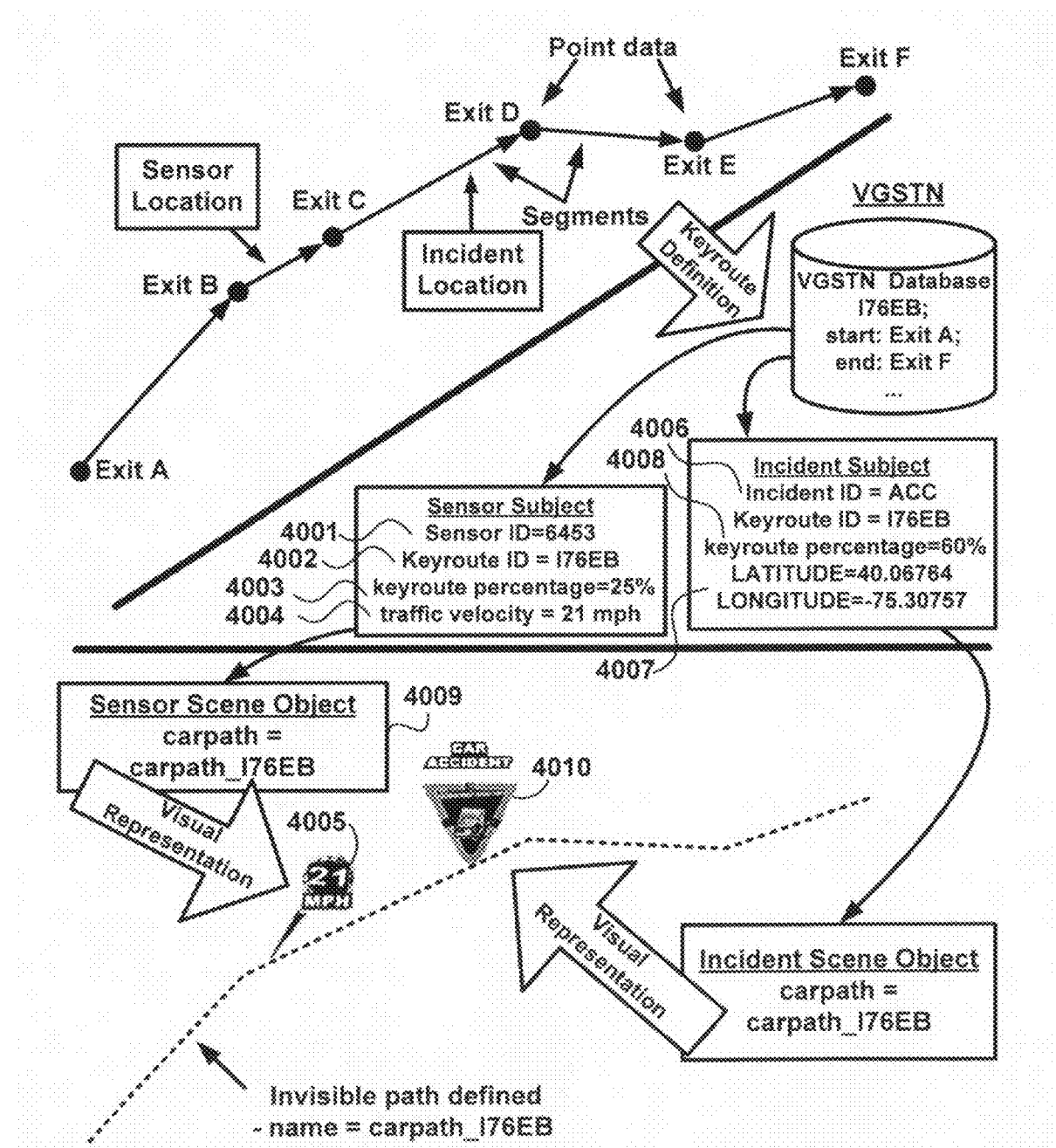
FIG. 40 shows how sensor and incident scene objects are created in the present invention.

Referring to FIG. 40, the sensor subject contains a sensor identification string 4001, a keyroute identification string 4002, a percentage where it occurs along the keyroute 4003, and a velocity measurement 4004. Like the congestion scene objects, the keyroute identification string and the percentage are used to place the scene object along a particular keyroute. Gamebryo provides this functionality for objects along a path by setting its phase attribute, which is exactly the same as the percentage. Numerals for the velocity are created from the font specified by the artist, and are displayed on the sensor geometry (using the Gamebryo NiFont functionality). The sensor geometry 4005 (i.e., the display "bubble") is cloned from the one that was created by the artist at scene creation and was placed out of the camera's view 2508. In response to new data arrival, the sensor subject has the ability to modify its corresponding scene objects 4009 at runtime as the velocity changes. If this data arrives when the traffic report graphics are actively playing, this will result in a change to the numerals displayed showing the sensor data.

Referring again to FIGS. 25 and 40, the incident subject contains an incident identification string 4006, a latitude and longitude for global positioning 4007, and can optionally contain a keyroute identification string and keyroute percentage 4008 for position if it exists on a roadway. The incident identification string is used as a lookup in a configuration file where it maps to the name of the incident geometry in the scene graph 2509. The latitude and longitude are used to position the incident within the scene; otherwise it is placed along the keyroute by setting the phase attribute with the percentage. The actual visual object 4010 placed at the location is a clone of one of the incident markers in a palette of incident markers stored outside the visual world. The specific incident marker is chosen from the palette based on the runtime incident data's type. Also, in response to new data arrival, the incident subject has the ability to modify its corresponding scene objects at runtime as the incident type changes or if the incident expires. If this data arrives when the traffic report graphics are actively playing, this will result in a change to the incident marker that is visually displayed.

21. Objects of Interest

As part of the map creation process described above, a user selects an object of interest within the geographical region, wherein the object of interest has a corresponding geographical location. A graphical map is then created of at least a portion of a road system, and traffic flow data is displayed on the graphical map. The graphical map includes the geographical location of the user-selected object of interest and may be centered on the object of interest. The object of interest may be a specific traffic event, such as a traffic incident. Alternatively, the object of interest may be a predefined section of the road system, a roadside sensor, a landmark, or a physical address within the geographical region.

22. Photographic Representations of the Earth

The scope of the present invention is not limited to using graphical maps that are simulations of regions of the earth (e.g., map regions with graphically created roadways, landmarks, and the like), but includes photographic representations of the earth available from arial photography sources such as AirPhotoUSA, Phoenix, Ariz. In such embodiments, the photographic representation becomes another layer in the system sitting below the traffic data (e.g., flow, incidents, sensor data display). The roadway routes can be additionally highlighted if desired with route shields. This approach can be used in 2D and 3D products. In the 3D product, a variety of different approaches can be used. One approach is to view the photographic imagery at an angle with the Skyview and 3D fly-through products as previously described. A more enhanced approach is to use the photographic imagery as a background with the landmarks sitting on top of the imagery. In either approach, as in the 2D method, the traffic data sits on top of the imagery background.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A computer-implemented method for creating a traffic report for a television broadcast, comprising:

providing a user interface that allows a user to make multiple traffic data type selections of one or more of an incident item, a sensor item, and a key route item in a geographic area;

receiving the multiple traffic data type selections of one of the incident item, the sensor item, and the key route item from the user;

upon receiving the multiple traffic data type selections, allowing the user to make a map type selection of one of a 2D map, a 3D sky view map, and a 3D fly through map via the user interface;

receiving the map type selection of one of the 2D map, the 3D sky view map, and the 3D fly through map;

with receiving data for a play sequence for an order of objects including the multiple traffic data type selections and the map type selections;

displaying a preview of how the objects would appear in an animated television traffic report for the geographic area to the user and using the play sequence of the order of the objects; and upon receiving a first indication that the user approves the traffic report appearance and the play sequence of the order of the objects, saving the data type and map type selections for use in the animated television traffic report.

2. The method of claim 1, wherein the incident item is an item on a list of traffic incidents in the geographic area.

3. The method of claim 1, wherein the sensor item is an item on a list of sensors in the geographic area with associated traffic data.

4. The method of claim 1, wherein the key route item is an item on a list of predefined sections of a road system in the geographic area.

5. The method of claim 1, further comprising allowing the user to edit the data type and map type selections and the geographic area via the user interface after viewing the preview of the animated television traffic report.

6. The method of claim 5, further comprising receiving user edits of at least one of the data type, the map type, and the geographic area.

7. The method of claim 1, further comprising allowing the user to select an informational graphic to be included in the animated television traffic report.

8. The method of claim 7, wherein the informational graphic is a travel time graphic, an average speed graphic, or an overview graphic.

9. The method of claim 1, further comprising receiving a second indication from the user to activate the animated television traffic report and sending a video signal including the saved data type and map type selections to a television station for use in the animated television traffic report.

10. A system for creating a traffic report for a television broadcast, comprising in combination:

a processor;

data storage; and machine language instructions stored in the data storage executable by the processor to:

provide a user interface that allows a user to make multiple traffic data type selections of an incident item, a sensor item, and a key route item in a geographic area and a traffic map type selection of one of a 2D map, a 3D sky view map, and a 3D fly through for the selected traffic data type;

receive the multiple traffic data type selections and the traffic map type selection from the user;

receive data for a traffic play order for objects including the multiple traffic data type and traffic data type selections;

display a preview of how objects comprising the multiple traffic data type and traffic map type selections would appear in an animated television traffic report for the geographic area to the user and using the traffic play order;

save the objects upon receiving a first indication from the user; and send a video signal including the saved traffic data type and traffic map type selections to a television station for use in the animated television traffic report upon receiving a second indication from the user.

11. The system of claim 10, further comprising machine language instructions operable to receive user edits of at least one of the traffic data type, the traffic map type, and the geographic area.

12. The system of claim 10, wherein the user interface further allows the user to select an informational graphic to be included in the animated television traffic report and wherein the machine language instructions are operable to receive the selection of the informational graphic.

13. The system of claim 10, further comprising machine language instructions operable to receive multiple selections of traffic data type and traffic map type pairs and allow the user to order the pairs for use in the animated television traffic report.

14. The method of claim 1, wherein the preview is smaller in area than the animated television traffic report.

15. The system of claim 10, wherein the preview is smaller than the animated television traffic report.

* * * * *